US012103039B2

(12) United States Patent
Efner et al.

(10) Patent No.: US 12,103,039 B2
(45) Date of Patent: Oct. 1, 2024

(54) APPARATUS AND METHOD TO HEAT METALLIC CONTAINERS OR WORKPIECES

(71) Applicant: BALL CORPORATION, Westminster, CO (US)

(72) Inventors: John D. Efner, Broomfield, CO (US); Julian Stock, Denver, CO (US)

(73) Assignee: Ball Corporation, Westminster, CO (US)

( * ) Notice: Subject to any disclaimer, the term of this patent is extended or adjusted under 35 U.S.C. 154(b) by 591 days.

(21) Appl. No.: 17/329,776

(22) Filed: May 25, 2021

(65) Prior Publication Data

US 2021/0370347 A1 Dec. 2, 2021

Related U.S. Application Data

(60) Provisional application No. 63/139,226, filed on Jan. 19, 2021, provisional application No. 63/030,168, filed on May 26, 2020.

(51) Int. Cl.
*B05D 3/02* (2006.01)

(52) U.S. Cl.
CPC ......... *B05D 3/0281* (2013.01); *B05D 3/0272* (2013.01)

(58) Field of Classification Search
CPC ............................ B05D 3/0281; B05D 3/0272
USPC ............................................................ 34/237
See application file for complete search history.

(56) References Cited

U.S. PATENT DOCUMENTS

| | | | | |
|---|---|---|---|---|
| 2,465,454 | A * | 3/1949 | Holt | F26B 17/26 198/771 |
| 3,894,237 | A | 7/1975 | Choate et al. | |
| 4,008,401 | A | 2/1977 | Holoubek et al. | |
| 4,297,583 | A | 10/1981 | Nerod | |
| 4,327,665 | A | 5/1982 | Arrasmith | |
| 4,535,549 | A | 8/1985 | Lala et al. | |
| 4,820,365 | A | 4/1989 | Brumm et al. | |
| 5,218,178 | A | 6/1993 | Peysakhovich | |
| 5,272,970 | A | 12/1993 | Burke | |
| 5,323,485 | A | 6/1994 | Josefsson et al. | |
| 5,353,520 | A | 10/1994 | Gouge et al. | |

(Continued)

FOREIGN PATENT DOCUMENTS

| | | | | |
|---|---|---|---|---|
| CA | 3180296 | A1 * | 12/2021 | B05D 3/0272 |
| DE | 102012207312 | A1 * | 11/2013 | F26B 15/14 |

(Continued)

OTHER PUBLICATIONS

International Preliminary Report on Patentability for International (PCT) Patent Application No. PCT/US2021/034011, dated Dec. 8, 2022 8 pages.

(Continued)

*Primary Examiner* — Stephen M Gravini
(74) *Attorney, Agent, or Firm* — Sheridan Ross P.C.

(57) ABSTRACT

Apparatus and methods of heating metallic containers in an oven which includes electric heating elements are provided. The electric heating elements include one or more of an electric induction element and an electric infrared heating element. The electric heating elements heat the metallic containers to a predetermined temperature to dry moisture on the metallic containers or to cure inks and coatings. Air within the oven may be at a temperature that is less than the predetermined temperature.

28 Claims, 16 Drawing Sheets

(56) References Cited

U.S. PATENT DOCUMENTS

| | | | | | |
|---|---|---|---|---|---|
| 5,570,521 | A * | 11/1996 | Baker | F26B 25/22 34/550 | |
| 5,821,504 | A | 10/1998 | Sprenger et al. | | |
| 6,161,304 | A * | 12/2000 | Iaccino | F26B 21/004 34/208 | |
| 6,293,121 | B1 * | 9/2001 | Labrador | F03D 5/00 62/304 | |
| 6,463,674 | B1 * | 10/2002 | Meyers | F26B 21/086 34/304 | |
| 7,488,919 | B2 * | 2/2009 | Gagas | F24C 15/18 219/400 | |
| 7,549,530 | B2 | 6/2009 | Souri et al. | | |
| 8,959,793 | B2 * | 2/2015 | Zea | F26B 15/10 432/247 | |
| 9,423,179 | B2 * | 8/2016 | Wieland | F26B 21/004 | |
| 10,605,529 | B2 * | 3/2020 | Wieland | F26B 15/14 | |
| 10,871,326 | B2 | 12/2020 | Scholey | | |
| 11,435,141 | B2 * | 9/2022 | Wood | F26B 21/08 | |
| 11,867,461 | B2 * | 1/2024 | Kozlowski | F26B 5/06 | |
| 2006/0038313 | A1 | 2/2006 | Sakaguchi et al. | | |
| 2006/0127616 | A1 | 6/2006 | Beck | | |
| 2007/0022624 | A1 | 2/2007 | Chu Yuk Man | | |
| 2009/0176031 | A1 | 7/2009 | Armellin et al. | | |
| 2012/0288638 | A1 | 11/2012 | Baxter et al. | | |
| 2015/0360868 | A1 | 12/2015 | Teuber et al. | | |
| 2019/0302721 | A1 | 10/2019 | Sari et al. | | |
| 2020/0017305 | A1 | 1/2020 | De Carvalho Costa et al. | | |
| 2020/0080778 | A1 | 3/2020 | Scholey | | |
| 2020/0120757 | A1 | 4/2020 | Kazmierowicz et al. | | |
| 2020/0331025 | A1 | 10/2020 | Cochran et al. | | |
| 2021/0071949 | A1 | 3/2021 | Scholey | | |
| 2021/0299703 | A1 | 9/2021 | Cochran et al. | | |
| 2021/0370347 | A1 * | 12/2021 | Efner | B05D 3/0281 | |

FOREIGN PATENT DOCUMENTS

| | | | | |
|---|---|---|---|---|
| EP | 0715140 | | 6/1996 | |
| EP | 0700503 | | 7/1998 | |
| EP | 1572467 | | 10/2019 | |
| GB | 2203225 | | 10/1988 | |
| JP | S54-25561 | | 2/1979 | |
| JP | 5925600 | | 5/2016 | |
| WO | WO 2006/010141 | | 1/2006 | |
| WO | WO 2013/047917 | | 4/2013 | |
| WO | WO 2013/075877 | | 5/2013 | |
| WO | WO-2013164285 | A1 * | 11/2013 | F26B 15/14 |
| WO | WO 2018/073095 | | 4/2018 | |
| WO | WO 2020/051326 | | 3/2020 | |
| WO | WO-2021242732 | A1 * | 12/2021 | B05D 3/0272 |

OTHER PUBLICATIONS

"15335—Pin Oven," Ajax Tocco Magnethermic Corporation, 2005, 1 page [retrieved online Apr. 2, 2020 from: www.ajaxtocco.com/default.asp?ID=195].

"Beverage Can Line," Stolle Machinery Company, LLC, 2020, 8 pages.

"How Do You Differentiate Pin Oven Technology?" International Thermal Systems, 2021, 2 pages.

"Induction heating," Wikipedia, last updated Mar. 14, 2020, 5 pages [retrieved online from: en.wikipedia.org/wiki/Induction_heating].

"Inside a Ball Beverage Can Plant," Ball, Sep. 2002, 1 page [retrieved online from: www.ball.com/Ball/media/Ball/Global/Downloads/How_a_Ball_Metal_Beverage_Can_Is_Made.pdf?ext=.pdf].

"Metal Packaging 7.10™ Pin Oven," International Thermal Systems, 2017, 2 pages.

"Pin Oven," Ajax Tocco Magnethermic, 2005, 2 pages [retrieved online Apr. 2, 2020 from: www.ajaxtocco.com/default.asp?id=182].

International Search Report and Written Opinion for International (PCT) Patent Application No. PT/US2021/34011, dated Sep. 29, 2021 14 pages.

Partial Supplementary Search Report for European Patent Application No. 21813262.9, dated May 16, 2024 15 pages.

* cited by examiner

APPARATUS AND METHOD TO HEAT METALLIC CONTAINERS OR WORKPIECES

CROSS-REFERENCE TO RELATED APPLICATIONS

This application claims the benefit of priority under 35 U.S.C. § 119(e) to U.S. Provisional Patent Application Ser. No. 63/030,168, filed May 26, 2020, and to U.S. Provisional Patent Application Ser. No. 63/139,226, filed Jan. 19, 2021, which are each incorporated herein in their entirety by reference.

FIELD

The present disclosure generally relates to the treatment of metallic containers and other metallic workpieces. More specifically, the present disclosure provides apparatus and methods of heating metallic containers and other metallic workpieces to dry moisture or fluids on the metallic workpieces or to cure inks and coatings applied to the metallic workpieces.

BACKGROUND

Metallic containers offer distributors and consumers many benefits. The body of a metallic container provides enhanced protection properties for beverages and foodstuffs. The surfaces of metallic containers are also ideal for decorating with brand names, logos, designs, product information, and/or other preferred indicia for identifying, marketing, and distinguishing the metallic container and its contents from other products and competitors. Thus, metallic containers offer bottlers, distributors, and retailers an ability to stand out at the point of sale.

Additionally, many consumers prefer metallic containers compared to containers made of glass or plastic. Metallic containers are particularly attractive to consumers because they are recyclable, lightweight, and efficient. Metallic containers are suitable for use in public places and outdoors because they are more durable than glass containers. Further, some consumers avoid plastic containers due to concerns that the plastic may leach chemicals into consumable products.

As a result of these and other benefits, sales of metallic containers were valued at approximately $53 billion globally in 2014. A large percentage of the metallic container market is driven by beverage containers. According to one report, approximately 290 billion metallic beverage containers were shipped globally in 2012. One U.S. trade group reported that 126 billion metallic containers were shipped in the U.S. alone in 2014. To meet this demand, metallic container manufacturing facilities operate some of the fastest and most efficient production lines in the container industry. Accordingly, specialized equipment is required for many of the high-speed operations performed to form the metallic containers.

Metallic containers are frequently produced by a draw and wall ironing (DWI) process. An example of a known production line to produce DWI metallic containers is generally illustrated and described in "Inside a Ball Beverage Can Plant," available at http://www.ball.com/Ball/media/B all/Global/Downloads/How_a_Ball_Metal_Beverage_Can_Is_Made.pdf?ext=.pdf (last visited Jan. 3, 2021) which is incorporated herein by reference in its entirety. Production lines generally include a cupper which cuts circular blanks from an aluminum sheet and forms the blanks into cups. Bodymakers use a punch on a ram to push the cups through a series of tooling dies that redraw and iron the cups into container bodies. The open ends of the container bodies are then cut to a uniform height by trimmers. The container bodies are then washed. A first oven, known as a "dry-off oven", then dries the container bodies.

Some container bodies then receive an exterior basecoat. The basecoat is sometimes required to provide a base color before subsequent decorations or coatings are applied. The container bodies are then conveyed through a second oven or "basecoat oven" where the basecoat is cured.

The exterior sidewalls of the container bodies are decorated with up to six colors of ink by a decorator. The decorator also applies a film of lacquer over the entire decoration to protect it. A bottom coater applies a coating of lacquer to the rim around the bottom of the container bodies.

The inks and lacquer coatings of the container bodies are then cured by a third oven known as a "deco oven". The deco oven is also known as a "pin oven" because container bodies are typically transported through the oven on a chain with pins. The pins are placed into the open ends of the container bodies to transport them without touching the exterior surfaces of the container bodies.

After the decoration and other exterior coatings are cured, the container bodies receive an internal coating, such as a lacquer, to protect product integrity. The internal coating is subsequently cured as the container bodies pass through a fourth oven known as an "internal coater oven" or "internal bake oven" (IBO).

The open ends of the container bodies then receive a thin coat of a lubricant from a waxer in preparation for necking. A die necker then squeezes the open ends down to a predetermined diameter. Next, the open ends are rolled back to form a lip or flange which is used to attach an end closure after the container body is filled with a product.

A dome at the closed end of the container bodies may then be reprofiled for stackability. Optionally, an inner portion of the dome may be reformed to improve strength. The container bodies are then tested, inspected, and placed in pallets.

The ovens typically burn fossil fuels, such as natural gas or propane, to produce the hot air used to dry moisture on the container bodies or to cure inks and coatings. Substantial amounts of fossil fuels are used by the ovens. One known pin oven uses about 1,000 standard cubic feet per hour (SCFH) of natural gas or about 400 SCFH of propane. As will be appreciated by one of skill in the art, the use of fossil fuels to heat the air for the ovens creates a large amount of $CO_2$ emissions.

Handling waste heat that radiates from a conventional gas fired oven is a considerable problem. As will be appreciated by one of skill in the art, cooling the metallic container manufacturing facility requires a significant amount of energy. The cooling system must be sized to handle the heat radiated from the conventional oven, increasing the costs of operating the metallic container manufacturing facility.

Another problem with a prior art oven that uses hot air is the damage to container bodies that occurs when the production line stops. Conventional ovens that are heated with fossil fuels are not structured to quickly cool down or heat up. Accordingly, conventional ovens operate substantially continuously and are typically left on even when the production line stops to prevent temperatures in the ovens from falling below an operating temperature. Container bodies within an oven during a production line stoppage will be exposed to hot air for longer than intended. While the production line is stopped, the container bodies in the oven will be continuously heated by the hot air. This may damage the mobility enhancers, coatings, and ink on the container bodies if the production line is stopped for too long, creating a substantial number of waste container bodies.

A prior art oven also has a complex ventilation system to circulate the hot air within the oven. The air within the oven must be kept at a high temperature to dry or cure coatings on the container bodies. The ventilation system includes a large amount of ducting to move the hot air from gas burners to the container bodies. Fans or blowers of the ventilation system must have the capacity to move a large volume of air. The ventilation system contributes to the large size of the prior art oven which requires a substantial amount of valuable space on the product floor of the metallic container manufacturing facility.

Accordingly, there is a need for apparatus and methods of heating container bodies that do not use fossil fuels to generate hot air to heat the container bodies, which reduces the amount of $CO_2$ emissions, that do not expose the container bodies to excessive heat when the production line stops, and which require less floor space than a prior art oven.

SUMMARY

One aspect of the present disclosure is an oven that is eco-friendly and reduces the amount of $CO_2$ emitted during the manufacture of metallic containers. The oven of the present disclosure also requires less energy to heat container bodies than a prior art oven. For example, the oven uses electric heating elements that can quickly heat a metallic container soon after being turned on. In contrast, a prior art oven that uses hot air to heat container bodies requires a greater amount of energy to heat the air in the oven and to maintain the air at a temperature required to dry container bodies or to cure a coating on the container bodies.

Moreover, prior art ovens that use hot air cannot be rapidly turned on and off Instead, prior art ovens are typically left on even when an associated production line stops. This wastes energy that is used to heat air in the oven. In contrast, the heating elements of the oven of the present disclosure are operable to heat container bodies soon after being turned on. For example, in one embodiment, the heating elements of the present disclosure may be turned off if the production line stops. When the production line re-starts, the oven of the present disclosure can heat container bodies to a predetermined temperature without waiting for air in the oven to heat up. In one embodiment, the heating elements of the present disclosure can be ready to heat a container body to a drying or curing temperature soon after being switched from an off state to an on state.

Another aspect of the present disclosure is an oven with heating elements that use electricity to heat container bodies. In one embodiment, the heating elements are induction elements. Additionally, or alternatively, the heating elements can include infrared (IR) elements.

In one embodiment, a first heating element can heat the container bodies to a first temperature. The first heating element may heat the container bodies at a first rate. The first heating element is one of an induction element and an IR element.

A second heating element of the oven can then heat the container bodies to a second temperature that is greater than the first temperature. The second heating element is either an induction element or an IR element.

In one embodiment, the oven is a dry-off oven. The first and second heating elements are configured to heat the container bodies to a drying temperature of between approximately 212° F. and approximately 325° F.

Alternatively, the oven is a basecoat oven or a deco oven. In one embodiment, the second temperature is a curing temperature at which the coatings on the container bodies are cured. In one embodiment, the curing temperature is between approximately 350° F. to approximately 390° F. The second heating element may also heat the container bodies at a second rate that is different than the first rate.

In one embodiment, the oven is an internal bake oven (IBO). The first and second heating elements of the IBO are configured to heat the container bodies to a curing temperature of between approximately 350° F. and approximately 450° F.

Optionally, the first heating element operates at a first voltage and a first current. The second heating element operates at a second voltage and a second current. The first voltage and current may be the same as, or different from the second voltage and current.

Additionally, or alternatively, the first heating element operates at a first duty cycle and the second heating element operates at a second duty cycle. In one embodiment, the first and second duty cycles are adjustable. Optionally, the first and second duty cycles are approximately equal.

In another embodiment, the first duty cycle is different than the second duty cycle. For example, the first duty cycle may be greater than (or less than) the second duty cycle.

In one embodiment, the first heating element has a first size and a first number of coils. The second heating element may have a different second size and second number of coils.

Optionally, a first heating element produces electromagnetic waves with a first peak wavelength. A second heating element produces electromagnetic waves with a second peak wavelength that is different than the first peak wavelength.

The oven may optionally include a cooler associated with a heating element. In one embodiment, the cooler uses a fluid, such as water, to maintain at least a portion of an associated heating element at a predetermined temperature. The cooler may comprise tubing around at least a portion of the heating element for the fluid. Additionally, or alternatively, the heating element includes a hollow interior to receive the fluid.

Optionally, the oven includes a sensor to determine the temperature of the container bodies. In one embodiment, a first sensor is associated with the first heating element. Additionally, or alternatively, the oven includes a second sensor associated with the second heating element.

The oven optionally includes a ventilation system. The ventilation system includes at least one fan. Optionally, the ventilation system includes a duct. The duct is configured to capture vapor and/or volatile organic compounds (VOCs) released by the container bodies as they are heated. In one embodiment, the duct extends at least partially around a heating element of the oven. Accordingly, in one embodiment, the fan of the ventilation system is only sized to move air within the duct associated with the heating element. Alternatively, in another embodiment, the ventilation system and fan are configured to recirculate 100% of the air within the oven.

In one embodiment, the oven has a temperature measuring device to determine the temperature of the air within the oven. The temperature measuring device may include one or more of a thermometer, a thermistor, and a thermocouple.

Optionally, the oven includes a humidity sensor. Additionally, or alternatively, the oven optionally includes an air monitor, such as a VOC measuring device.

The ventilation system can optionally recirculate air through the oven to control the temperature of the air within the oven. In one embodiment, the ventilation system only moves air that is within a duct associated with a heating element. Accordingly, air within the oven enclosure that is not within a duct is not moved by the ventilation system.

The ventilation system may include a vapor handling unit. In one embodiment, the vapor handling unit includes a condenser. Alternatively, the vapor handling unit may include a thermal oxidizer to treat VOCs.

In one embodiment, the ventilation system can recirculate the air at a rate such that the air temperature in the oven is below the first temperature. In another embodiment, the ventilation system recirculates the air at a rate to decrease the temperature of air within the oven to be less than the second temperature. Optionally, the air within the oven is less than the curing temperature.

In one embodiment, air within the oven is at a temperature of between approximately 80° F. and approximately 450° F.

The oven is configured to receive the container bodies transported by a conveyor system. The conveyor system includes an endless loop driven at a variable rate by a motor. The motor may be a servo motor. The servo motor optionally operates at a rate set by a control system.

The endless loop may be a belt. The closed ends or the open ends of the container bodies may be positioned on the belt as they are transported through the oven. Optionally, the belt has a width that is at least twice the diameter of the container bodies. The belt may be formed of a plastic.

The belt may be formed of any suitable material known to those of skill in the art. In one embodiment, the belt is formed of a heat resistant material. The belt optionally comprises a metal material, such as a stainless steel or comparable metals. Additionally, or alternatively, the belt may include a plastic, a rubber, or a polymer. In one embodiment the belt comprises an organic thermoplastic polymer such as Polyether ether ketone (PEEK) or a polyimide-based plastic such as Vespel® which is produced by DuPont.

In one embodiment the belt is formed of a mesh. More specifically, the belt optionally includes a plurality of apertures. The apertures through the belt facilitate movement of air between adjacent container bodies and into the interior of the container bodies. In one embodiment, the apertures have an internal dimension of approximately up to approximately 0.75 inches.

Additionally, or alternatively, the apertures through the belt may define a predetermined ratio of open space in a given portion of the belt. The ratio is defined by the total open area of all the aperture openings combined relative to the area occupied by the solid portion of the belt in the given area. For example, a given portion of the belt that is 4 inches by 4 inches may have between approximately 10% open area to approximately 90% open area.

Alternatively, in another embodiment, the belt does not include apertures. More specifically, in one embodiment, the belt is formed of a continuous sheet of a suitable material.

The belt is optionally configured to vibrate the container bodies as they pass through the oven. In this manner, a space is created between the sidewalls of adjacent container bodies to facilitate drying. More specifically, the space that is created between the sidewalls facilitates movement of air between or around adjacent container bodies.

In one embodiment, the endless loop of the conveyor system is a pin chain with a plurality of pins that are each adapted to extend into an open end of a container body. The pin is configured to contact at least one portion of an interior surface of a container body. In one embodiment, each pin has a plurality of projections that contact the interior surface of a container body at a plurality of locations to stabilize the container body as it moves through the oven at high speed.

In one embodiment, the pin is configured to hold the container body such that a longitudinal axis of the container body is substantially horizontal. The longitudinal axis of the container body extends from the open end through a closed end of the container body.

In one embodiment, the pin includes a projection. Optionally, the projection is formed of at least one of a metal and a polymer.

Optionally, the longitudinal axis of the container body may be oriented approximately parallel to a central axis of the pin when the container body is supported by the pin chain. In another embodiment, the longitudinal axis of the container body is approximately coaxially aligned with the pin central axis.

In one embodiment, the oven also includes a control system. The control system can control operation of one or more of the heating elements, the cooler, the sensor, the temperature measuring device, the ventilation system, and the motor driving the conveyor system.

In one embodiment, the control system can alter the first heating rate of the first heating element by changing the first voltage and the first current. Additionally, or alternatively, the control system can adjust the first temperature. In one embodiment, the control system can adjust the first temperature based on data received from the sensor, such as a temperature of the container body. Optionally, the control system can change a first duty cycle of the first heating element.

Similarly, the control system may adjust the second heating rate of the second heating element. In one embodiment, the control system can change the second voltage and the second current. Additionally, or alternatively, the control system may also increase or decrease the second temperature. Optionally, the control system can change a second duty cycle of the second heating element.

The control system can optionally adjust an electric current provided to a heating element by a power source based on the amount of heating required for the container body. More specifically, the control system can adjust the operation of the heating element to account for a type of coating or ink on the container body. The control system may adjust the rate at which the heating element heats the container body. Additionally, or alternatively, the control system can increase or decrease the amount of heat the heating element provides to the container body.

In one embodiment, the control system can alter the electric current provided to the heating element to account for a rate of movement of a belt or a pin chain of the conveyor system. When the conveyor system is operating the belt or the pin chain at a first velocity, the control system can send a first signal to the power source to provide a first electric current to the heating element to heat the container body at a first rate. Alternatively, when the conveyor system is operating the belt or the pin chain at a second velocity that is slower than the first velocity, the control system can send a second signal to the power source to provide a second electric current such that the heating element heats the container body at a second rate that is slower than the first rate. Moreover, if the conveyor system stops or is operating the belt or the pin chain a third velocity that is slower than a predetermined velocity, the control system can send a stop signal to the power source. In response to the stop signal, the power source will stop providing the electric current to the heating element to prevent damage to the coating or ink on the container body.

In one embodiment, the control system is operable to receive data from the sensor related to the temperature of a container body proximate to the second heating element. When the container body temperature is above a predetermined amount, the control system can decrease the second temperature. Alternatively, when the temperature of the container body is below the predetermined amount, the control system can increase the second temperature.

The control system may also alter the rate of the fan of the ventilation system. In this manner the ventilation system can adjust the temperature of the air within the oven, or within a duct associated with a heating element.

The motor of the conveyor system can also be controlled by the control system. Accordingly, the control system can increase or decrease the rate of movement the belt or the chain of the conveyor system through the oven.

Another aspect of present disclosure is a novel pin for a pin chain. The pin is configured to fit into an open end of a container body and hold container body in a predetermined orientation. In one embodiment, the pin includes a plurality of projections that contact an interior surface of the container body to stabilize the container body. The projections may be flexible. The projections contact the interior surface at a plurality of different locations.

In one embodiment, the projection is formed of a metal. Additionally, or alternatively, the projection may comprise a polymer.

One aspect of the present disclosure is to provide an oven for heating a metallic workpiece. The oven generally includes, but is not limited to: (1) an enclosure with a hollow interior; (2) a conveyor system including a conveyor to transport the metallic workpiece through the hollow interior of the enclosure at a predetermined velocity; (3) a motor operably connected to the conveyor system; (4) a heating element within the enclosure that is positioned proximate to the conveyor, the heating element operable to heat the metallic workpiece to a predetermined temperature; (5) a power source to provide electrical current to the heating element to impart heat to the metallic workpiece; and (6) a ventilation system to remove air from the enclosure.

In embodiments, the heating element is an induction element with a coil to create an electromagnetic field and produce an eddy current in the metallic workpiece.

Additionally, or alternatively, in some embodiments the heating element is an infrared (IR) heating element with an IR emitter to heat the metallic workpiece.

In embodiments, the oven includes one or more of the previous embodiments and the heating element is a first heating element and the predetermined temperature is a first temperature. The oven optionally includes a second heating element downstream from the first heating element to heat the metallic workpiece to a second temperature that is greater than the first temperature.

In some embodiments, the power source is configured to provide alternating electrical current to the heating element at a frequency of between approximately 1 kHz and approximately 5 kHz.

In embodiments, the oven includes one or more of the previous embodiments and the oven optionally includes an adjustment device configured to move the heating element relative to the metallic workpiece.

In some embodiments, the conveyor system is configured to engage a closed endwall of the metallic workpiece. Alternatively, in another embodiment, the conveyor system is configured to engage an open end of the metallic workpiece.

In some embodiments, the conveyor system is configured to engage an interior surface of a metallic container.

Additionally, or alternatively, in some embodiments the conveyor system includes a chuck to engage the metallic workpiece.

In some embodiments, the conveyor system is configured to apply a vacuum or suction to releasably engage the metallic workpiece.

The oven optionally includes a vacuum pump.

Optionally, the conveyor is a pin chain.

In embodiments, the pin chain comprises a pin with a projection to hold or engage the metallic workpiece.

In some embodiment, the pin is configured to orient the metallic workpiece such that a longitudinal axis of the metallic workpiece is approximately horizontal when the metallic workpiece is proximate to the heating element.

In embodiments, the projection is a disc.

Additionally, or alternatively, the pin further comprises a plurality of projections that extend radially from the pin.

In embodiments, the oven includes one or more of the previous embodiments and the pin is operable to rotate the metallic workpiece around a longitudinal axis of the metallic workpiece.

In some embodiments, the oven includes one or more of the previous embodiments and further comprise a drive bar positioned to engage pins of the pin chain to rotate the pins.

Optionally, an adjustment device is configured to move the drive bar relative to the pin chain.

In one embodiment, the projection is formed of a metal. Additionally, or alternatively, the projection may comprise a polymer.

Alternatively, the conveyor is a belt. The belt may include a plurality of apertures.

Optionally, the conveyor system is configured to vibrate a metallic workpiece positioned on the belt. In some embodiments, the oven includes a vibration element in a predetermined alignment with respect to the belt.

In embodiments, the metallic workpiece is a container body of a metallic container. Optionally, at least a portion of the heating element is proximate to a closed endwall or an open end of the container body.

In some embodiments, the belt is positioned between the heating element and the metallic workpiece.

In one embodiment, the heating element is positioned above the belt. Additionally, or alternatively, in another embodiment, a heating element may be positioned below at least one loop of the belt.

In some embodiments, the metallic workpiece is one of an automotive part, an aircraft part, and a metal tool.

Optionally, the ventilation system is operable to keep air within the oven enclosure at a temperature that is less than a curing temperature required to cure the coating on the metallic workpiece while the oven is heating the metallic workpiece.

Alternatively, in some embodiment, the ventilation system is operable to keep air within the oven enclosure at a temperature that is less than a drying temperature required to dry moisture on the metallic workpiece.

In embodiments, the ventilation system is operable to maintain air within the oven enclosure at a temperature of between approximately 80° F. and approximately 450° F. In embodiments, the ventilation can maintain the temperature in the oven at a temperature of between 70° F. and approximately 325° F. when the oven is in operation heating metallic workpieces to a predetermined temperature, such as a curing temperature or a drying temperature.

In embodiments, the oven includes one or more of the previous embodiments and the ventilation system is further operable to vent air from the oven to maintain the air temperature of air within the oven at a temperature that is less than one or more of the curing temperature and the drying temperature. In some embodiments, the curing temperature is between approximately 350° F. and approximately 390° F. In other embodiments, the drying temperature is between approximately 200° F. and approximately 350° F.

Optionally, the ventilation system includes a duct associated with the heating element. In one embodiment, the ventilation system only removes air from the enclosure that is within the duct. Accordingly, air within the enclosure that is not within the duct is not moved by the ventilation system.

In embodiments, the oven includes one or more of the previous embodiments and further comprises a control system.

The control system is operable to send a signal to the power source to alter the electric current provided to the heating element.

In embodiments, the signal causes the heating element to heat the metallic workpiece at a predetermined rate.

In embodiments, the signal specifies one or more of a frequency, a voltage, a duty cycle, and a duration of the electric current the power source will provide to the heating element.

In some embodiments, the control system can send a signal to the power source which causes the heating element to heat the metallic workpiece to a predetermined temperature.

The oven optionally includes one or more of the previous embodiments and the control system is further operable to send a signal to the power source to alter the electrical current provided to the heating element based on one or more of: (a) a velocity of the conveyor relative to the heating element; (b) a distance between an exterior surface of the metallic workpiece and the heating element; (c) a thermal conductivity of the metallic material of the metallic workpiece; (d) a predetermined rate of heating of the metallic workpiece; (e) a temperature to which the metallic workpiece will be heated; and (f) a type of coating or a type of fluid on the metallic workpiece.

In some embodiments, the signal specifies one or more of a frequency, a voltage, a duty cycle and a duration of the electric current the power source provides to the heating element.

Additionally, or alternatively, the oven includes one or more of the previous embodiments and the further comprises a sensor positioned downstream from the heating element determine a temperature of the metallic workpiece.

The oven can include any one or more of the previous embodiments and the control system is optionally operable to send a signal to the motor of the conveyor system to alter a velocity at which the conveyor moves the metallic workpiece through the oven.

In some embodiments, the control system can send a signal to an adjustment device associated with the drive bar to move the drive bar relative to the conveyor system. In this manner, the control system is operable to start, stop, or adjust one or more of an amount and a duration of rotation of the metallic workpiece.

The oven optionally includes any one or more of the previous embodiments, and the control system is further operable to send a signal to an adjustment device to move the heating element relative to the conveyor system.

In embodiments, the oven may include one or more of the previous embodiments and further comprises a sensor to measure a level of volatile organic compounds (VOCs) in the oven.

In some embodiments, the control system can send a signal to a motor associated with a fan of the ventilation system to adjust a volume of air expelled from the enclosure to maintain the level of VOCs in the air in the oven to a predetermined amount.

In embodiments, the ventilation system is operable to maintain the level of VOCs in the air in the oven to a between approximately 1% and approximately 30% below a predefined lower explosive level (LEL).

Another aspect of the present disclosure is a method of heating a metallic workpiece, comprising: (1) positioning the metallic workpiece on a conveyor of a conveyor system; (2) moving the metallic workpiece on the conveyor into an enclosure of an oven that includes: (a) a heating element within the enclosure that is positioned proximate to the conveyor system; (b) a power source to provide electrical current to the heating element; and (c) a ventilation system to remove air from the enclosure; (3) providing electrical current from the power source to the heating element; and (4) moving the metallic workpiece past the heating element at a predetermined velocity such that the heating element heats the metallic workpiece to a predetermined temperature.

In embodiments, the conveyor is an endless loop.

In some embodiments, the endless loop is a belt.

In other embodiments, the endless loop is a pin chain.

In one embodiment, the metallic workpiece includes a coating. The coating may be positioned on an exterior surface or on an interior surface of the metallic workpiece. Alternatively, a fluid (such as water) is on the metallic workpiece.

In one embodiment, the heating element is an induction element with a coil that generates an electromagnetic field. The electromagnetic field produces an eddy current in the metallic workpiece to heat the metallic workpiece.

Additionally, or alternatively, the heating element is an infrared (IR) heating element with an IR emitter that heats the metallic workpiece.

The method may include one or more of the previous embodiments and optionally the heating element is a first heating element and the predetermined temperature is a first temperature. The oven may further include a second heating element downstream from the first heating element that heats the metallic workpiece to a second temperature that is greater than the first temperature.

Optionally, air within the enclosure has a temperature that is less than a curing temperature required to cure a coating on the metallic workpiece or a drying temperature required to evaporate a fluid on the metallic workpiece. Accordingly, in embodiments, air within the oven enclosure is at a temperature of between approximately 80° F. and approximately 450° F. while the oven is heating the metallic workpiece.

The method may include one or more of the previous embodiments and further comprises adjusting, by the ventilation system, a rate at which air is removed from the enclosure to maintain air within the enclosure at a predetermined temperature that is less than one or more of a curing temperature and a drying temperature. In some embodiments, the curing temperature is between approximately 350° F. and approximately 390° F. In other embodiments, the drying temperature is between approximately 200° F. and approximately 350° F.

In one embodiment, the metallic workpiece is one of a metallic container, an automotive part, an aircraft part, a metal casting, and a metal tool. At least a portion of the heating element is optionally arranged proximate to a closed endwall or an open end of the metallic container body. In one embodiment, a heating element is positioned above a conveyor of the conveyor system. Additionally, or alternatively, a heating element may be positioned below a portion of the conveyor.

Optionally, the oven is one of a dry-off oven, a basecoat oven, a deco oven and an internal bake oven.

The method can include one or more of the previous embodiments and further comprises sending a signal from a control system to alter a component of the oven.

In embodiments, the signal from the control system causes an adjustment device to alter a position of a drive bar relative to the conveyor system. In this manner, the control system may adjust a rate of rotation of the metallic workpiece relative to the heating element.

Additionally, or alternatively, the signal from the control system causes an adjustment device to alter a position of the heating element relative to the conveyor system.

The method may include one or more of the previous embodiments and further comprise sending a signal from the control system to a motor associated with the conveyor system to alter a rate of movement of the metallic workpiece relative to the heating element.

Optionally, the control system can send a signal to the ventilation system to alter a volume of air expelled from the enclosure.

In embodiments, the signal from the control system causes the power source to alter the electric current provided to the heating element.

In embodiments, the signal causes the heating element to heat the metallic workpiece at a predetermined rate.

In embodiments, the signal specifies one or more of a frequency, a voltage, a duty cycle, and a duration of the electric current the power source will provide to the heating element.

In some embodiments, the control system can send a signal to the power source which causes the heating element to heat the metallic workpiece to a predetermined temperature.

In embodiments the method optionally includes one or more of the previous embodiments and the control system is further operable to send a signal to the power source to alter the electrical current provided to the heating element based on one or more of: (a) a velocity of the conveyor relative to the heating element; (b) a distance between an exterior surface of the metallic workpiece and the heating element; (c) a thermal conductivity of the metallic material of the metallic workpiece; (d) a predetermined rate of heating of the metallic workpiece; (e) a temperature to which the metallic workpiece will be heated; and (f) a type of coating or a type of fluid on the metallic workpiece.

In some embodiments, the signal specifies one or more of a frequency, a voltage, a duty cycle and a duration of the electric current the power source provides to the heating element.

The method may include one or more of the previous embodiments and further comprise measuring a level of volatile organic compounds (VOCs) in the oven.

In embodiments, the method further comprises sending a signal by the control system to the ventilation system of adjust the level of VOCs in the oven.

Optionally, the ventilation system is operable to maintain the level of VOCs in the air in the oven to a between approximately 1% and approximately 30% below a predefined lower explosive level (LEL).

Yet another aspect is to provide a non-transitory computer readable medium including instructions configured to cause a processor of a control system to perform a method of heating a metallic workpiece in an oven, comprising: (1) sending a first signal to a power source of the oven, the oven including: (a) an enclosure with a hollow interior; (b) a conveyor system comprising a conveyor to transport the metallic workpiece through the hollow interior of the enclosure; (c) a heating element within the enclosure and positioned proximate to the conveyor; and (d) the power source, the first signal causing the power source to provide a first electrical current to the heating element to heat the metallic workpiece to a predetermined temperature; (2) receiving a temperature of the metallic workpiece downstream from the heating element; and (3) sending a second signal to the power source when the temperature of the metallic workpiece is not the predetermined temperature, the second signal causing the power source to provide a second electric current to the heating element.

In embodiments, the heating element is one or more of an electric induction element and an electric infrared heating element.

In embodiments, the first signal specifies one or more of a frequency, a voltage, a duty cycle and a duration of the first electric current the power source provides to the heating element. The first signal optionally specifies a first duty cycle for the heating element.

Additionally, or alternatively, the second signal specifies one or more of the frequency, the voltage, a duty cycle and the duration of the second electric current the power source provides to the heating element. Optionally, the second signal specifies a second duty cycle for the heating element, the second duty cycle being different than the first duty cycle.

In embodiments, the non-transitory computer readable medium further comprises an instruction to send a signal to a motor operably connected to the conveyor system to alter a velocity at which the conveyor moves the metallic workpiece through the oven.

Optionally, the conveyor is an endless loop. In some embodiments, the conveyor is a pin chain. Alternatively, in another embodiment, the conveyor is a belt.

Optionally, the non-transitory computer readable medium includes an instruction to send a third signal to the power source of the oven to adjust a rate at which the heating element heats the metallic workpiece to account for the velocity at which the conveyor moves the metallic workpiece.

The non-transitory computer readable medium may include one or more of the previous embodiments and optionally includes an instruction to receive a temperature of air within the enclosure from a temperature measuring device.

When the air temperature within the enclosure is above an upper limit or below a lower limit, the processor can send a signal to a motor of a ventilation system to adjust a rate at which air is removed from the enclosure.

In some embodiments, the upper limit is less than less than a curing temperature required to cure a coating on the metallic workpiece. In this manner, the processor can maintain the air within the enclosure at a temperature that is less than the curing temperature. In one embodiment, the upper limit is approximately 350° F. Optionally, the upper limit is less than approximately 370° F.

Alternatively, the processor will maintain the air in the enclosure at less than a drying temperature required to dry a fluid on the metallic workpiece. In one embodiment, the drying temperature is between approximately 200° F. and approximately 400° F.

Optionally, the lower limit is a temperature required to prevent condensation of volatile organic compounds (VOCs) released by the coating on the metallic workpiece. In this manner, the processor can maintain the air within the enclosure at a temperature that is greater than the condensation point of the VOCs. In one embodiment, the lower limit is greater than 100° F.

The non-transitory computer readable medium optionally includes one or more of the previous embodiments and further comprises an instruction to adjust a rate of rotation of the metallic workpiece relative to the heating element.

In some embodiments, the processor can send a signal to an adjustment device to alter a position of a drive bar relative to the conveyor system.

Additionally, or alternatively, non-transitory computer readable medium further comprises an instruction to send a signal to an adjustment device to alter a position of the heating element relative to the conveyor system.

The non-transitory computer readable medium optionally includes one or more of the previous embodiments and further comprises sending an instruction to the ventilation system to alter a volume of air expelled from the enclosure. The instruction may alter a rate of rotation of a fan of the ventilation system.

In embodiments, the non-transitory computer readable medium includes one or more of the previous embodiments and the control system is further operable to send a signal to the power source to alter the electrical current provided to the heating element based on one or more of: (a) a velocity of the conveyor relative to the heating element; (b) a distance between an exterior surface of the metallic workpiece and the heating element; (c) a thermal conductivity of the metallic material of the metallic workpiece; (d) a predetermined rate of heating of the metallic workpiece; (e) a temperature to which the metallic workpiece will be heated; and (f) a type of coating or a type of fluid on the metallic workpiece.

In some embodiments, the signal specifies one or more of a frequency, a voltage, a duty cycle and a duration of the electric current the power source provides to the heating element.

One aspect of the present disclosure is an oven substantially as described herein. The oven may include one or more of the aspects and embodiments described herein.

Another aspect of the present disclosure is a method of heating a metallic workpiece in an oven substantially as described herein. The method may include one or more of the aspects and embodiments described herein.

Still another aspect is a non-transitory computer readable medium with instructions for a processor of a control system as described herein. The non-transitory computer readable medium may include one or more of the aspects and embodiments described herein.

Yet another aspect of the present disclosure is an oven with a heating means. In embodiments, the heating means comprises an induction element. In some embodiments, the heating means comprises an IR heating element.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The terms “metal” or “metallic” as used hereinto refer to any metallic material that may be used to form a container, including without limitation aluminum, steel, tin, copper, and any combination thereof.

Although generally referred to herein as a “container body” or a “metallic container,” it should be appreciated that the methods and apparatus described herein may be used to cure coatings or dry metallic workpieces of any size, shape, or type. In some embodiments, the metallic workpieces include without limitation a metallic beverage bottle, a metallic beverage container or can, an aluminum bottle, a two-piece container, a two-piece can, a can, an aerosol container, or a metal cup. A container body generally includes a closed endwall, a sidewall that may be generally cylindrical, and an open end. Optionally, the metallic workpieces can include an automotive part, an aircraft part, a metal casting, and a metal tool.

As used herein, a “container body” can be formed into a two-piece can or a metallic bottle.

References herein to “a coating” include one or more of an ink, a basecoat, a varnish, an exterior coating and similar coatings on an interior surface or an exterior surface of a container body.

The phrases “at least one,” “one or more,” and “and/or,” as used herein, are open-ended expressions that are both conjunctive and disjunctive in operation. For example, each of the expressions “at least one of A, B and C,” “at least one of A, B, or C,” “one or more of A, B, and C,” “one or more of A, B, or C,” and “A, B, and/or C” means A alone, B alone, C alone, A and B together, A and C together, B and C together, or A, B and C together.

The term “a” or “an” entity, as used herein, refers to one or more of that entity. As such, the terms “a” (or “an”), “one or more” and “at least one” can be used interchangeably herein.

Unless otherwise indicated, all numbers expressing quantities, dimensions, conditions, ratios, ranges, and so forth used in the specification and claims are to be understood as being modified in all instances by the term “about” or “approximately”. Accordingly, unless otherwise indicated, all numbers expressing quantities, dimensions, conditions, ratios, ranges, and so forth used in the specification and claims may be increased or decreased by approximately 5% to achieve satisfactory results. Additionally, where the meaning of the terms “about” or “approximately” as used herein would not otherwise be apparent to one of ordinary skill in the art, the terms “about” and “approximately” should be interpreted as meaning within plus or minus 5% of the stated value.

All ranges described herein may be reduced to any sub-range or portion of the range, or to any value within the range without deviating from the invention. For example, the range “5 to 55” includes, but is not limited to, the sub-ranges “5 to 20” as well as “17 to 54.”

The use of “including,” “comprising,” or “having” and variations thereof herein is meant to encompass the items listed thereafter and equivalents thereof as well as additional items. Accordingly, the terms “including,” “comprising,” or “having” and variations thereof can be used interchangeably herein.

It shall be understood that the term “means” as used herein shall be given its broadest possible interpretation in accordance with 35 U.S.C., Section 112(f). Accordingly, a claim incorporating the term “means” shall cover all structures, materials, or acts set forth herein, and all equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

Figure 1:
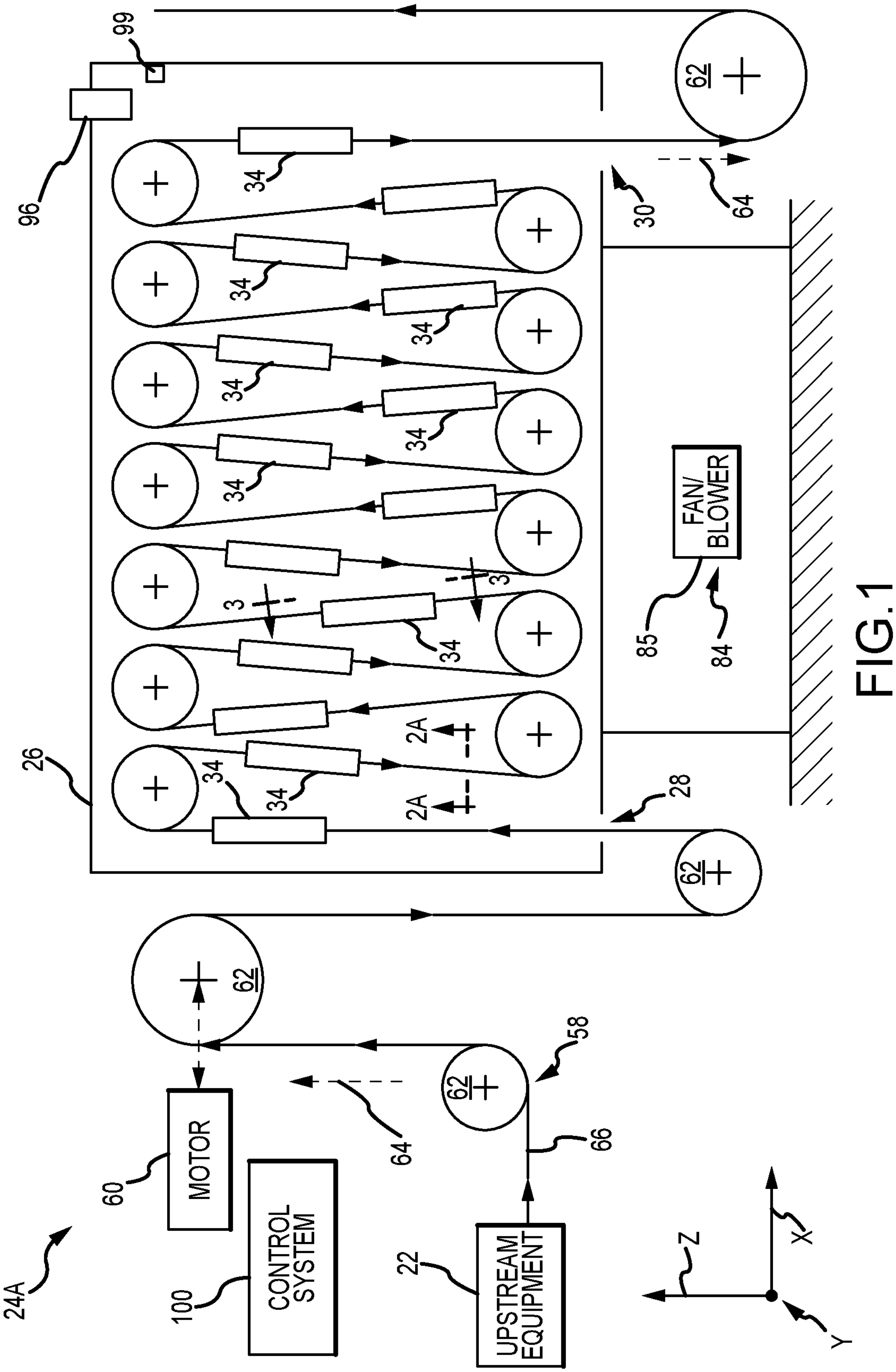
FIG. 1 is a cross-sectional front elevation view of an oven according to embodiments of the current disclosure.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment or one aspect may be combined with or substituted for features or devices of other embodiments or other aspects regardless of whether or not such a combination or substitution is specifically shown or described herein.

The following is a listing of components according to various embodiments of the present disclosure, and as shown in the drawings:

| Number | Component |
|---|---|
| 2 | Metallic container |
| 4 | Container body |
| 6 | Sidewall |
| 7A | Sidewall of body facing an adjacent container body |
| 7B | Sidewall of body rotated 90° from an adjacent container body |
| 8 | Exterior surface of container body |
| 10 | Hollow interior of container body |
| 12 | Interior surface of container body |
| 14 | Closed endwall (bottom) |
| 16 | Dome |
| 17 | Neck |
| 18 | Open end of the container body |
| 20 | Longitudinal axis of container |
| 22 | Upstream equipment |
| 23 | Downstream equipment |
| 24 | Oven |
| 26 | Enclosure |
| 28 | Entrance |
| 30 | Exit |
| 32 | Power source |

-continued

| Number | Component |
|---|---|
| 33 | Adjustment device |
| 34 | Heating element |
| 35 | Gap between adjacent heating elements |
| 36 | Induction element |
| 38 | Coils |
| 40 | Height |
| 42 | First distance from container body |
| 44 | Second distance from container end |
| 46 | IR element |
| 48 | IR emitter |
| 50 | Reflector |
| 52 | Cooler |
| 54 | Tube of cooler |
| 56 | Sensor to determined temperature of container bodies |
| 58 | Conveyor system |
| 60 | Motor |
| 62 | Roller, sprocket, or gear |
| 63 | Vibration element |
| 64 | First direction of conveyor system |
| 65 | Belt |
| 66 | Pin chain or belt |
| 67 | Perforations of belt |
| 68 | Link |
| 70 | Pin |
| 71 | Drive bar |
| 72 | Projection of pin |
| 74 | Medial portion |
| 76 | Free end |
| 77 | Pocket of belt |
| 78 | First diameter of pin |
| 79 | Protrusion on belt |
| 80 | Second diameter of pin |
| 82 | Central axis of pin |
| 84 | Ventilation system |
| 85 | Fan |
| 86 | Second direction of air circulation |
| 87 | Vapor handling |
| 88 | Duct |
| 89 | Vent, louver, or perforations of duct |
| 90 | Dome of duct |
| 92 | Base of duct |
| 94 | Slot for pins of pin chain |
| 96 | Temperature measuring device |
| 98 | Humidity measuring device |
| 99 | VOC measuring device |
| 100 | Control system |
| 102 | Bus |
| 104 | CPU |
| 106 | Input devices |
| 108 | Output devices |
| 110 | Storage devices |
| 112 | Computer readable storage media reader |
| 114 | Communication system |
| 116 | Working memory |
| 118 | Processing acceleration unit |
| 120 | Database |
| 122 | Network |
| 124 | Remote storage device/database |
| 126 | Operating system |
| 128 | Other code |
| 130 | Method of heating a container body |
| 132 | Start |
| 134 | Receive type of ink or coating |
| 136 | Receive curing temperature |
| 138 | Configure oven for a production run |
| 140 | Receive temperature |
| 141 | Monitor conditions in the oven enclosure |
| 142 | Determine whether to adjust setting of oven |
| 144 | Receive status of conveyor system |
| 146 | Determine whether to continue method |
| 148 | Stop |
| 150 | Hot spot |
| 152 | Cold spot |

DETAILED DESCRIPTION

Referring now to FIGS. 1-5, an oven 24A is provided according to embodiments of the present disclosure and as generally illustrated. The oven 24A includes heating elements 34 which are powered with electricity to heat container bodies of metallic containers to dry moisture, cure a coating, and/or cure an ink. The electricity may optionally be provided by a renewable source, such as solar or wind energy.

The oven 24A generally includes an enclosure 26 with heating elements 34 that use electricity to heat container bodies 4 as they are transported by a conveyor system 58. In embodiments, the conveyor system includes an endless loop, such as a belt or a pin chain 66. Optionally, the oven 24A includes a control system 100.

In embodiments, the heating elements 34 of the present disclosure are positioned within a conventional pin oven. Alternatively, the heating elements 34 are positioned within a novel enclosure 26 of the present disclosure.

The enclosure 26 can be of any size or shape. In embodiments, the enclosure includes an entrance 28 and an exit 30.

The enclosure 26 can be positioned downstream from upstream equipment 22 in a metallic container production facility. In embodiments, the upstream equipment 22 is a washer and the oven 24 is a dry-off oven configured to dry a fluid, such as water, used to clean the container bodies. In other embodiments, the upstream equipment is an exterior coater and the oven 24 is a basecoat oven configured to cure a basecoat applied to the container bodies. In still other embodiments, the upstream equipment 22 is a decorator and the oven 24 is a deco oven configured to cure inks and varnish applied to an exterior surface of the container bodies. Optionally, the upstream equipment is an interior coater and the oven 24 is an internal bake oven configured to cure the interior coating.

The conveyor system 58 includes a motor 60 that drives the belt or pin chain 66 to move the container bodies 4 through the enclosure 26 at a variable rate. Any suitable motor known to those of skill in the art can be used with the oven 24 of the present disclosure. Optionally, the motor 60 is a servo motor. In embodiments, the control system 100 can send signals to the motor to stop or alter the rate of movement of the belt or pin chain 66. The belt 66 optionally defines an endless loop. Optionally, the belt 66 follows a serpentine path through the enclosure 26. For example, as generally illustrated in FIG. 1, the belt 66 may include segments oriented generally upwardly (relative to the Z-axis) and segments oriented generally downwardly. In embodiments, the conveyor system 58 includes a plurality of rollers, sprockets, or gears 62. The pin chain 66 may change direction at the rollers or gears 62.

Alternatively, in other embodiments, the belt 66 is oriented generally parallel to a horizontal plane defined by the X-axis and the Y-axis. In still other embodiments, the belt 66 follows a generally linear path. Other configurations and orientations of the belt 66 and the conveyor system 58 are contemplated. The X-axis, Y-axis, and Z-axis or substantially orthogonal to each other.

In embodiments, the motor 60 moves the belt 66 of the conveyor system 58 at a rate of between approximately 10 ft/sec and approximately 30 ft/sec. Optionally, the motor 60 drives the belt 66 at between approximately 20 ft/sec and approximately 25 ft/sec. In this manner, the belt 66 can transport between approximately 1,800 and approximately 5,200 containers per minute through the oven 24.

In some embodiments, the conveyor system 58 is configured to transport the container bodies 4 past the heating elements 34 in a single row (or single file). The conveyor system 58 may include a vacuum or suction system to releasably engage the container bodies.

In embodiments, the conveyor system 58 is operable to selectively rotate the container bodies 4 around their longitudinal axes 20. In this manner, the sidewall 6 of a container body 4 may rotate relative to an adjacent heating element. Testing performed by Applicant indicates rotating the container sidewall relative to an adjacent heating element may improve heating of a container body by reducing the size of hot spots and cold spots to substantially uniformly heat the container body.

Optionally, the belt 66 is configured to engage a closed endwall 14 or an open end 18 of a container body 4 to prevent unintended or inadvertent movement as the belt of the conveyor system 58 transports the container body through the oven enclosure 26. In some embodiments, the belt 66 includes a vacuum or suction system to releasably engage the container bodies.

Additionally, or alternatively, the belt 66 may include a chuck or other tool known to those of skill in the art to engage a portion of a container body. Optionally, the chuck selectively moves to an engaged position to releasably engage the container body. Thereafter, the chuck moves to a released position and the container body can separate from the belt.

In some embodiments, the belt includes a bearing and a rotatable portion to engage a container body. In this manner, the container bodies may selectively rotate around their longitudinal axes 20 relative to the belt 66.

Optionally, the belt 66 of the conveyor system 58 includes a projection or pin 70 to engage a container body. Accordingly, in some embodiments, the belt is a pin chain 66.

Figure 2A:
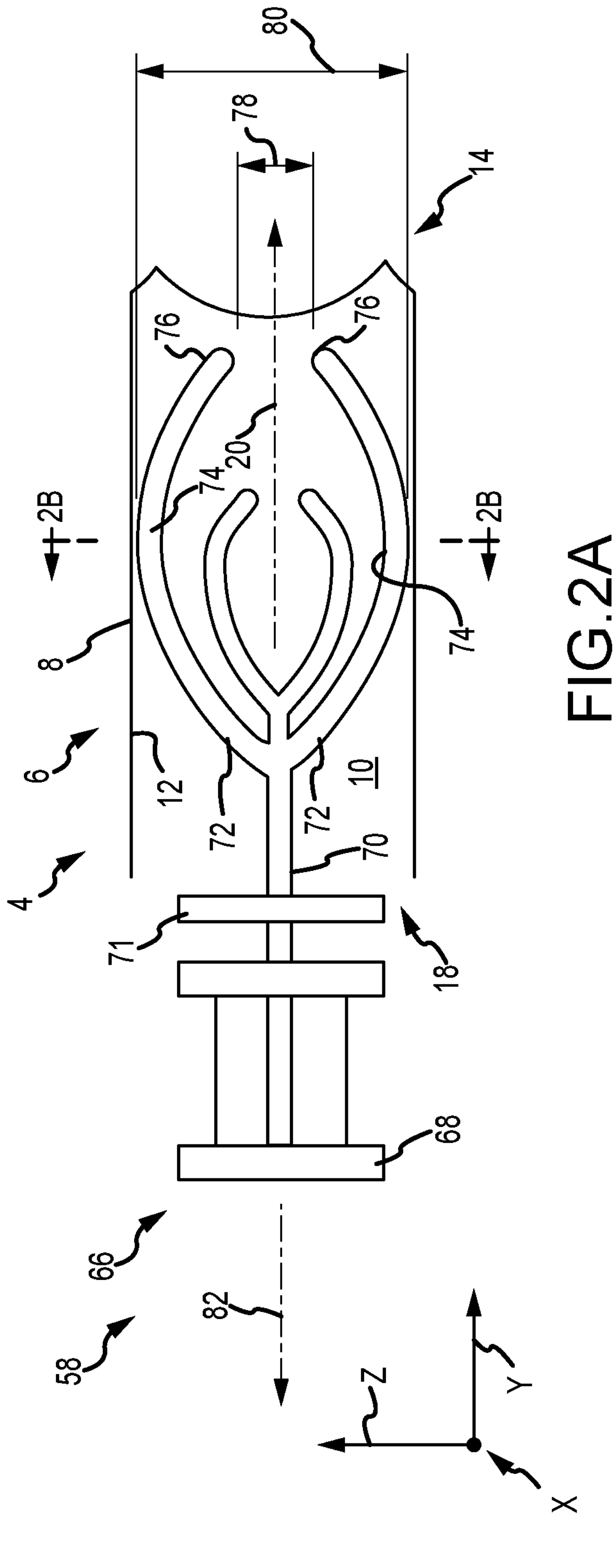
FIG. 2A is an expanded cross-sectional view taken along line 2A-2A of FIG. 1 that illustrates a container body positioned on a pin of a pin chain according to embodiments of the present disclosure.
Figure 2B:
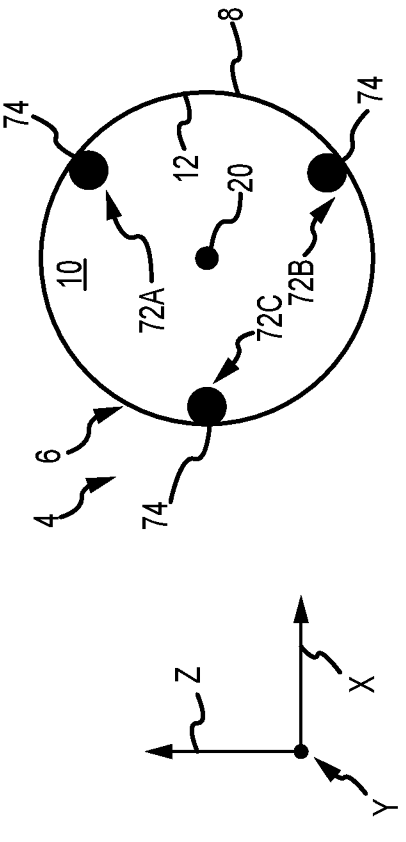
FIG. 2B is a cross-sectional view of the container body taken along line 2B-2B of FIG. 2A illustrating projections of the pin contacting an interior surface of the container body.
Figure 2C:
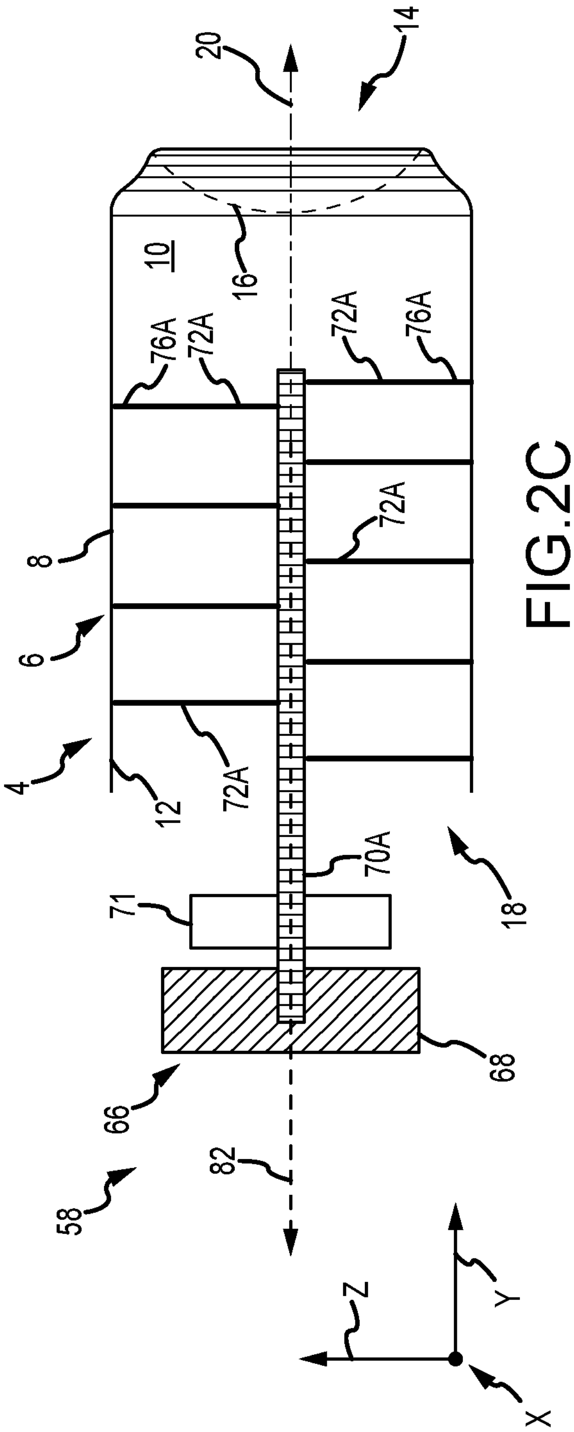
FIG. 2C is a cross-sectional view of a container body supported by a pin with projections according to embodiments of the present disclosure.
Figure 2D:
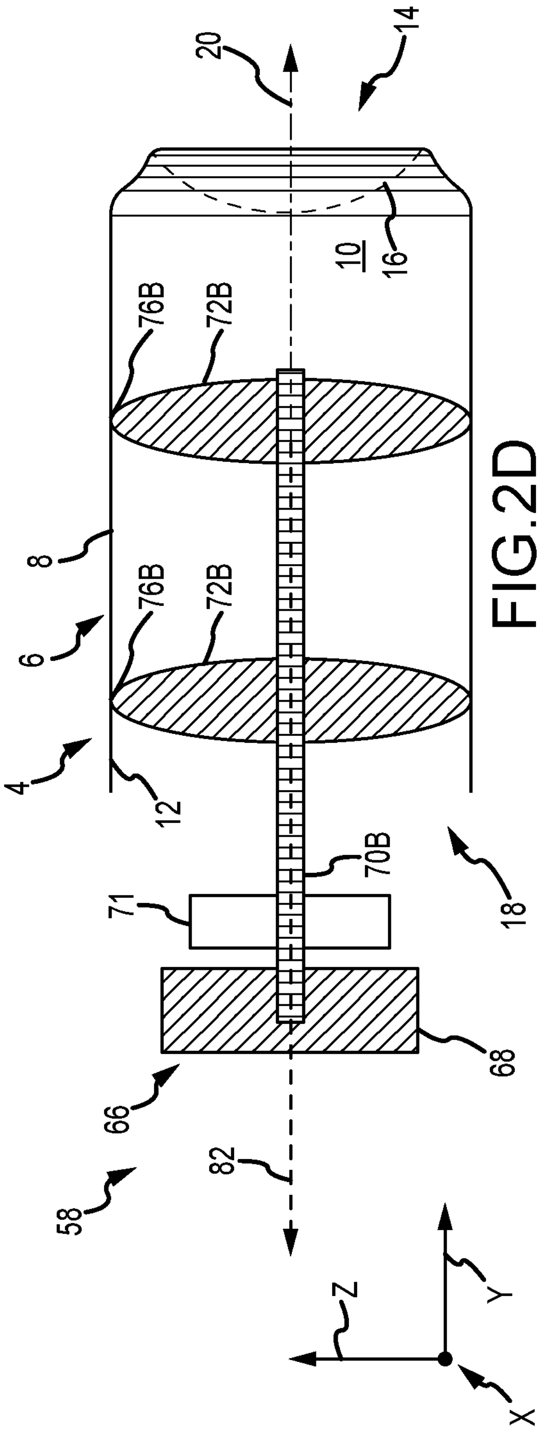
FIG. 2D is another cross-sectional view of a pin with round projections extending from a pin of still other embodiments of the present disclosure.
Figure 3:
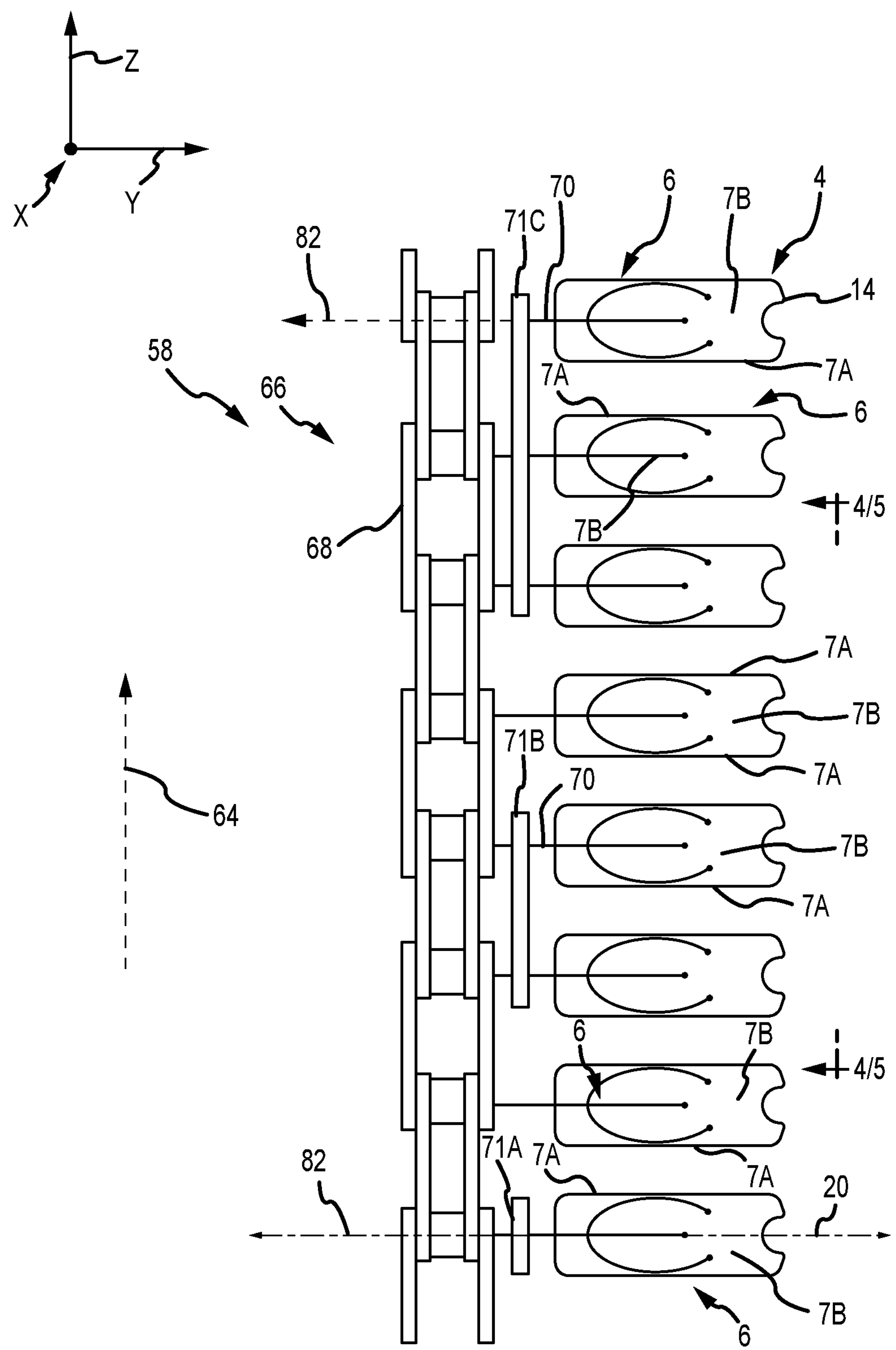
FIG. 3 is another expanded cross-sectional view taken along line 3-3 of FIG. 1 illustrating container bodies transported through the oven by the pin chain.

Referring now to FIGS. 2-3, in embodiments, the pin chain 66 optionally includes links 68 and pins 70 configured to engage the container bodies 4. Each pin 70 is configured to fit into an open end 18 of a container body 4. Optionally, the pins 70 are configured to apply a vacuum or suction to an interior surface 12 of a container body 4 to releasable interconnect the container body to the pin chain. Additionally, or alternatively, the pins 70 may be generally cylindrical.

The pins 70 are substantially evenly spaced on the pin chain 66. In embodiments, the pins 70 have a spacing of between about 3 inches and about 9 inches. Optionally the spacing between adjacent pins 70 is approximately 5.25 inches. Other distances between pins 70 of the pin chain are contemplated.

In some embodiments, the pins 70 are rotatable relative to the pin chain 66. In this manner, a pin 70 may selectively rotate around its central axis 82. Optionally, the pin chain 66 includes a clutch or a brake to selectively stop or adjust a rate of rotation of a pin.

Optionally, the conveyor system 58 includes drive means to rotate the pins. In embodiments, the drive means comprises a friction drive. For example, the conveyor system 58 may include a friction bar or drive bar 71 position to engage pins 70 of the pin chain 66.

The drive bar 71 is optionally moveable relative to the conveyor system. For example an adjustment device may be associated with the drive bar 71. In some embodiments, the adjustment device can move the drive bar 71 into a position for engagement with a pin of the pin chain. Additionally, the drive bar 71 can move the drive bar 71 out of the path of the pins 70. In some embodiments, the control system 100 can send a signal to the adjustment device to move the drive bar. The adjustment device may be the same as or similar to the adjustment device 33 described herein in conjunction with FIGS. 6A to 7B.

The drive bar 71 has a predetermined length extending in the Z-dimension of FIG. 2A. In embodiments, the drive bar 71 is substantially stationary relative to the pin chain 66. Accordingly, as a pin 70 of the pin chain moves in the Z-dimension and engages the drive bar 71, the pin chain rotates around its central axis 82 (or around a Y-axis) and rotates an engaged container body 4 around its longitudinal axis 20. In embodiments, the pin 70 includes a cylindrical portion that engages the drive bar 71.

The drive bar 71 may have any desired length. For example, and referring now to FIG. 3, a drive bar 71A may have a length sufficient to engage one pin 70 of the pin chain. Additionally, or alternatively, a drive bar 71B optionally is configured to engage two or more pins 70. In some embodiments, a drive bar 71C can engage three or more pins 70.

The conveyor system 58 may have any number of drive bars 71. Optionally, the conveyor system 58 has from one to four drive bars 71. Additionally, or alternatively, the conveyor system 58 may have at least one drive bar 71 associated with each heating element 34.

Referring now to FIGS. 2A-2B, each pin 70 optionally includes projections 72. In embodiments, the projections 72 hold the container body 4 approximately horizontal. More specifically, each pin 70 is configured to orient a longitudinal axis 20 of the container body 4 approximately parallel to the Y-axis as the metallic container is transported through the oven 24. Optionally, the longitudinal axis 20 of the container body is oriented approximately coaxially with a central axis 82 of the pin 70.

Alternatively, the projections 72 hold the container body in a different orientation. For example, the projections of the pin 70 may hold the container body approximately vertically. Regardless of the orientation of the container body, in embodiments the pin 70 and its projections 72 are adapted to hold the container body stable and substantially motionless relative to the pin.

In embodiments the pin 70 includes two or more projections 72. In some embodiments, the pin 70 includes three projections 72. The projections 72 have a length that extends in the direction of the Y-axis.

The projections 72 are configured to fit into the open end 18 of the container body 4 and contact an interior surface 12 of the container body 4. The pins 70 are adapted to prevent inadvertent or unintended movement of the container bodies 4 during transport through the oven 24.

The projections 72 may be formed of any suitable material. In embodiments, the projections comprise one or more of a polymer, a ceramic, a plastic, a rubber, and a metal. In other embodiments, the projections are formed of a metal. Alternatively, the projections are formed of a polymer. The material of the projections is selected to withstand high heat and is non-combustible. An exterior surface of each projection is adapted to contact the container body without scratching or damaging coatings or the material of the container body.

In embodiments, the pins 70 and/or the projections 72 are formed of a material that is non-conductive. Additionally, or alternatively, the pins and/or the projections may be formed of a non-magnetic material. In this manner, the pins and/or projections of some embodiments of the present disclosure will not be heated by an induction element 36 of the present disclosure.

In embodiments, the projections 72 have a curved or arcuate length. Optionally, a medial portion 74 of the projections 72 is adapted to contact the interior surface 12 of a container body.

A free end 76 of the projections may be proximate to a closed end 14 of the container body when the metallic container is positioned on the pin 70. In embodiments, the free end 76 is spaced from the closed end 14. Alternatively, the free end 76 contacts the closed end when the metallic container is supported by the pin 70.

In embodiments, the pin 70 has a first diameter 78 defined by the free ends 76 of the projections. The first diameter 78 is less than an interior diameter of the open end 18 of the container body 4. The pin 70 optionally has a second diameter 80 defined by the medial portions 74 of the projections. The second diameter is approximately equal to an interior diameter of the container body. In embodiments, the second diameter is greater than the first diameter.

In embodiments, when the container body 4 is engaged by a pin 70, two or more projections 72 of the pin contact different portions of the interior surface 12 of the container body. The projections 72 may be spaced around the longitudinal axis 20 of the container body 4 as generally illustrated in FIG. 2B.

FIG. 2B generally illustrates pins 72A, 72B, 72C with medial portions 74 generally contacting the container interior surface 12 along a plane defined by the X-axis and Z-axis. However, in other embodiments, the medial portions of the pins are spaced along the Y-dimension when in contact with the container interior surface 12. Optionally, the projections 72 have different lengths such that the medial portions 74 are spaced apart in the Y-dimension. Accordingly, when the projections contact the container interior surface, the medial portions 74 are spaced along the height of the container body.

Contact by the pin 70 at two or more portions of the interior surface 12 helps stabilize the container body 4 and reduces or prevents inadvertent movement of the container body relative to the pin 70 and the pin chain 66. In this manner, the pin 70 and its projections 72 prevent the container body 4 from contacting portions of the oven or equipment within the oven. In contrast, some prior art pins for pin chains allow the metallic containers to move relative to the pins. Moreover, the prior art pins may hold the metallic containers such that a longitudinal axis of the container is not horizontal and is not coaxial with the pin axis.

The projections 72 may be generally rigid. Alternatively, projections may be flexible. For example, the projections 72 may bend inwardly to fit through the open end 18 of the metallic container and then bend outwardly to beneficially engage the interior surface of the container body.

Optionally, the projections 72 are movable. For example, in embodiments the projections may have a retracted position (not illustrated) and an extended position (generally illustrated in FIG. 2A). In the retracted position, the second diameter 80 of the pin defined by the widest part of the projections is less than the interior diameter of the open end 18. When the projections 72 are in the extended position, the maximum exterior diameter of the pin 70 is approximately equal to the interior diameter of the container body.

In embodiments, the pin 70 is configured to rotate the container body 4 around the container longitudinal axis 20 as the pin chain 66 transports the container body through the oven 24. In this manner, the sidewall 6 of the container body will be evenly exposed to heating elements 34 of the oven and uniformly heated.

Referring now to FIG. 2C, a pin 70A with projections 72A according to another embodiment of the present disclosure is generally illustrated. In embodiments, the projections 72A extend generally radially from the pin 70A and along a portion of the pin. For example, the pin 70A may include a plurality of projections 72A that extend away from the pin in the X-dimension and the Z-dimension similar to the bristles of bottle brush. The projections 72A may optionally be approximately perpendicular to the central axis 82 of the pin. The projections have distal ends 76 that contact the interior surface 12 of the container body at a plurality of positions along the longitudinal axis 20 of the container body 4. The projections 72A may be flexible and formed of any suitable material as described herein for the projections 72.

Referring now to FIG. 2D, in other embodiments, the projections 72B may be generally round or disc shaped. Optionally, a projection 72B can have a spherical shape, similar to a ball. In embodiments, each pin 70B has a first projection 72B that extends a first depth into the container body 4 and a second projection 72B that projects a second different depth into the container body. The first and second projections are spaced apart along the pin 70B. In this manner, a distal end or outer circumference 76B of each projection 72B contacts the interior surface 12 of the container body at a different position along the longitudinal axis 20 to stabilize the container body on the pin 70B.

FIG. 3 generally illustrates container bodies 4 transported through the oven 24 by the pin chain 66. In some embodiments, the container bodies 4 are positioned on the pin chain 66 such that a portion 7A of the sidewall 6 of each container body faces a portion 7A of the sidewall of two adjacent container bodies. More specifically, the sidewall portion 7A faces in (or opposite to) the first direction 64 of the conveyor system. Another portion 7B of the container body is rotated approximately 90° away from the adjacent container bodies. In this manner, the body portion 7B is at least temporarily oriented facing a heating element 34 as generally illustrated in FIGS. 4A, 4B, 5A, and 5B.

Figure 4B:
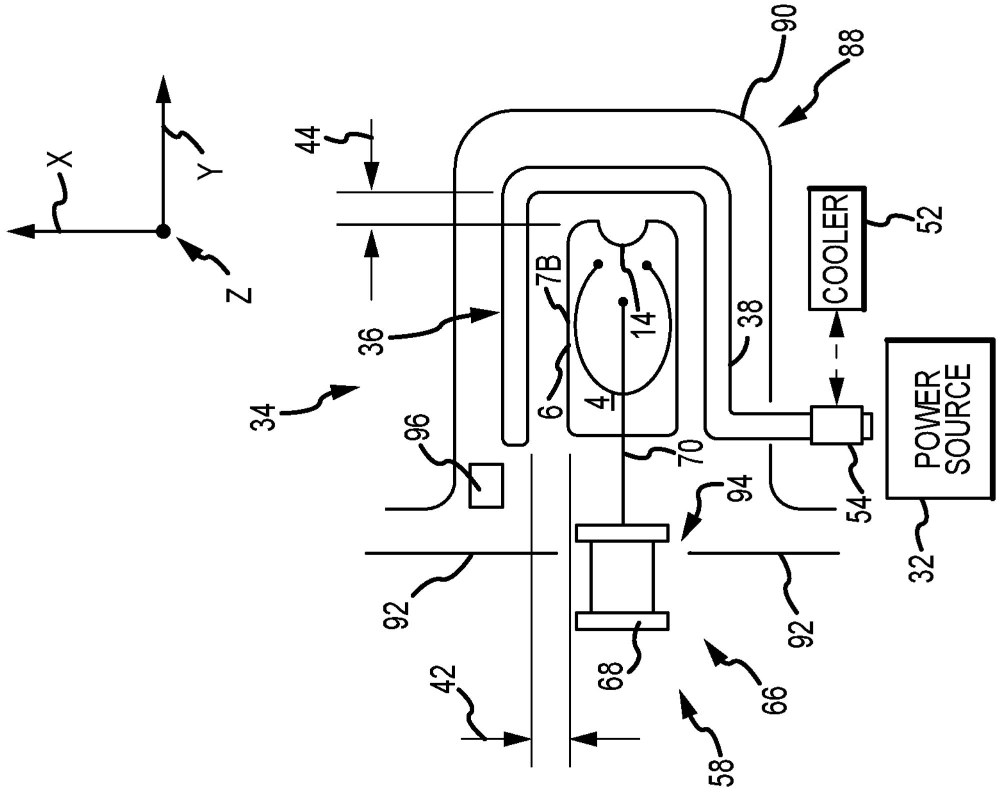
FIG. 4B is a partial top view taken along line 4B-4B of FIG. 4A and generally illustrates a container body passing through the heating element and also showing an optional duct tunnel of a ventilation system.
Figure 4A:
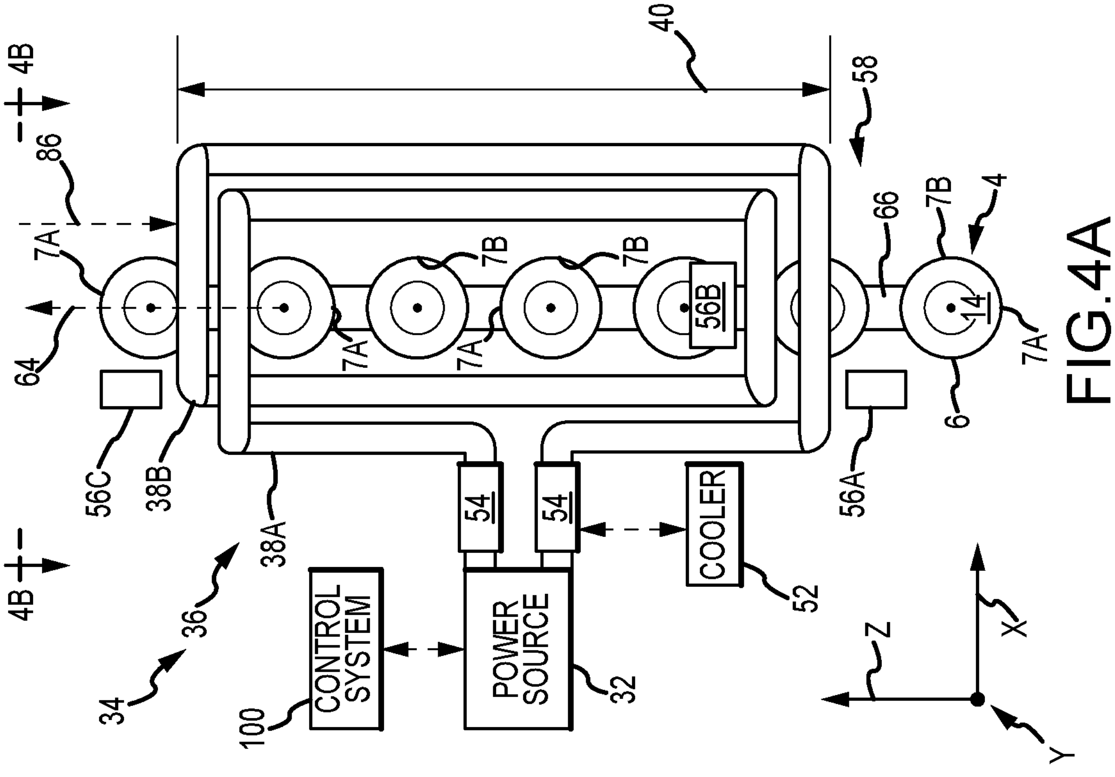
FIG. 4A is a partial side elevation view of container bodies passing through a heating element of the oven according to embodiments of the present disclosure and taken along line 4-4 of FIG. 3.

Referring now to FIGS. 4A-4B, a heating element 34 of the oven 24 according to embodiments of the present disclosure is generally illustrated. The heating element 34 comprises an induction element 36. In embodiments, the induction element 36 includes an electromagnet and optionally an electronic oscillator.

The induction element includes one or more segments 38 connected to a power source 32 that supplies an electric current to the coils. The segments may optionally be coils 38. Electricity flowing through the coils 38 creates an electromagnetic field. As the pin chain 66 transports a container body 4 past the coils, the magnetic field induces eddy currents in the metallic material of the container body 4 to heat the container body. In this manner, the induction element 36 heats the container body directly. In contrast, conventional ovens use warm air in the oven to heat container bodies.

One benefit of the induction element 36 of the present disclosure is that the electromagnetic field and the induced eddy currents rapidly heat the container body. Another benefit is that heating of the container body 4 stops as soon as the induction element 36 is turned off.

The frequency, voltage, duty cycle and current of the electricity provided by the power source 32 to the induction element 36 are selected to produce an electromagnetic field with predetermined parameters. The parameters of the electric current provided by the power source 32 can be adjusted depending upon the amount of heating required for the metallic container. For example, the heating requirements (such as the curing temperature) for a container body or other metallic workpiece depend upon the types of coatings, including one or more of the type of ink, the color of the ink, and the type of varnish. The parameters of the electric current may also be adjusted based on one or more of: a thickness of a metallic material of a container body 4, a mass of the container body, a rate at which the container body will be heated, a rate of movement of the container body relative to the induction element, a rate of rotation of the container body around its longitudinal axis relative to the induction element, a distance of an exterior surface of the container body from the induction element 36, and a thermal conductivity of the metallic material of the container body.

In embodiments, the control system 100 can send a signal to the power source 32 to change one or more of the frequency, voltage, duty cycle and current to alter electromagnetic field. The control system 100 can adjust the amount, type, and duration of electric current provided to the induction element 36. In this way, the control system 100 can adjust the rate of heating and the amount of heat the induction element provides to the container body to account for a type of coating or a type of ink on the container body, the material of the container body (such as the type of metallic material and the mass of the container body), and a rate of movement of the conveyor 58 (or the pin chain 66) (and the container body) relative to the induction element.

In embodiments, the power source 32 provides a high frequency alternating electric current to the induction element 36. Optionally, the frequency of the electric current is between approximately 60 Hz and approximately 30,000 Hz. In some embodiments, the frequency is between approximately 1 kHz and approximately 5 kHz, or about 3 kHz. In embodiments, the current is 3-phase. In other embodiments, the voltage is between approximately 200 volts and approximately 800 volts.

The electromagnetic field rapidly heats the metallic material of the container body 4 to a predetermined curing temperature required to cure coatings on the container body 4 or to dry fluid (such as water) on the container body. The heated metallic material then heats and cures inks and other coatings, including varnish, on the container body. In this manner, the induction element 36 heats the container body first and the container body then heats the inks and other coatings to the curing temperature. Heating the coatings from the container body out (rather than by convection as in a prior art oven) is beneficial because it reduces bubble formation and skinning of the coatings.

Because the induction element 36 heats the container body directly, air within the oven 24 can be at a lower temperature then the curing temperature required to cure the coatings. In embodiments, the curing temperature is between approximately 350° F. to approximately 410° F. In other embodiments, the curing temperature is approximately 370° F., or approximately 390° F. In some embodiments, the curing temperature is less than or equal to 400° F. The induction elements 36 of the present disclosure can be set to heat a container body 4 to a different predetermined curing temperature depending upon the types of inks and coatings on the container body.

Because the air within the oven 24 of the present disclosure is not used to heat the inks and coatings, the air in the oven can be at a temperature that is lower than the curing temperature. For example, in embodiments, air within the enclosure 26 of the oven 24 of the present disclosure can have a temperature of less than approximately 325° F., or between approximately 70° F. and approximately 325° F.

In embodiments, the air in the oven is maintained at a temperature between a predetermined minimum temperature and a predetermined maximum temperature. Optionally, the predetermined maximum temperature is approximately 325° F.

In embodiments, the predetermined minimum temperature is the temperature at which VOC's released from the container bodies as the inks and coatings are heated will condense. More specifically, the predetermined minimum temperature is selected to keep VOC's in a gaseous or vapor state and to prevent VOC's from condensing within the oven.

A temperature measuring device 96 may be positioned within the oven 24 to determine the temperature of air within the oven enclosure 26. Any suitable temperature measuring device 96 may be used. In embodiments, the temperature measuring device 96 is one or more of a thermometer, a thermistor, and a thermocouple. The optional control system 100 may receive data from the temperature measuring device.

Maintaining air in the oven 24 below the curing temperature provides many benefits. First, energy (such as a fossil fuel) is not used to heat a large mass of air to the curing temperature. This also reduces waste heat the is radiated from the oven 24 to the container production facility.

Another benefit of maintaining air within the oven 24 below the curing temperature is reduction or elimination of spoilage if the conveyor system 58 stops. More specifically, in embodiments, when the pin chain 66 stops, the power source 32 will stop supplying electricity to the induction element 36. The induction element 36 will stop creating an electromagnetic field and will not heat the container bodies 4. As a consequence, container bodies on the pin chain 66 within the oven will only be exposed to air below the curing temperature. During the time the conveyor system 58 and its pin chain 66 are stopped, the inks and coatings on the container bodies will not be heated excessively. Curing of the inks and coatings can be completed when the conveyor system 58 is activated at which time the power source 32 can begin supplying electricity to the induction element 36. Accordingly, decorations and coatings on the container bodies 4 within the oven 24 when the conveyor system 58 is stopped will not be damaged.

Moreover, because the air within the enclosure 26 does not have to be maintained at the curing temperature, air within the enclosure 26 can be vented at a high rate to remove volatile organic compounds (VOCs) released by inks and/or coating on the container bodies as they are heated. For example, the air in the enclosure 26 of the oven 24 may optionally be completely vented by a ventilation system 84 of the present disclosure every 10 minutes. Additionally, or alternatively, air within a duct 88 associated with a heating element 34 can be rapidly vented by the ventilation system 84. In this manner, the ventilation system 84 can quickly remove VOCs before the VOCs cool, condense, and drip onto the container bodies.

Optionally, only air in the enclosure 26 that is within a duct 88 is vented by the ventilation system 84. Accordingly, in embodiments, air within the enclosure that is not in a duct 88 is not vented or moved by the ventilation system 84. This is beneficial because reducing the volume of air moved by the ventilation system reduces the amount of power consumed by the ventilation system.

In contrast, in prior art ovens, hot air within the oven heats from the outside in: the hot air heats the ink or outer coating first and then the container body. It follows that air within a prior art oven must be at least equal to the curing temperature required to cure coatings on a container body. For example, some prior art ovens heat the air to between 390° F. to 425° F. or to an even higher temperature. The requirement to maintain air within a prior art oven at or above the curing temperature also limits the ability to vent VOCs from the oven. More specifically, if air within the prior art oven is vented too fast, the temperature of the air in the oven will fall below the curing temperature and the inks and coatings on the container bodies will not cure properly.

The ducts and venting within some prior art ovens take up a large amount of space, increasing the size of the oven and floor space required for the oven. Moreover, some prior art ovens include complex and costly heat exchangers to facilitate ventilation while attempting to maintain the temperature of air within the oven at or above the curing temperature. These features of ventilation systems of prior art ovens also increase the complexity and decrease the reliability of the prior art pin ovens. The ventilation systems also create noise and increase energy consumed by the ovens.

In embodiments, the induction element 36 can heat the container body 4 from an initial temperature to a predetermined temperature, such as the curing temperature, in less than about 20 seconds. Optionally, the induction element 36 can heat the container body 4 to the predetermined temperature in from approximately 1 millisecond to approximately 15 seconds.

In some embodiments, the induction element can heat a container body to approximately 400° F. in between approximately 0.4 seconds and approximately 5.5 seconds. For example, the induction element can heat the container body to approximately 400° F. in between approximately 0.4 seconds and approximately 0.8 seconds, or in approximately 0.6 seconds. Additionally, or alternatively, the induction element may heat the container body to approximately 400° F. in between approximately 4.5 seconds and approximately 5.5 seconds, or in approximately 4.9 seconds.

A sensor 56 to determine the temperature of a container body 4 may be associated with the induction element 36. Additionally, or alternatively, the sensor 56 may be associated with the conveyor system 58. For example, the sensor 56 may be associated with a pin 70 of a pin chain 66.

In some embodiments, the sensor 56 is in communication with the control system 100 which receives temperature data from the sensor. Any suitable sensor 56 known to those of skill in the art can be used to determine the temperature of the container body. In embodiments, the sensor 56 is capable of measuring the temperature without contacting the container body 4. The sensor may be one or more of a pyrometer, an infrared thermometer, a laser thermometer, and an optical thermometer.

Optionally, the induction element 36 includes a plurality of temperature sensors 56. A first sensor 56A may be positioned upstream from the coils 38 of the induction element 36 to determine an initial temperature of a container body. A second sensor 56B can optionally be positioned downstream from the first sensor 56A. In embodiments, the second sensor 56B is positioned downstream from one or more coils 38 of the induction element to measure an increase in temperature of the container body 4. Additionally, or alternatively, a third sensor 56C is positioned downstream from the induction element 36 to determine a final temperature of the container body 4 as it leaves the induction element 36. The position and arrangement of the sensors 38 may vary.

The oven 24 may include a cooler 52 for the induction element 36. The cooler 52 is configured to keep the induction element from exceeding a set temperature.

In embodiments, the cooler 52 includes a hose or tube 54 associated with at least a portion of a coil 38 of the induction element. The tube 54 is configured to hold a fluid in contact with the coil 38. The fluid may be water or another suitable coolant. Optionally, the tube 54 covers a substantial portion of the coils of the induction element.

The cooler 52 may include a pump to circulate the fluid around the coil. A thermometer may be positioned to measure the temperature of the fluid. In embodiments, the control system 100 can send a signal to the pump to alter the rate of circulation of the fluid to maintain the temperature of the induction element below the set temperature.

Optionally, the coils 38 include an internal lumen. A fluid from the cooler 52 may flow through the lumen to maintain the temperature of the coils below the set temperature.

In embodiments, one induction element 36 is used to heat the container body 4 to the curing temperature. Alternatively, the oven 24 includes a plurality of induction elements 36 to gradually or incrementally heat the container body to the curing temperature.

The size and geometry of the coils 38A, 38B of the induction element 36 determines the shape of the electromagnetic field. Accordingly, the coils of the induction element have a geometry to generate an electromagnetic field of sufficient size and strength to heat the container body. The coils 38 of the induction element 36 are configured to be close to exterior surfaces of a container body 4 transported by the pin chain 66.

The induction element 36 has a height 40 (relative to the Z-axis). In embodiments, the height 40 of the induction element 36 is at least equal to a diameter of a container body 4. In embodiments, the height is up to about eight times the diameter of a container body. In this way, two, three, four or more container bodies 4 may be positioned within the height 40 of the induction element 36 as generally illustrated in FIG. 4A. The coils 38 are configured to allow the pin chain 66 and a single row of container bodies 4 to pass proximate to (or through) the induction element 36.

The conveyor system 58 moves the container bodies 4 past the induction element 36 in a first direction 64. Optionally, the ventilation system 84 circulates air past the induction element in the first direction. Alternatively, the ventilation system 84 circulates air past the induction element in a second direction 86 that is generally opposite to the first direction.

As generally illustrated in FIG. 4B, in embodiments the coils 38 extend along the sidewall 6 and a closed endwall 14 of a container body 4 transported by the pin chain 66. Other configurations and orientations of the coils are contemplated.

In embodiments, the coils 38 are configured to be a first distance 42 from the sidewall 6 of the container body. The first distance 42 is less than approximately 1 inch. In embodiments, the first distance 42 is between approximately 0.04 inches and approximately 1 inch. Optionally, the first distance is between approximately 0.05 inch and approximately 0.2 inches.

In other embodiments, the coils 38 are configured to be a second distance 44 from the closed endwall 14 of the container body. The second distance 44 is less than approximately 1 inch. In embodiments, the second distance 44 is between approximately 0.04 inches and approximately 1 inch. Optionally, the second distance is between approximately 0.05 inch and approximately 0.2 inches.

Optionally, the induction element 36 is moveable relative to the conveyor system 58. Accordingly, in some embodiments, one or more of the first and second distances 42, 44 can be adjusted. In this manner, the position of the induction element may be adjusted to account for container bodies 4 of different sizes and shapes. Moreover, the position of the induction element 36 may be adjusted relative to the container body to account for the shape of the electromagnetic field generated by the induction element.

Optionally, an actuator or adjustment device is operably engaged with the induction element. The adjustment device can optionally move the induction element 36 in one or more of the X-dimension, the Y-dimension, and the Z-dimension. In some embodiments, the control system 100 can send a signal to the adjustment device to move the induction element in one or more directions. The adjustment device may be the same as or similar to the adjustment device 33 described herein in conjunction with FIGS. 6A to 7B.

FIG. 4B also illustrates an optional duct 88 of the ventilation system 84. The duct 88 prevents VOCs released by the inks and coatings from moving freely within the oven enclosure 26. More specifically, the duct 88 is adapted to catch or contain the VOCs. The VOCs can then be vented from the oven by the ventilation system 84. The duct 88 reduces the volume of air that the ventilation system 84 must handle. In this manner, the duct 88 makes control of exhaust from the induction element easier, decreases the cost of operating the ventilation system, and improves efficiency of the oven 24.

Optionally, a temperature measuring device 96 is positioned within the duct 88 to measure the temperature of air within the duct. The control system 100 can receive data from the temperature measuring device 96 and alter the rate of a ventilation fan 85 to adjust the temperature of the air within the duct. The control system 100 can adjust the operation of fan 85 of the ventilation system as necessary to keep the air temperature below a predetermined level or within a predetermined rage. In embodiments, the control system 100 can send a signal to a motor of the fan 85 to adjust the air temperature in the duct and prevent condensation of VOCs and drips of the VOCs onto a container body 4.

In embodiments, the duct 88 generally defines a tunnel. Optionally, the tunnel of the duct 88 is substantially closed and extends around the coils 38 of the induction element 36.

In embodiments, the duct 88 includes a dome or cover 90. The cover 90 has an interior raceway through which the container bodies pass. The induction element 36 fits within the interior raceway. In embodiments, a cross-section of the cover 90 is generally "C" shaped as generally illustrated in FIG. 4B. The cover 90 may include one or more apertures for a line to connect the power source 32 to the coils 38 of the induction element 36.

Optionally, the duct 88 includes a base 92 proximate to an open end of the cover 90. The base 92 may be sealed to the cover. In embodiments, the base 92 includes a slot 94 through which a container holder of the conveyor system 58 extends. In some embodiments, the container holder is a pin 70 of a pin chain 66.

In embodiments, the ventilation system 84 only moves air through the duct 88. More specifically, air within the oven enclosure 26 that is not in a duct is not moved by the ventilation system. Accordingly, the volume of air moved by the ventilation system 84 is less than for a prior art pin oven of a similar capacity. Moreover, in some embodiments, the oven 24 of the present disclosure requires less ducting and fewer fans or blowers than the prior art pin oven with the similar capacity.

Figure 4C:
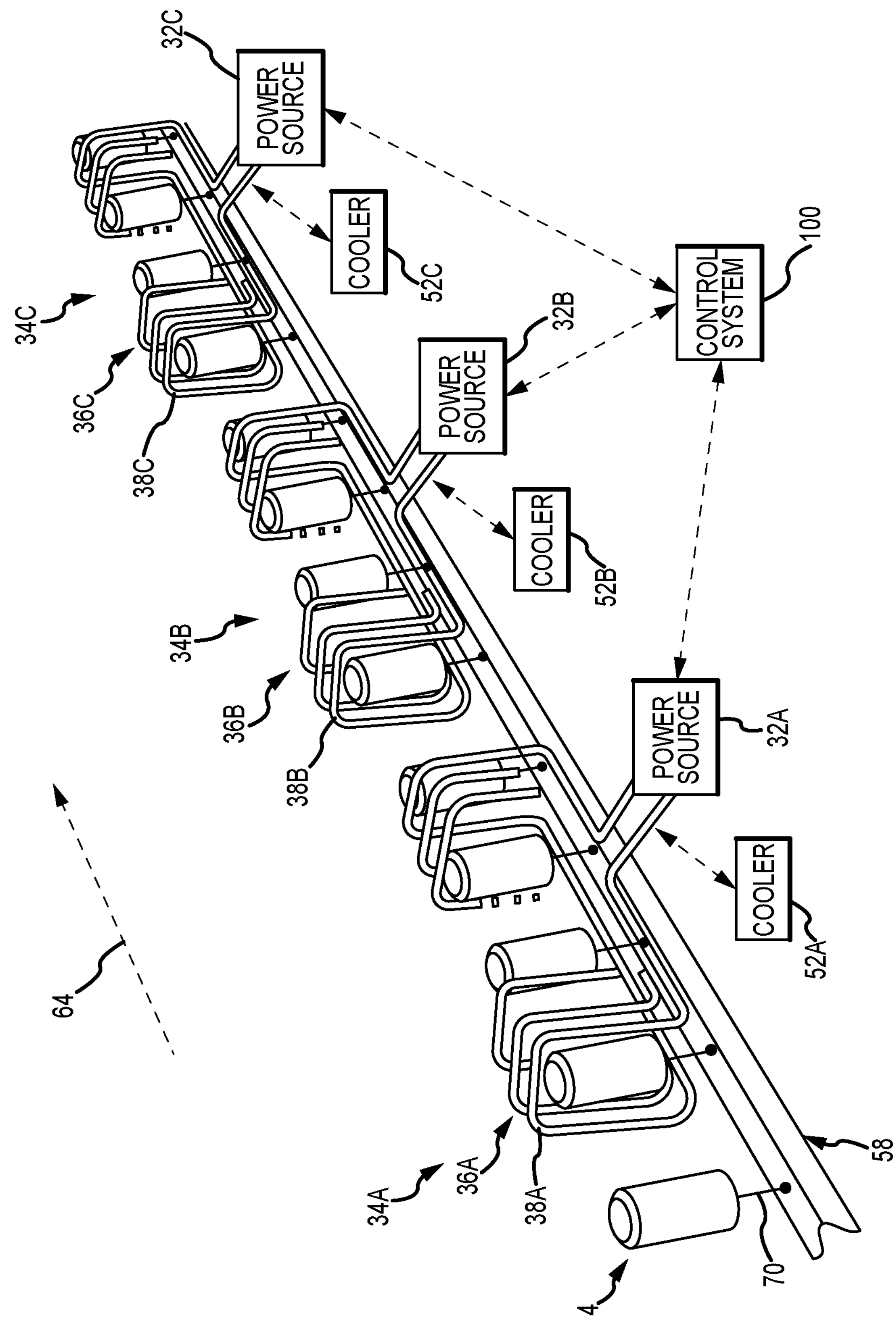
FIG. 4C is a perspective view of container bodies passing through a plurality of heating elements according to embodiments of the present disclosure.

Referring now to FIG. 4C, the oven optionally includes two or more induction elements 36 configured to incrementally heat the container body 4 to the curing temperature. The induction elements 36 are positioned sequentially along the pin chain 66 of the conveyor system 58. For example, a first induction element 36A is positioned upstream to a second induction element 36B and, optionally, to a third induction element 36C. The induction elements 36 are configured to heat the container bodies in steps up to the curing temperature. Although three induction elements 36 are shown in FIG. 4C, the oven 24 may include any number of induction elements. In embodiments, the oven 24 of the present disclosure has from 1 to 100 induction elements 36.

Optionally, each induction element is associated with a separate power source 32. In embodiments, the control system 100 can send signals to the power sources to adjust the electromagnetic field generated by each of the induction elements to alter the amount by which each induction element heats a container body. Additionally, or alternatively, the control system 100 can send a signal to adjust the duty cycle of an induction element 36.

The induction elements 36A, 36B, 36C can have the same configuration and geometry. Alternatively, the induction elements 36A, 36B, 36C may have a different size, shape, or configuration. Optionally, the induction elements can have the same number of coils 38, or a different number of coils. Further, a thickness or a diameter of a coil of one of the induction elements 36A, 36B, 36C may be different from a thickness or a diameter of a coil of a different one of the induction elements 36A, 36B, 36C. Additionally, or alternatively, a gauge of material forming a coil 38 may be the same or different in the induction elements 36A, 36B, 36C.

The control system 100 can modulate the power provided to the induction elements 36A-36C to adjust the rate of heating on the metallic container. In this way, the control system 100 can adjust the amount or rate of heating each induction element provides without damaging the ink and/or coating on the metallic container.

In embodiments, the first induction element 36A is configured to heat a container body 4 from an initial temperature to a first temperature. The initial temperature may be between approximately 60° F. and 120° F. In embodiments, the initial temperature is an ambient temperature, such as when the container enters the enclosure 26 through the entrance 28. The first temperature is optionally between approximately 130° F. and 180° F. Optionally, the first induction element 36A can heat the container body to the first temperature in from approximately 1 millisecond to approximately 15 seconds.

The second induction element 36B is configured to heat the container body from the first temperature to a second temperature that is higher than the first temperature. In embodiments, the second temperature is the curing temperature. Alternatively, the second temperature is less than the curing temperature. In embodiments, the second temperature is between approximately 180° F. and 280° F. The second induction element 36B is configured to heat the container body to the second temperature in from approximately 1 millisecond to approximately 15 seconds.

Optionally, the third induction element 36C is operable to heat the container body to a third temperature that is higher than the first and second temperatures. In embodiments, the third temperature is between approximately 280° F. and 400° F. The third temperature is optionally the curing temperature. Alternatively, the third temperature is less than the curing temperature. In embodiments, the third induction element 36C can heat the container body to the third temperature in from approximately 1 millisecond to approximately 15 seconds.

Figure 4E:
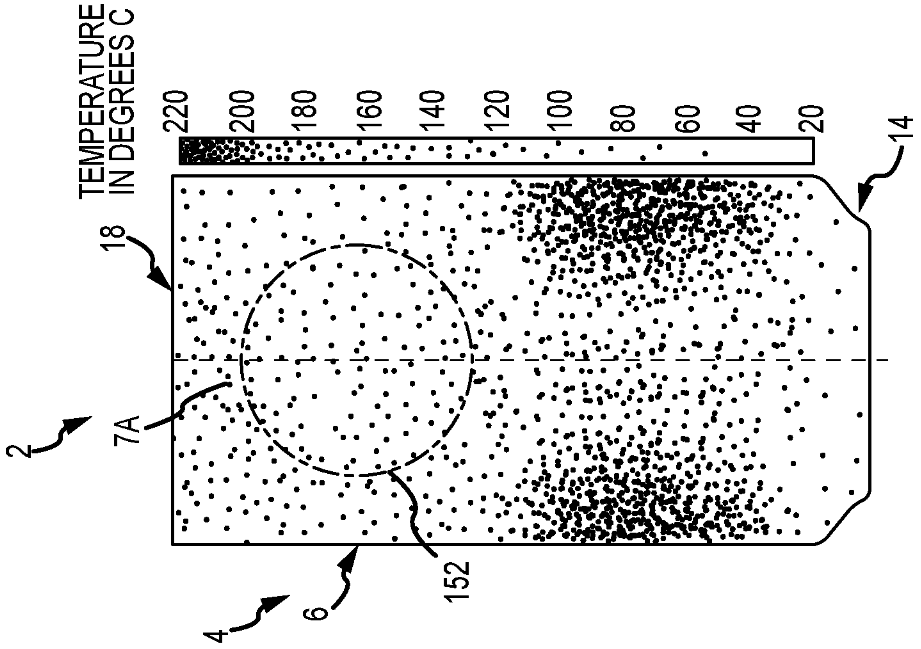
FIG. 4E is another heat map of the first metallic container of FIG. 4D illustrating the sidewall rotated 90° to show a second portion of the sidewall facing away from the induction element during the heating.
Figure 4D:
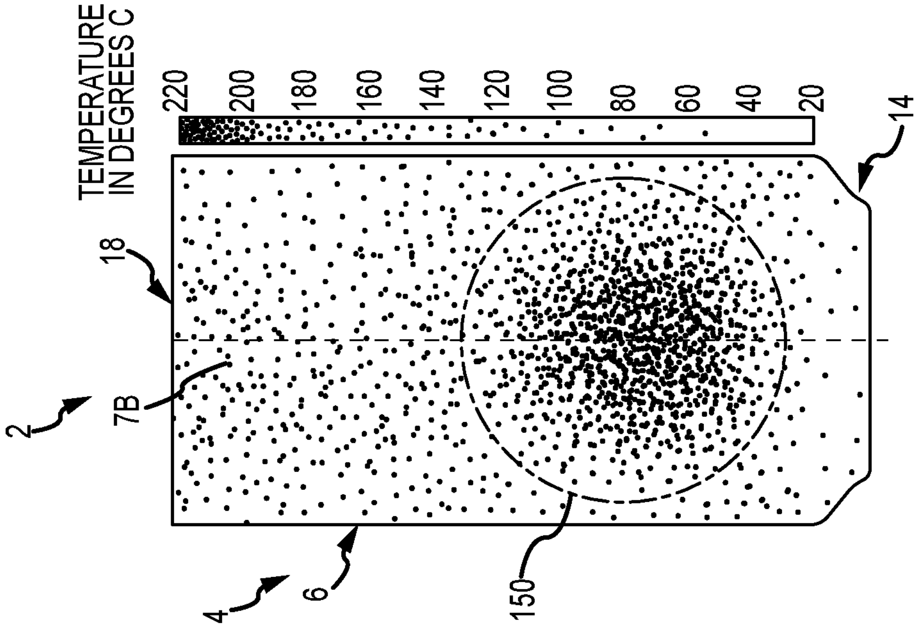
FIG. 4D is a heat map of a first metallic container heated by an induction element at a first rate to approximately 400° F. according to embodiments of the present disclosure and illustrating a first portion of the sidewall facing the induction element during the heating.

Referring now to FIGS. 4D-4E, heat maps of metallic containers 2 heated by an induction element 36 according to various embodiments of the present disclosure are illustrated. The heat maps were produced during modelling of ovens of the present disclosure using three-dimensional finite element analyses. In the modelling, the metallic containers are 12 oz beverage can bodies. The metallic containers are formed of an aluminum alloy with a thermal conductivity of approximately 230 Watts per meter-Kelvin (W/mK).

The metallic containers were positioned on a pin chain that did not rotate the container body around its longitudinal axis. Accordingly, the container bodies 4 were oriented with sidewall portions 7A facing an adjacent container body and sidewall portions 7B facing a portion of the induction element similar to the arrangement illustrated in FIG. 4A.

The metallic container 2 illustrated in FIGS. 4D and 4E was heated by the induction element to approximately 400° F. in approximately 0.6 seconds. The heatmaps of FIGS. 4D and 4E generally show that the metallic container was heated unevenly by the induction element. For example, FIG. 4D generally illustrates a hot spot 150 in the sidewall portion 7B that was facing the induction element during the heating. The hot spot 150 is proximate to a closed endwall 14 of the container body 4. In contrast, FIG. 4E shows a cold spot 152 proximate to the open end 18 on a portion 7A of the sidewall facing away from the induction element during the heating.

Without being bound to a particular theory, it is hypothesized that the uneven heating of the metallic container illustrated in FIGS. 4D and 4E is due to one or more of: (i) the static condition of the container body relative to the induction element; (ii) the rate of heating of the container body; (iii) differences in a thickness of the container body; (iv) the thermal conductivity of the material of the container body; and (v) variations in distances between portions 7A, 7B of the consider sidewall 6 relative to the induction element 36 during the heating. More specifically, and as one of skill in the art will appreciate, a metallic container 2 formed a DWI process frequently has a first thickness proximate to the closed endwall 14. Proximate to the open end 18, the metallic container may have a second thickness that is greater than the first thickness. The first thickness may be approximately 0.0036 inches while the second thickness may be approximately 0.0058 inches. Accordingly, the hot spot 150 may be caused by one or more of the thinner material near the closed endwall and the proximity of the sidewall portion 7B to the induction element. Because the container body was static in the modelling, the sidewall portion 7B remained proximate to the induction element while the sidewall portion 7A was rotated 90° away from the induction element throughout the heating by the induction element. The cold spot 152 may be explained by one or more of the thicker material near the open end 18 and an increased distance of the sidewall portion 7A from the induction element.

Figure 4F:
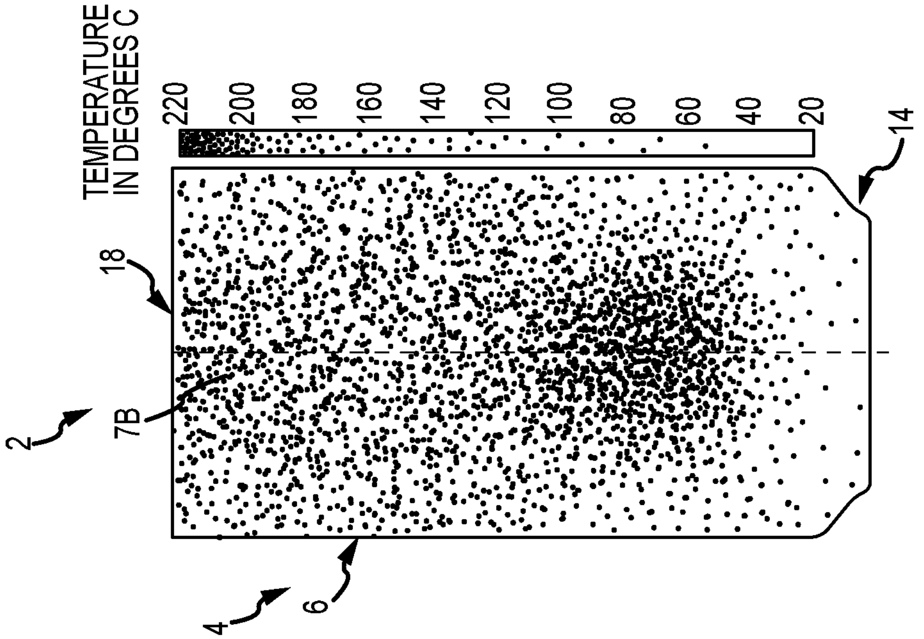
FIG. 4F is another heat map of a second metallic container heated by an induction element to approximately 400° F. at a second rate that is slower than the first rate according to embodiments of the present disclosure and illustrating a first portion of the sidewall facing the induction element during the heating.
Figure 4G:
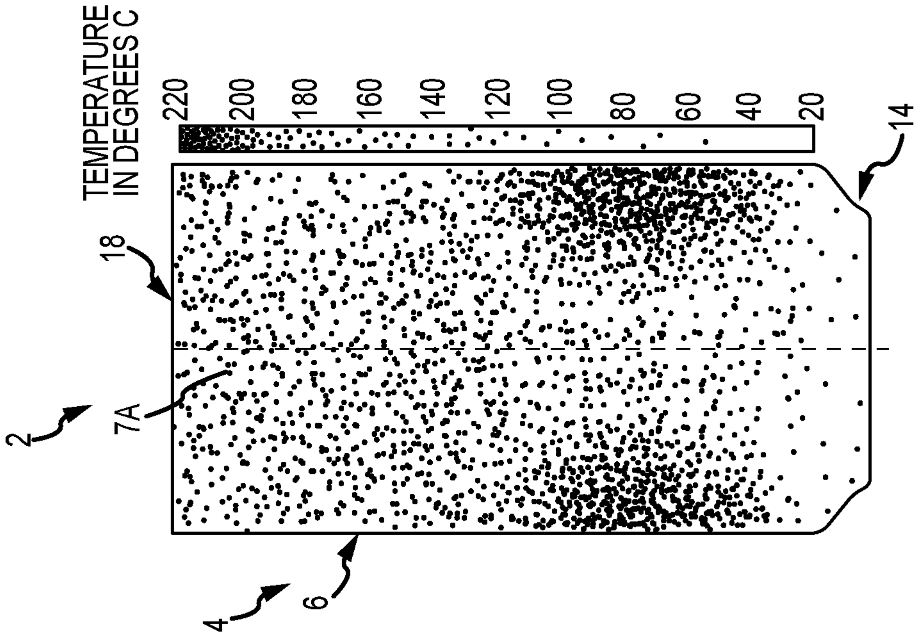
FIG. 4G is still another heat map of the second metallic container of FIG. 4F illustrating the sidewall rotated 90° to show a second portion of the sidewall facing away from the induction element during the heating.

Referring now to FIGS. 4F and 4G, the heatmaps were generated when the metallic container 2 was heated by the induction element to approximately 400° F. in approximately 4.9 seconds. As in the previous example, the metallic container 2 was held static during the heating by the induction element.

Notably, the heatmaps of FIGS. 4F and 4G show that the metallic container was substantially evenly heated on all sides by the induction element. More specifically, no localized hot spots or cold spots are shown in heatmaps in portions of the container sidewall 6 expected to be covered with a decoration that requires curing.

Figure 5B:
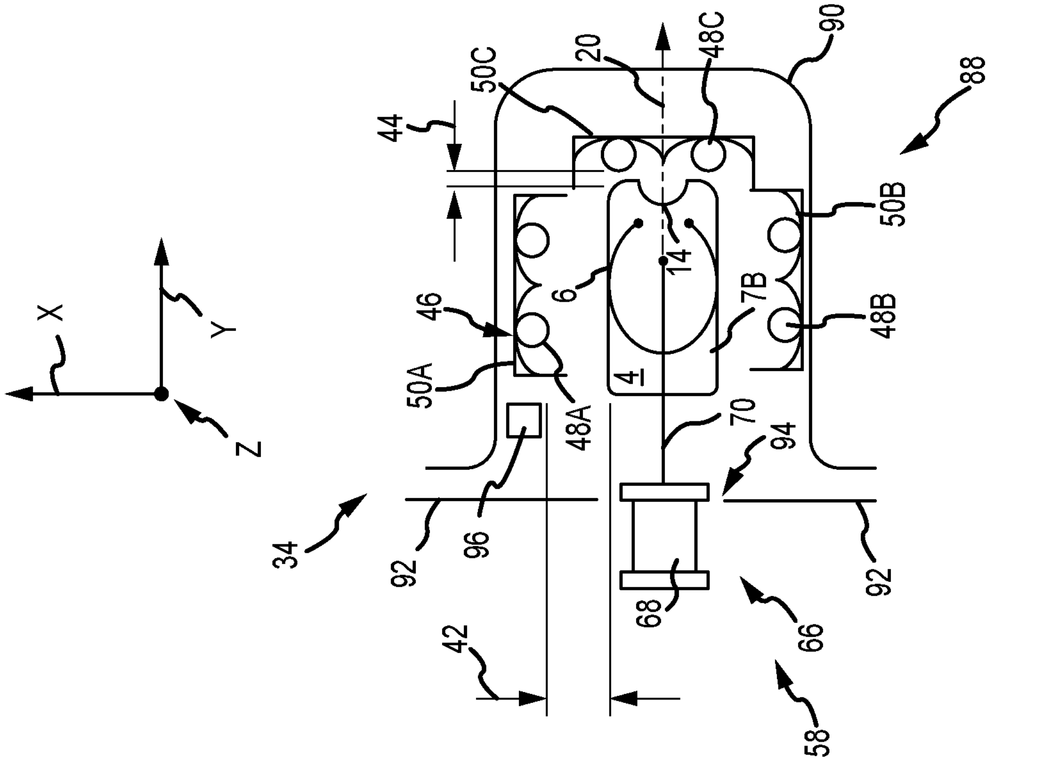
FIG. 5B is a partial top view taken along line 5B-5B of FIG. 5A and generally illustrates a metallic container passing through the heating element and also showing an optional duct tunnel of a ventilation system.
Figure 5A:
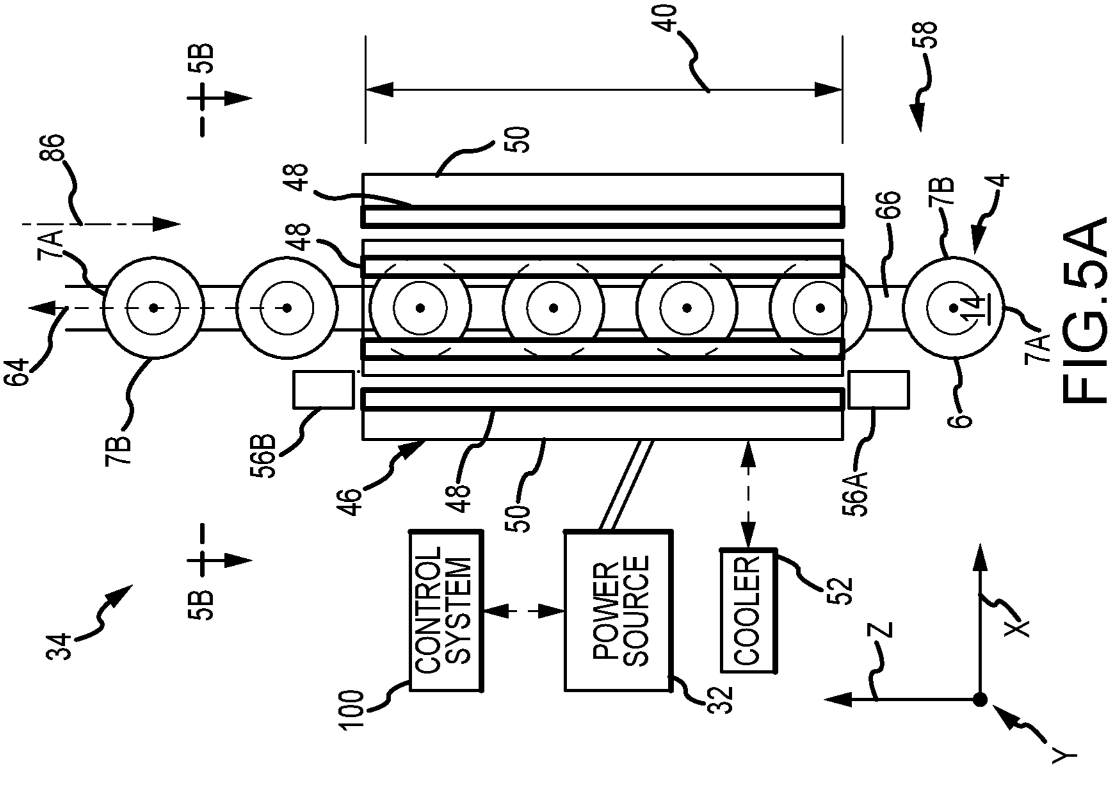
FIG. 5A is a partial side elevation view of container bodies passing through a heating element of embodiments of the present disclosure taken along line 5-5 of FIG. 3.

Referring now to FIGS. 5A-5B, another embodiment of a heating element 34 of the oven 24 is generally illustrated. The heating element 34 comprises an infrared (IR) or "near" IR element 46.

The IR element includes one or more IR emitter 48 connected to a power source 32 that supplies electricity. Electricity flowing through the IR emitter 48 generates heat due to resistance. As the conveyor system 58 transports a container body 4 past the IR emitter, heat radiating from the IR emitter heats the container body.

Any IR emitter known to one of skill in the art may be used with the ovens 24 of the present disclosure. The IR emitter 48 can be formed of any suitable material. In embodiments, the IR emitter is a short-wave emitter. Alternatively, the IR emitter is a carbon emitter. In embodiments, the IR emitter 48 includes a light bulb or similar device, including a light emitting diode (LED), that is operable to emit infrared radiation. The IR emitter is optionally a quartz heat lamp, such as a halogen lamp. Additionally, or alternatively, the IR emitter may be a quartz tungsten IR heater or a carbon heater with a carbon fiber.

IR emitters emit electromagnetic waves. Any IR emitter that generates electromagnetic waves at a wavelength that can be absorbed by the container bodies 4 or a material (such as an ink or coating) on the container body may be used with the ovens 24 of the present disclosure. In embodiments, the IR emitter 48 is selected to generate electromagnetic waves at a peak wavelength that maximize absorption and minimize reflection from the container bodies 4.

The frequency, voltage, and current of the electricity provided by the power source 32 to the IR element 46 are selected to heat the container body at a predetermined rate to a predetermined temperature. In embodiments, the control system 100 can send a signal to the power source 32 to change the frequency, voltage, and current supplied to the IR emitter to adjust the rate of heating or the amount of heating generated by the IR emitter 48. The control system 100 can adjust the amount, type, and duration of electric current provided to the IR element 46. Additionally, or alternatively, the control system 100 can send a signal to adjust the duty cycle of the IR element 46. In this way, the control system 100 can adjust the rate of heating and the amount of heat the IR emitter provides to the container body to account for a type of coating or a type of ink on the container body, a thickness of a material of the container body, the material of the container body (such as the type of metallic material and the mass of the container body), a rate of movement of the pin chain 66 (and the container body) relative to the IR element, a rate of rotation of the container body around its longitudinal axis relative to the IR element 46, a distance of an exterior surface of the container body from the IR element, and a thermal conductivity of the metallic material of the container body.

In embodiments, the electric current from the power source 32 is a high frequency alternating current. Optionally, the frequency of the electric current is between approximately 60 Hz and approximately 30,000 Hz. In some embodiments, the frequency is between approximately 1 kHz and approximately 5 kHz, or about 3 kHz. In embodiments, the current is 3-phase. In other embodiments, the voltage is between approximately 200 volts and approximately 800 volts.

The IR emitter 48 can be linear as generally illustrated in FIG. 5A. However, the IR emitter can have other shapes and configurations. In embodiments, the IR element 46 includes one or more IR emitter 48 formed into loops or curls.

In embodiments, the IR element 46 includes a reflector 50 proximate to the IR emitter 48. The IR emitter 48 is positioned between the container body and the reflector. The reflector 50 is adapted to direct heat inwardly toward the container body. In embodiments, the reflector comprises a metal or a ceramic material.

Optionally, the IR element 46 includes three or more IR emitters 48. Optionally, the IR emitters are arranged to heat one or more of a sidewall 6 and a closed endwall 14 of the container body substantially evenly. In embodiments, an IR emitter 48A is positioned on a first side of the container body, an IR emitter 48B is positioned on an opposite second side of the container body, and an IR emitter 48C is positioned proximate to the closed endwall 14 of the container body.

Similar to the induction element 36, the IR element 46 heats the container body directly. Accordingly, air within the oven 24 can be at a lower temperature then the curing temperature required to cure the coatings or dry the container body.

In embodiments, the IR element 46 is controlled by the control system 100. The control system 100 can send a signal to the power source 32 to stop supplying electricity to the IR element if the pin chain 66 stops. As a consequence, container bodies supported by the pin chain 66 proximate to the IR element within the oven 24 will not be heated by the IR element and the inks and coatings on the container bodies will not be overly heated. Accordingly, mobility enhancers, decorations and coatings on the container bodies 4 within the oven 24 when the conveyor system 58 is stopped will not be damaged.

In embodiments, the IR element 46 can heat the container body 4 from an initial temperature to a predetermined temperature, such as the curing temperature, in less than about 20 seconds. Optionally, the IR element 46 can heat the container body 4 to the predetermined temperature in from approximately 1 millisecond to approximately 15 seconds.

In embodiments, the IR element 46 can heat a container body to approximately 400° F. in between approximately 0.4 seconds and approximately 5.5 seconds. For example, the IR element can heat the container body to approximately 400° F. in between approximately 0.4 seconds and approximately 0.8 seconds, or in approximately 0.6 seconds. Additionally, or alternatively, the IR element may heat the container body to approximately 400° F. in between approximately 4.5 seconds to approximately 5.5 seconds, or in approximately 4.9 seconds.

A sensor 56 to determine the temperature of a container body 4 may be associated with the IR element 46. Additionally, or alternatively, the sensor 56 may be associated with the convenor system 58. For example, the sensor 56 may be associated with a pin 70 of a pin chain 66. The sensor 56 transmits temperature data to the control system 100. Any suitable sensor 56 known to those of skill in the art can be used to determine the temperature of the container body. In embodiments, the sensor 56 is capable of measuring the temperature without contacting the container body. The sensor may be one or more of a pyrometer, an infrared thermometer, a laser thermometer, and an optical thermometer.

Optionally, the IR element 46 includes a plurality of temperature sensors 56. A first sensor 56A may be positioned upstream from the IR element 46 to determine an initial temperature of a container body 4. Additionally, or alternatively, a second sensor 56B is positioned downstream from the IR element 46 to determine a final temperature of the container body 4 after moving past the IR element. The position and arrangement of the sensors 56 may vary.

The oven 24 may include a cooler 52 for the IR element 46. The cooler 52 is configured to keep the IR emitter 48 from exceeding a set temperature.

In embodiments, the cooler 52 includes a hose or tube associated with at least a portion of an IR emitter 48 of the IR element. The tube is configured to hold a fluid in contact with the IR emitter. The fluid may be water or another suitable coolant.

The cooler 52 may include a pump to circulate the fluid around the IR element. A thermometer may be positioned to measure the temperature of the fluid. In embodiments, the control system 100 can send a signal to the pump to alter the rate of circulation of the fluid to maintain the temperature of the IR element below the set temperature.

Optionally, the IR emitter 48 includes an internal lumen. A fluid from the cooler 52 may flow through the lumen to maintain the temperature of the coils below the set temperature.

In embodiments, one IR element 46 is used to heat the container body 4 to the curing temperature. Alternatively, the oven 24 includes a plurality of IR elements 46 to incrementally heat the container body to the curing temperature.

The size and geometry of the IR emitter 48 of the IR element 46 determines the rate and amount of heat the container body will receive. The IR emitter 48 of the IR element 46 is configured or arranged to be close to exterior surfaces of a container body 4 transported by the pin chain 66. The IR element 46 has a height 40 (relative to the Z-axis). In embodiments, the height 40 is at least equal to a diameter of a container body 4. In embodiments, the height is up to about eight times the diameter of a container body. In this way, two, three, four or more container bodies 4 may be positioned within the height 40 of the IR element 46 as generally illustrated in FIG. 5A. In embodiments, the IR element 46 is configured to heat a single row of container bodies 4 on (or transported by) the pin chain 66.

The conveyor system 58 moves the container bodies 4 past the IR element 46 in a first direction 64. Optionally, the ventilation system 84 circulates air past the IR element in the first direction. Alternatively, the ventilation system 84 circulates air past the IR element in a second direction 86 that is generally opposite to the first direction.

As generally illustrated in FIG. 5B, the IR emitter 48 generally extends along the sidewall 6 and a closed endwall 14 of a container body 4 on the pin chain 66. Other configurations and orientations of the IR emitter are contemplated.

In embodiments, the IR emitter 48 is configured to be a first distance 42 from the sidewall 6 of the container body. The first distance 42 is less than approximately 1 inch. In embodiments, the first distance 42 is between approximately 0.04 inches and approximately 1 inch. Optionally, the first distance is between approximately 0.05 inches and approximately 0.2 inches.

In other embodiments, the IR emitter 48 is configured to be a second distance 44 from the closed endwall 14 of the container body. The second distance 44 is less than approximately 1 inch. In embodiments, the second distance 44 is between approximately 0.04 inches and approximately 1 inch. Optionally, the second distance is between approximately 0.05 inches and approximately 0.2 inches.

Optionally, one or more of the IR element 46 and the IR emitter 48 are moveable relative to the conveyor system 58.

Accordingly, in some embodiments, one or more of the first and second distances 42, 44 can be adjusted. In this manner, the position of the IR element or the IR emitter may be adjusted to account for container bodies 4 of different sizes and shapes or to adjust the heating of the container body by the IR element.

In various embodiments, an actuator or adjustment device is operably engaged with one or more of the IR element or the IR emitter. The adjustment device can optionally move the IR element and/or the IR emitter in one or more of the X-dimension, the Y-dimension, and the Z-dimension. In some embodiments, the control system 100 can send a signal to the adjustment device to move the IR element or the IR emitter in one or more directions. The adjustment device may be the same as or similar to the adjustment device 33 described herein in conjunction with FIGS. 6A to 7B.

FIG. 5B also illustrates an optional duct 88 of the ventilation system 84. The duct 88 prevents VOCs released by the inks and coatings from moving freely within the oven enclosure 26. More specifically, the duct 88 is adapted to catch or retain the VOCs. The VOCs can then be vented from the oven by the ventilation system 84. The duct 88 reduces the volume of air that the ventilation system 84 must handle to make control of exhaust from the IR element 46 easier, decreasing energy consumption and the cost of operating the ventilation system, and improving efficiency of the oven 24.

Optionally, a temperature measuring device 96 is positioned within the duct 88 to measure the temperature of air passing through the duct. The control system 100 can receive data from the temperature measuring device and alter the rate of a fan 85 of the ventilation system 84 to adjust the temperature of the air within the duct. The control system 100 can adjust the operation of the fan 85 of the ventilation system as necessary to keep the air temperature below a predetermined level or within a predetermined rage. In embodiments, the control system 100 can send a signal to a motor of the fan 85 to adjust the air temperature in the duct and prevent condensation of VOCs and drips of the VOCs onto a container body 4.

In embodiments, the duct 88 generally defines a tunnel. Optionally, the tunnel of the duct 88 is substantially closed and extends around the IR emitter 48 of the IR element.

In embodiments, the duct 88 includes a dome or cover 90. The cover 90 has an interior raceway through which the container bodies pass. The IR element 46 fits within the interior raceway. In embodiments, a cross-section of the cover 90 is generally "C" shaped. The cover 90 may include one or more apertures for a line to connect the power source 32 to the IR emitter 48 of the IR element 46.

Optionally, the duct 88 includes a base 92 proximate to an open end of the cover. The base 92 may be sealed to the cover 90. In embodiments, the base 92 includes a slot 94 through which pins 70 of the pin chain 66 extend.

The oven 24 optionally includes two or more IR elements 46 configured to heat the container body gradually or incrementally to the curing temperature. The IR elements 46 may be positioned sequentially along the pin chain 66 similar to the example illustrated in FIG. 4C.

In embodiments, a first IR element is positioned upstream to a second IR element and, optionally, to a third IR element. The IR elements are configured to heat the container bodies in steps up to the curing temperature. Although only three IR elements are described, the oven may include any number of IR elements. In embodiments, the oven 24 of the present disclosure has from 1 to 100 IR elements 46. Moreover, the oven can include both induction elements 36 and IR elements 46 according to embodiments of the present disclosure.

Optionally, each IR element is associated with a separate power source. In embodiments, the control system 100 can send signals to the power sources 32 to adjust the heat radiated by each of the IR elements to alter the amount by which each IR element heats a container body.

The IR elements can have the same configuration and geometry. Alternatively, the IR elements may have a different size, shape, or configuration. Optionally, the IR elements can have the same number of IR emitters 48, or a different number of IR emitters. Further, a thickness or a diameter of an IR emitter of one of the IR elements may be different from a thickness or a diameter of an IR emitter of a different one of the IR elements. For example, a gauge of material forming an IR emitter may be the same or different in the IR elements.

The control system 100 can modulate the power provided to the IR elements to adjust the rate of heating on the metallic container. Additionally, or alternatively, the control system 100 may adjust the duty cycle of an IR element 46. In this way, the control system 100 can adjust the amount or rate of heating each IR element provides without damaging the ink and/or coating on the container body 4.

In embodiments, the first IR element is configured to heat a container body 4 from an initial temperature to a first temperature. The initial temperature may be between approximately 70° F. and 120° F. In embodiments, the initial temperature is an ambient temperature, such as when the container body enters the enclosure 26 through the entrance 28. The first temperature is optionally between approximately 130° F. and 180° F. Optionally, the first IR element 46 can heat the container body to the first temperature in from approximately 1 millisecond to approximately 15 seconds.

The second IR element 46 is configured to heat the container body from the first temperature to a second temperature that is greater than the first temperature. In embodiments, the second temperature is the curing temperature. Alternatively, the second temperature is less than the curing temperature. In embodiments, the second temperature is between approximately 180° F. and 280° F. The second IR element is configured to heat the container body to the second temperature in from approximately 1 millisecond to approximately 15 seconds.

Optionally, the third IR element 46 is operable to heat the container body to a third temperature that is higher than the first and second temperatures. In embodiments, the third temperature is between approximately 280° F. and 400° F. The third temperature is optionally the curing temperature. Alternatively, the third temperature is less than the curing temperature. In embodiments, the third IR element can heat the container body to the third temperature in from approximately 1 millisecond to approximately 15 seconds.

Referring again to FIG. 1, the container bodies 4 are removed from the conveyor system 58 after exiting the oven enclosure 26. In embodiments, a vacuum system (not illustrated) pulls the container bodies from the pin chain 66. Any suitable vacuum system known to one of skill in the art can be used with the oven and conveyor system of the present disclosure.

The oven 24 and heating elements 34 (including one or more of an induction element 36 and an IR element 46) can cure any type of ink or coating on a container body. More specifically, the oven 24 can cure conventional inks and coatings. Additionally, the oven 24 of the present disclosure can be used to cure inks and coatings developed to be cured by one or more of an induction element 36 and an IR element 46.

In embodiments, the control system 100 can adjust operation of the heating elements 34 based on the type of ink or coating on the container body, the material of the container body (such as the type of metallic material and the mass of the container body), and a rate of movement of the pin chain 66 (and the container body) relative to the heating elements 34 within the oven enclosure. For example, depending on the type of ink or coating, the control system 100 can send a signal to one or more of the power sources 32 to adjust one or more of the rate of heating of a heating element 34 and the maximum temperature to which the heating element will heat a container body. Further, the control system 100 can adjust operation of a heating element 34 based on a rate of movement of the pin chain 66. For example, in embodiments, the control system 100 will send a stop signal to a power source 32 to turn off a heating element 34 (including an induction element 36 and/or an IR element 46) when the conveyor system 58 stops or the pin chain 66 slows below a set rate. In this manner, damage to mobility enhancers, inks and coating on a container body proximate to a heating element 34 will not result from excessive heating.

In some embodiments, the control system 100 can send a signal to the power source 32 to alter the rate of heating of a container body based on the rate of movement of the pin chain 66. For example, if the pin chain 66 is moving at a first velocity past a heating element 34, the control system can send a first signal to the power source 32 which causes the heating element to heat the container body at a first rate. Moreover, if the pin chain 66 is moving at a second velocity relative to the heating element, the control system can send a second signal to the power source that causes the heating element to heat the container body at a second rate. In embodiments, the first velocity is greater than the second velocity and the first rate of heating is greater than the second rate of heating. Alternatively, the first velocity is less than the second velocity and the first rate of heating is less than the second rate of heating.

In some embodiments, the heating elements 34 (such as the induction element 36 and/or the IR element 46) heat a container body faster than the hot air within a prior art oven. Due to the rapid heating provided by the heating elements 34, the container body 4 does not need to remain in the oven 24 of the present invention as long as for a prior art oven. Some prior art ovens require more than 22 seconds to heat a container body to the curing temperature. In embodiments, the oven 24 of the present disclosure can heat a container body to a curing temperature is less than approximately 11 seconds, or less than approximately 6 seconds. As a consequence, the pin chain 66 can have a length that is shorter than the length of a pin chain of a prior art decorator with a similar capacity. In embodiments, the length of the pin chain of the present disclosure is less than one-half the length of a pin chain of a prior art oven with a similar capacity. Shortening the pin chain 66 saves money, reduces the volume of the oven enclosure 26, and decreases maintenance costs associated with servicing the pin chain.

The ventilation system 84 of the oven 24A optionally includes a vapor handling element. Some air from the ventilation system is exhausted to maintain air in the enclosure below a predetermined humidity, vapor content, or temperature. The control system 100 may send a signal to a louver or a vent to alter a volume of air directed to the vapor handling element. In some embodiments, the ventilation system may exhaust from about 500 CFM to about 600 CFM of air to the vapor handling element.

Optionally, the ventilation system 84 includes a humidity measuring device that sends data to the control system 100. The control system may adjust the volume of air directed to the vapor handling element to maintain the air in the enclosure at a predetermined moisture level or within a predefined moisture range. The vapor handling element may be the same as or similar to the vapor handling element 87 described herein in conjunction with FIGS. 6A to 7B.

In some embodiments, the ventilation system 84 is configured to maintain air in the enclosure below the lower explosive level (LEL) which defines the lowest concentration of a gas or a vapor in air that is capable of producing a flash in the presence of an ignition source. Because the oven 24A does not burn fossil fuels, the oven does not include an ignition source typically found in prior art ovens. Accordingly, in embodiments, the ventilation system 84 may maintain air in the oven 24A of the present disclosure at between approximately 1% and approximately 30% below the LEL. In other embodiments, the ventilation system 84 can maintain air in the oven 24A at between approximately 1% and about 24% below the LEL. This is a higher dilution rate compared to prior art gas-fired ovens which typically maintain air at 25% or more below the LEL. Because of this, the ventilations systems 84 of the present disclosure may extract less air volume and consume less electricity than prior at gas-fired ovens.

The control system 100 may send a signal to a louver or a vent of the ventilation system to alter a volume of air vented to the vapor handling element. In some embodiments, the ventilation system 84 includes an air monitor, such a VOC measuring device that sends data to the control system 100. The control system may adjust the volume of air directed to the vapor handling element to maintain the VOCs in air in the enclosure 26 below a predetermined level (such as below the LEL) or within a predefined range (such as between approximately 1% and about 24% below the LEL). In various embodiments, the vapor handling element comprises a thermal oxidizer. Air with VOCs may be vented to the thermal oxidizer for treatment.

Figure 6A:
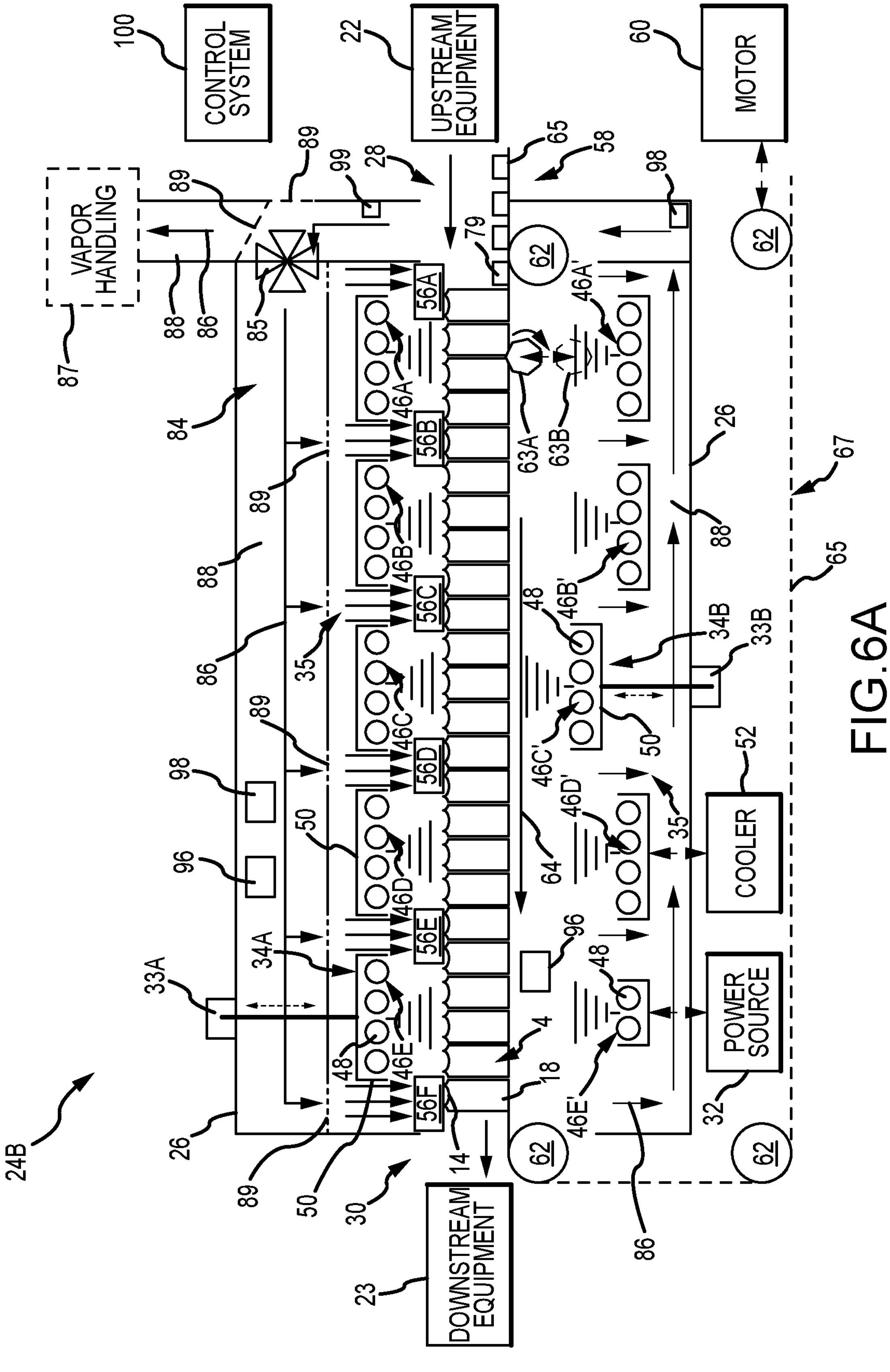
FIG. 6A is a cross-sectional front elevation view of a portion of an oven of embodiments of the current disclosure.
Figure 6B:
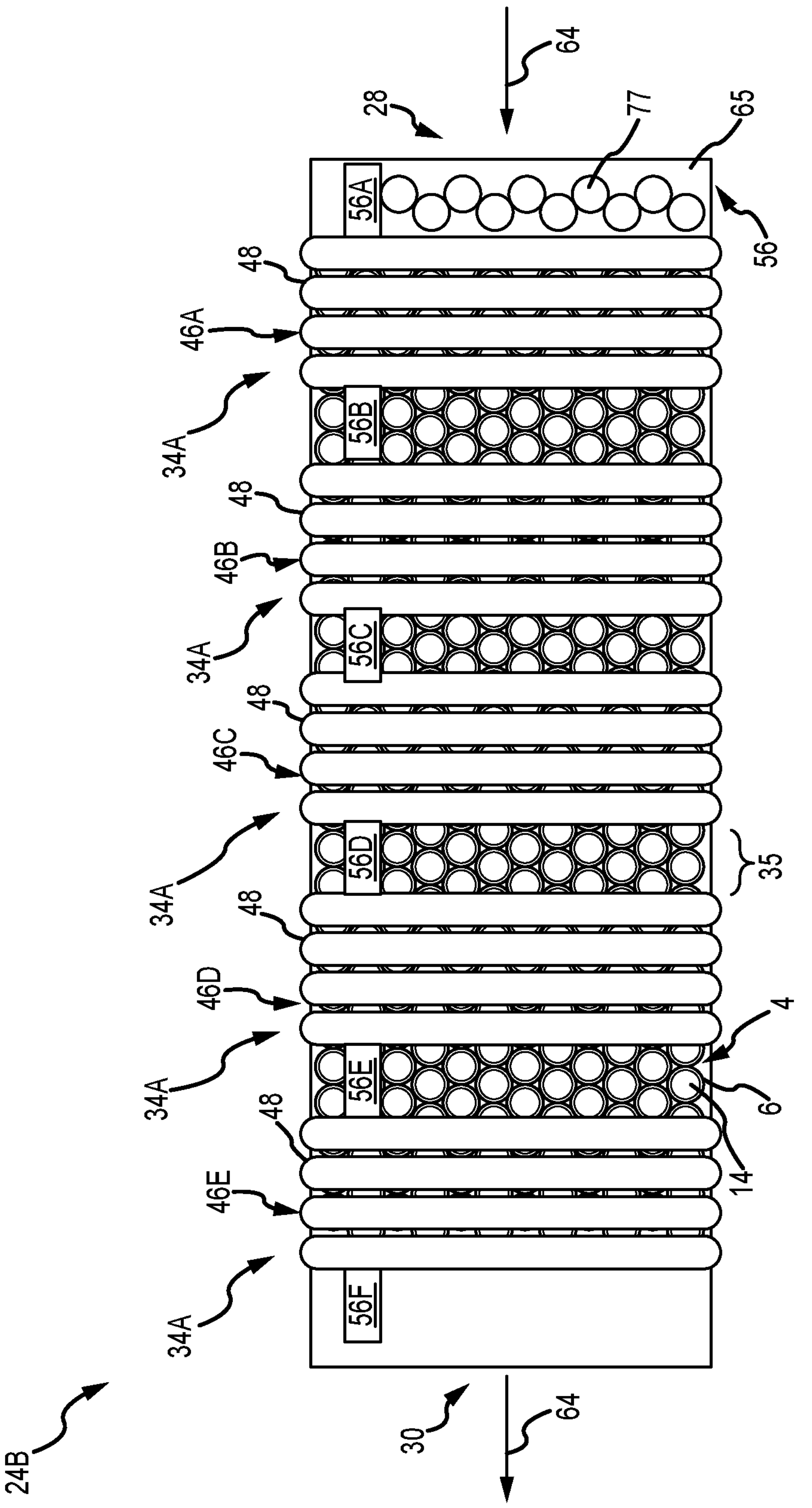
FIG. 6B is a top plan view of a portion of the oven of the embodiment of FIG. 6A.

Referring now to FIGS. 6A-6B, an oven 24B is provided according to other embodiments of the present disclosure and as generally illustrated. The oven 24B is similar to the oven 24A described in conjunction with FIGS. 1-5B and includes many of the same or similar features. Notably, the oven 24B includes a belt 65 to transport container bodies 4 rather than the pin chain 66 of the oven 24A.

The oven 24B is positioned downstream from upstream equipment 22 such as a bodymaker, a trimmer, and a washer. In embodiments, the oven 24B is a dry-off oven. Container bodies 4 that are wet enter an enclosure 26 of the oven through an entrance 28. The enclosure 26 can be of any size or shape.

A belt 65 of a conveyor system 58 transports the container bodies 4 through the enclosure, past at least one heating element 34 to an exit 30. The heating element 34 is powered with electricity to heat the container bodies 4 to dry moisture from the upstream equipment 22. In embodiments, a heating element 34A is positioned above the belt. Additionally, or alternatively, a heating element 34B may be positioned below the belt 65.

The conveyor system 58 includes a motor 60 that drives the belt. Any suitable motor known to those of skill in the art can be used with the conveyor system 58. Optionally, the motor 60 is a servo motor. In embodiments, a control system 100 can send signals to the motor to stop or alter the rate of movement of the belt 65.

In embodiments, the motor 60 moves the belt 65 at a rate of between approximately 5 ft/min and approximately 35 ft/min. Optionally, the motor 60 drives the belt at between approximately 20 ft/min and approximately 25 ft/min. In this manner, the belt 65 can transport between approximately 1,800 and approximately 5,200 container bodies per minute through the oven 24B.

The belt 65 may extend generally linearly through the enclosure 26. For example, as generally illustrated in FIG. 6A, the belt follows a generally linear path from the entrance 28 to the exit 30 of the enclosure. Alternatively, the belt 65 may follow a serpentine path through the enclosure 26. In embodiments, the conveyor system 58 includes a plurality of rollers, sprockets, or gears 62.

In embodiments, the belt 65 defines an endless loop. Optionally, the belt 65 extends out of the exit 30 and loops outside of the enclosure 26 and back to the entrance 28 as generally illustrated in FIG. 6A.

Other configurations and orientations of the conveyor system 58 and the belt 65 are contemplated. For example, in embodiments, the belt 65 may loop back to the entrance 28 within the enclosure 26 such as with oven 24C described in conjunction with FIG. 7A.

The belt 65 may be made of any suitable material. Optionally, the belt comprises at least one of a metal (such as stainless steel) and a plastic. The belt may be formed of a synthetic material. In embodiments, the belt is formed of a wear resistant material that can withstand cuts and abrasions from the container bodies. For example, in some embodiment open ends of the container bodies, which include cut ends that are sharp, may be positioned facing the belt. The material of the belt must be sufficiently durable to resist damage from the cut ends.

In embodiments, the belt 65 is formed of a material that does not absorb, or absorbs less than a predetermined amount, of electromagnetic waves from an IR emitter 48. For example, the material of the belt may be selected to absorb less than 75%, less than 50%, less than 25%, less than 10%, or less than 5% of the electromagnetic waves from an IR emitter. Additionally, or alternatively, the peek wavelength of an IR emitter 48 of an IR element is selected to target aluminum of the container bodies.

Optionally, the belt is formed of a mesh material. In embodiments, the belt 65 includes a plurality of apertures or perforations 67 as generally illustrated in FIG. 6A. The perforations 67 beneficially allow air circulated by a ventilation system 84 to pass through the belt 65. In embodiments, the perforations or openings have an interior dimension that is between about 0.1 inch and about 1 inch, or about 0.75 inch.

The belt 65 has a width that is greater than a diameter of a container body 4. Referring now to FIG. 6B, in embodiments the belt has a width sufficient to transport 12 rows of container bodies through the oven 24. Other configurations of the belt are contemplated. For example, in other embodiments, the belt 65 has a width sufficient to support from 4 to 20 rows of container bodies.

In embodiments, the belt has a width of between approximately 6 inches and approximately 130 inches. In other embodiments, the belt width is between approximately 48 inches and approximately 120 inches.

The container bodies 4 may be oriented with either their closed ends 14 or their open ends 18 facing the belt 58. In embodiments, the container bodies are received from the upstream equipment 22 with their open ends 18 facing the belt as generally illustrated in FIG. 6A.

In embodiments, the container bodies 4 are positioned on the belt 65 in close proximity to adjacent container bodies. For example, as generally illustrated in FIG. 6B, a container body 4 may be positioned on the belt 65 near (or in contact with) two or more adjacent container bodies. The sidewall 6 of a container body may be in contact with sidewalls of adjacent container bodies.

As will be appreciated by one of skill in the art, the contact between the container sidewalls 6 may interfere with the drying process. For example, water marks or stains may be left on the sidewalls 6. The water marks detract from the appearance of the container body and may interfere with coatings or decorations subsequently applied to the container bodies.

Optionally, the conveyor system 58 is configured to separate adjacent container bodies such that the sidewall of a first container body does not contact sidewalls of adjacent container bodies. In embodiments, the belt 65 includes pockets 77 (generally illustrated in FIG. 6B) to receive a closed endwall 14 or an open end 18 of a container body. Additionally, or alternatively, protrusions 79 can extend from the belt 65. The protrusions are generally illustrated in FIG. 6A and are configured to engage either the closed endwall 14 or the open end 18 of a container body.

The pockets 77 and/or the protrusions 79 are positioned on the belt 65 such that container bodies 4 aligned by adjacent pockets/protrusions do not contact each other. In embodiments, the pockets and protrusions are positioned such that sidewalls 6 of adjacent container bodies 4 are separated by between approximately 0.01 inch and approximately 0.3 inch.

The conveyor system 58 may also be configured to vibrate or shake the container bodies 4 on the belt 65 in the oven enclosure 26. In this manner, the sidewalls 6 of adjacent container bodies 4 may be at least partially separated to facilitate drying.

Any suitable system or method of vibrating the belt 65 or the container bodies 4 known to those of skill in the art may be used with the ovens 24 of the present disclosure. Optionally, the ventilation system 84 may include nozzles or perforations 89 that direct air against the container bodies to separate adjacent container bodies at least temporarily.

In embodiments, the oven 24B includes a vibration element 63 configured to shake or vibrate the belt 65 and the container bodies thereon. Although only one vibration element 63 is illustrated in FIG. 6A, the conveyor system 58 may include any number of vibration elements. Optionally, the conveyor system includes from 2 to 50 vibration elements. Additionally, or alternatively, the conveyor system may include at least one vibration element 63 associated with each heating element 34.

Referring again to FIG. 6A, in embodiments, the vibration element 63 is positioned to contact at least a portion of a lower surface of the belt 65. However, the position and orientation of the vibration element 63 may be altered.

The vibration element 63 may have any shape. In embodiments, the vibration element is generally cylindrical and has a circular cross-section. Projections may optionally extend from the cylindrical surface of the vibration element. As the belt moves over a projection, the belt moves upwardly and shakes or moves container bodies to separate them from adjacent container bodies.

Alternatively, the vibration element 63 may have a two or more flat surfaces. For example, as generally illustrated in FIG. 6A, the vibration element 63 can have five or more flat surfaces. A vertex or corner may be formed between two adjacent flat surfaces. The vertex may be oriented upwardly into contact with the belt. As the belt moves over the vertex, container bodies on the belt tilt or vibrate temporarily separating them from adjacent container bodies.

The vibration element 63 is optionally configured to rotate around a longitudinal axis. In embodiments, the longitudinal axis of the vibration element extends perpendicular to the surface of FIG. 6A. Alternatively, the longitudinal axis of the vibration element extends transverse to the width of the belt 65. Optionally, the vibration element 63 can rotate one or more of clockwise (as indicated by the arrow) or counter-clockwise from the perspective of FIG. 6A.

The vibration element 63 can rotate at a predetermined rate. Optionally, the vibration element 63 rotates at from 1 to 1,000 rotations per minute. In embodiments, the control system 100 sets the rate of rotation of the vibration element.

In a first rotational position, a flat surface of the vibration element is approximately parallel to the belt 65. In a second rotational position of the vibration element, a vertex or corner between two adjacent flat surfaces will press against the belt 65 as generally illustrated in FIG. 6A.

In the first rotational position of the vibration element, the belt 65 will move past the vibration element without vibration or shaking of the container bodies. In contrast, in the second rotational position, a vertex presses against the belt and the container bodies thereon vibrate or shake to at least partially separate adjacent container sidewalls 6.

Additionally, or alternatively, the vibration element 63 may be moveable relative to the belt 65. For example, in embodiments the vibration element 63 can move from a first position 63A (shown in a solid line) in contact with the belt 65 and to a second position 63B (indicated by a dashed line) spaced from the belt.

The vibration element 63 may move between the first and second positions 63A, 63B at a predetermined rate. In embodiments, the vibration element 63 can move between the first and second positions at a rate of from 1 to 1,000 cycles per minute. Optionally, the control system 100 can set the rate of movement of the vibration element 64.

In embodiments, the vibration element 63 has a length extending approximately perpendicular to the surface of FIG. 6A. The length of the vibration element 63 may be approximately equal to the width of the belt. Alternatively, the vibration element has a length that is less than the width of the belt.

In embodiments, the vibration element has a length selected to vibrate one row of container bodies as they pass over the vibration element. Alternatively, the vibration element has a length sufficient to vibration two to twenty rows of container bodies as they pass over the vibration element.

The heating element 34 of oven 24B optionally comprises an induction element 36 the same as, or similar to, the induction element 36 described in conjunction with FIGS. 4A-4C. The induction element includes one or more coils connected to a power source 32 that supplies an electric current to the coils. Electricity flowing through the coils creates an electromagnetic field. As the belt 65 transports a container body 4 past the coils, the magnetic field induces eddy currents in the metallic material of the container body 4 to heat the container body.

Additionally, or alternatively, the heating element 34 may comprise an infrared (IR) or "near" IR element 46 such as described in conjunction with FIGS. 5A-5B. The IR element includes one or more IR emitter 48 connected to a power source 32 that supplies electricity. In embodiments, electricity flowing through the IR emitter 48 generates heat due to resistance. As the belt 65 transports container bodies 4 past the IR emitter, heat radiating from the IR emitter heats the container bodies.

Any IR emitter known to those of skill in the art may be used with the oven 24B of the present disclosure. The IR emitter 48 can be formed of any suitable material. In embodiments, the IR emitter is a short-wave emitter. Alternatively, the IR emitter is a carbon emitter. In embodiments, the IR emitter 48 includes a light bulb or similar device, including a light emitting diode (LED), that is operable to emit infrared radiation. The IR emitter is optionally a quartz heat lamp, such as a halogen lamp. Additionally, or alternatively, the IR emitter may be a quartz tungsten IR heater or a carbon heater with a carbon fiber.

Any IR emitter that generates electromagnetic waves at a wavelength that can be absorbed by the container bodies 4 may be used with the ovens 24B. In embodiments, the IR emitter 48 is selected to generate electromagnetic waves at a peak wavelength that maximize absorption and minimize reflection from the container bodies 4. Optionally, the peak wavelength of an IR emitter 48 is between approximately 750 nm and approximately 3,050 nm. In embodiments, a first IR emitter has a peak wavelength of approximately 1,400 nm. A second IR emitter optionally has a peak wavelength of approximately 1,900 nm. Additionally, or alternatively, a third IR emitter may have a peak wavelength of approximately 2,400 nm.

The frequency, voltage, and current of the electricity provided by the power source 32 to the IR element 46 are selected to heat the container bodies at a predetermined rate to a predetermined temperature. In embodiments, the control system 100 can send a signal to the power source 32 to change the frequency, voltage, and current supplied to the IR emitter to adjust the rate of heating or the amount of heating generated by the IR emitter 48. The control system 100 can adjust the amount, type, and duration of electric current provided to the IR element 46. Additionally, or alternatively, the control system 100 can send a signal to adjust the duty cycle of the IR element 46. In this way, the control system 100 can adjust the rate of heating and the amount of heat the IR emitter provides to the container bodies to account for a coating or decoration on the container bodies (including the type of coating/decoration and a volume of the coating/decoration), the material of the container bodies (such as the type of metallic material and the mass of the container bodies), a distance between the IR emitter 48 and the container bodies, a temperature of the container bodies, the air temperature within the enclosure 26, and a rate of movement of the conveyor belt 65 (and the container bodies) relative to the IR element 46.

In embodiments, the electric current from the power source 32 is a high frequency alternating current. Optionally, the frequency of the electric current is between approximately 60 Hz and approximately 30,000 Hz. In embodiments, the current is 3-phase. In other embodiments, the voltage is between approximately 200 volts and approximately 800 volts.

Optionally, each IR element 46 is associated with a separate power source 32. In embodiments, the control system 100 can send signals to the power sources 32 to adjust the heat radiated by each of the IR elements to alter the amount by which each IR element heats the container bodies.

The IR element 46 optionally includes from one to eight IR emitters 48, or four IR emitters. In embodiments, the control system 100 can separately control the power from a power source 32 of each IR emitter 48 of an IR element 46.

The IR emitter 48 can be linear as generally illustrated in FIGS. 6A-6B. However, the IR emitter can have other shapes and configurations. In embodiments, the IR element 46 includes one or more IR emitter 48 formed into loops or curls.

The IR emitters 48 of an IR element 46 may emit electromagnetic waves with the same or with different peak wavelengths. For example, a first IR emitter 48 of the IR element can emit electromagnetic waves with a first peak wavelength. A second IR emitter 48 of the IR element may emit electromagnetic waves with a second peak wavelength that is different from the first peak wavelength. Alternatively, the first and second IR emitters may emit electromagnetic waves with the same peak wavelength.

The IR elements 46 may include different numbers of IR emitters 48. More specifically, some of the IR elements 46 may have more IR emitters than other IR elements. For example, the IR element 46E' is shown with two IR emitters 48. The number and arrangement of IR emitters in an IR element 46 are selected based on the velocity of the conveyor belt 65, the distance between the container bodies and the IR element, the mass of the container bodies, and the rate the IR element will heat the container bodies.

In embodiments, the IR element 46 optionally includes a reflector 50 proximate to the IR emitter 48. The IR emitter 48 is positioned between the container bodies 4 and the reflector. The reflector 50 is adapted to direct heat toward the container bodies. In embodiments, the reflector comprises a metal or a ceramic material.

In embodiments, a heating element 34A is positioned above the container bodies 4 being transported by the belt 65. Additionally, or alternatively, a heating element 34B may be positioned below the container bodies 4.

The IR element 46 heats the container bodies directly. Accordingly, air within the oven 24B can be at a lower temperature then a drying temperature required to dry the container bodies.

The ventilation system 84 circulates air past the IR element and the container bodies as generally illustrated in FIG. 6A. In embodiments, the ventilation system 84 circulates air downwardly. Additionally, or alternatively, the ventilation system 84 may move air past the container bodies in a direction opposite to the first direction 64 of movement of the belt 65. However, the ventilation system 84 may also circulate air in the first direction 64.

The oven 24B may include a cooler 52 for the IR elements 46. The cooler 52 is configured to keep the IR emitter 48 from exceeding a set temperature.

In embodiments, the IR element 46 is controlled by the control system 100. The control system 100 can send a signal to the power source 32 to stop supplying electricity to the IR element if the belt 65 stops. As a consequence, container bodies on the belt proximate to the IR element within the oven 24B will not be heated by the IR element and the container bodies will not be overly heated. Accordingly, mobility enhancers and other coatings on the container bodies 4 within the oven 24B when the belt 65 is stopped will not be damaged.

In embodiments, the IR element 46 can heat the container bodies 4 from an initial temperature to a predetermined temperature (such as a drying temperature) in less than about 20 seconds. Optionally, the IR element 46 can heat the container bodies 4 to the predetermined temperature in from approximately 1 millisecond to approximately 15 seconds.

A sensor 56 to determine the temperature of a container body 4 may be associated with the IR element 46. The sensor 56 transmits temperature data to the control system 100. In embodiments, the sensor 56 is capable of measuring the temperature without contacting the container body.

Any suitable sensor 56 known to those of skill in the art can be used to determine the temperature of the container body. The sensor may be one or more of a pyrometer, an infrared thermometer, a laser thermometer, and an optical thermometer.

Optionally, the oven 24B includes a plurality of temperature sensors 56. A first sensor 56A may be positioned upstream of a first IR element 46A to determine an initial temperature of the container bodies 4 as they enter the entrance 28 of the oven 24B. Additionally, or alternatively, a second sensor 56B is positioned downstream from the first IR element 46A to determine a final temperature of the container bodies 4 after moving past the first IR element 46A. The position and arrangement of the sensors 56 may vary. Optionally, at least one temperature sensor 56A-56F is associated with each IR element 46A-46E.

In embodiments, one IR element 46 is used to heat the container bodies 4 to the drying temperature. Alternatively, the oven 24B includes a plurality of IR elements 46 to incrementally heat the container bodies to the trying temperature.

The size and geometry of the IR emitter 48 of the IR element 46 determines the rate and amount of heat the container bodies will receive. The IR emitter 48 is configured or arranged to be close to the container bodies 4 on the belt 65. In embodiments, the IR element 46 has a width that is at least equal to the width of the belt 65.

As generally illustrated in FIG. 6B, the IR emitter 48 may extend approximately perpendicular to the belt 65. In embodiments, the oven 24B includes an IR emitter 48 above the container bodies 4 on the belt 65. Additionally, or alternatively, an IR emitter 48 may be positioned below the belt 65 as generally illustrated in FIG. 6A. Other configurations and orientations of the IR emitter are contemplated.

Due to the large volume container bodies handled by a convention dry-off oven, it is not practical to move the container bodies through the dry-off oven in a single row. To efficiently heat a large number of container bodies transported on a belt 65, the applicant has found that it is beneficial to position the heating element 34 above and/or below the belt 65. In this manner it is possible to arrange the heating element 34 (such as an induction element 36 or an IR element 46) such that it is approximately equally spaced from all container bodies on a belt. In contrast, when a belt used to transport container bodies is wide enough to transport three or more container bodies in a row, it is not possible to arrange heating elements near a side of the belt to be an equal distance from all container bodies on the belt.

Positioning the IR emitter 48 above and/or below the belt 65 has been found to be beneficial. For example, in some embodiments, the belt 65 has a width sufficient to hold four or more container bodies in a row. Accordingly, an IR emitter positioned proximate to a side of the belt 65 (and arranged proximate to the sidewalls of the container bodies 4) would be spaced too far away from container bodies near the center of the belt. More specifically, an IR emitter positioned at a side of the belt 65 would not efficiently heat a container body near a center of the belt. Further, as described above, the container bodies near the center of the belt would be a greater distance from the IR emitter than container bodies near the side of the belt.

The oven 24 optionally includes two or more IR elements 46 configured to completely (or incrementally) heat the container body to a drying temperature. The IR elements 46 may be positioned sequentially along the belt 65 similar to the example illustrated in FIG. 4C.

In embodiments, a first IR element 46A is positioned upstream to a second IR element 46B and, optionally, to one or more of a third IR element 46C, a fourth IR element 46D, and a fifth IR element 46E. The IR elements may heat the container bodies in steps up to the drying temperature. Optionally, a single IR element 46 may heat the container bodies from an initial temperature to the drying temperature.

Although five IR elements are described, the oven may include any number of IR elements. In embodiments, the oven 24B of the present disclosure has from 1 to 100 IR elements 46. Moreover, the oven 24B can include both induction elements 36 and IR elements 46 according to embodiments of the present disclosure.

The IR elements can have the same configuration and geometry. Alternatively, the IR elements may have a different size, shape, or configuration. Optionally, the IR elements can have the same number of IR emitters 48, or a different number of IR emitters. Further, a thickness or a diameter of an IR emitter of one of the IR elements may be different from a thickness or a diameter of an IR emitter of a different one of the IR elements. For example, a gauge of material forming an IR emitter may be the same or different in the IR elements.

Additionally, or alternatively, the IR elements may have IR emitters 48 that emit electromagnetic waves of different wavelengths. In this manner, a first IR element may be optimized to heat containers of a first material and/or a first mass. The first IR element 46A can include an IR emitter 48 that emits electromagnetic waves with a first peak wavelength. Continuing this example, a second IR element 46B may be optimized to heat containers of a second material and/or a second mass. The second IR element 46B can include an IR emitter 48 that emits electromagnetic waves with a second peak wavelength that is different from the first peak wavelength.

In embodiments, the IR emitter 48 is positioned to be a predetermined distance from a closed endwall 14 or an open end 18 of the container bodies. The predetermined distance is optionally less than approximately 3 inches. In embodiments, the IR emitter 48 of an IR element 46 is positioned between approximately 0.04 inches and approximately 3 inches, or approximately 2 inches from the closed endwall or the open end of the container bodies.

The position of the heating elements 34 relative to the belt 65 may optionally be adjustable. More specifically, the position of the heating elements 34 may be adjusted to accommodate container bodies of different heights. In this manner, the space between the closed endwall or the open end of the container bodies and heating elements 34A above the belt 65 may be adjusted for batches of container bodies of different heights. Optionally, the distance between the belt 65 and heating elements 34B below the belt may also be adjusted, for example, to alter the rate of heating of the container bodies.

In embodiments the oven 24B includes an adjustment device 33 operable to increase or decrease the distance between a heating element 34 and the belt 65. The control system 100 optionally sends signals to the adjustment device 33 to adjust the position of the heating element relative to the belt.

The adjustment device 33 may be operably interconnected to only one heating element 34. Optionally, each heating element is operably interconnected to an adjustment device. Alternatively, an adjustment device 33 may move two or more heating elements.

In embodiments, the oven 24B includes an upper adjustment device 33A associated with one or more upper heating elements 34A. Additionally, or alternatively, the oven may include a lower adjustment device associated with one or more lower heating elements 34B.

For example, as generally illustrated in FIG. 6A, a lower adjustment device 33B is illustrated after moving a central heating element 34B and its IR element 46C' closer to the belt 65 than adjacent heating elements. However, in other embodiments, the lower adjustment device 33B could move two or more of the heating elements 34B.

The control system 100 can modulate the power provided to the IR elements to adjust the rate of heating of the container bodies 4. Additionally, or alternatively, the control system 100 may adjust the duty cycle of an IR element 46. In this way, the control system 100 can adjust the amount or rate of heating each IR element provides to prevent damage to mobility enhancers and coatings on the container bodies 4.

In embodiments, the first IR element 46A is configured to heat a container body 4 from an initial temperature to a first temperature. The initial temperature may be between approximately 70° F. and approximately 120° F. In embodiments, the initial temperature is an ambient temperature, such as when the container body enters the enclosure 26 through the entrance 28. The first temperature may be the drying temperature. The first temperature is optionally between approximately 130° F. and approximately 350° F. In embodiments, the first temperature is between approximately 130° F. and approximately 325° F. Optionally, the first IR element 46 can heat the container body to the first temperature in from approximately 1 millisecond to approximately 15 seconds.

The second, third, fourth and fifth IR elements 46B-46E are configured to heat the container body to a second temperature that is equal to or greater than the first temperature. Accordingly, the second temperature may be between approximately 130° F. and approximately 350° F. In embodiments, the second temperature is the drying temperature. The IR elements 46B-46E are configured to heat the container body to the second temperature in from approximately 1 millisecond to approximately 15 seconds.

FIG. 6A also illustrates ducts 88 of the ventilation system 84. The ducts 88 circulate air through the oven 24B. In embodiments, the ventilation system 84 circulates air through passages or gaps 35 between adjacent heating elements 34. The ventilation system 84 may optionally include vents, louvers, perforations, or nozzles 89 to regulate and direct the flow of air past the heating elements 34 and the container bodies. In embodiments, the control system may adjust a louver or a vent, close perforations, or adjust a nozzle 89 to alter airflow of the ventilation system 84.

Optionally, a temperature measuring device 96 is positioned within the duct 88 to measure the temperature of air passing through the duct. The control system 100 can receive data from the temperature measuring device and alter the rate of a fan 85 of the ventilation system 84 to adjust the temperature of the air within the duct. The control system 100 can adjust the operation of the fan 85 of the ventilation system as necessary to keep the air temperature and/or humidity below a predetermined level or within a predetermined rage.

In embodiments, the control system 100 can send a signal to a motor of the fan 85 to adjust the air temperature in the duct and prevent condensation from forming in the oven to prevent drips onto the container bodies.

The ventilation system 84 optionally includes a vapor handling element 87. Some air from the ventilation system is exhausted to maintain air in the enclosure below a predetermined humidity or temperature. The control system 100 may send a signal to a louver or a vent 89 to alter a volume of air directed to the vapor handling element 87. In embodiments, the ventilation system may exhaust from about 500 CFM to about 600 CFM of air to the vapor handling element.

The ventilation system 84 may include a humidity measuring device 98 that sends data to the control system 100. The control system may adjust the volume of air directed to the vapor handling element 87 to maintain the air in the enclosure at a predetermined moisture level or within a predefined moisture range.

In embodiments, the vapor handling element 87 comprises a condenser. Moisture captured by the condenser may be cleaned and reused. For example, in embodiments, moisture from the condenser may be returned to a washer used to clean the container bodies.

Figure 7A:
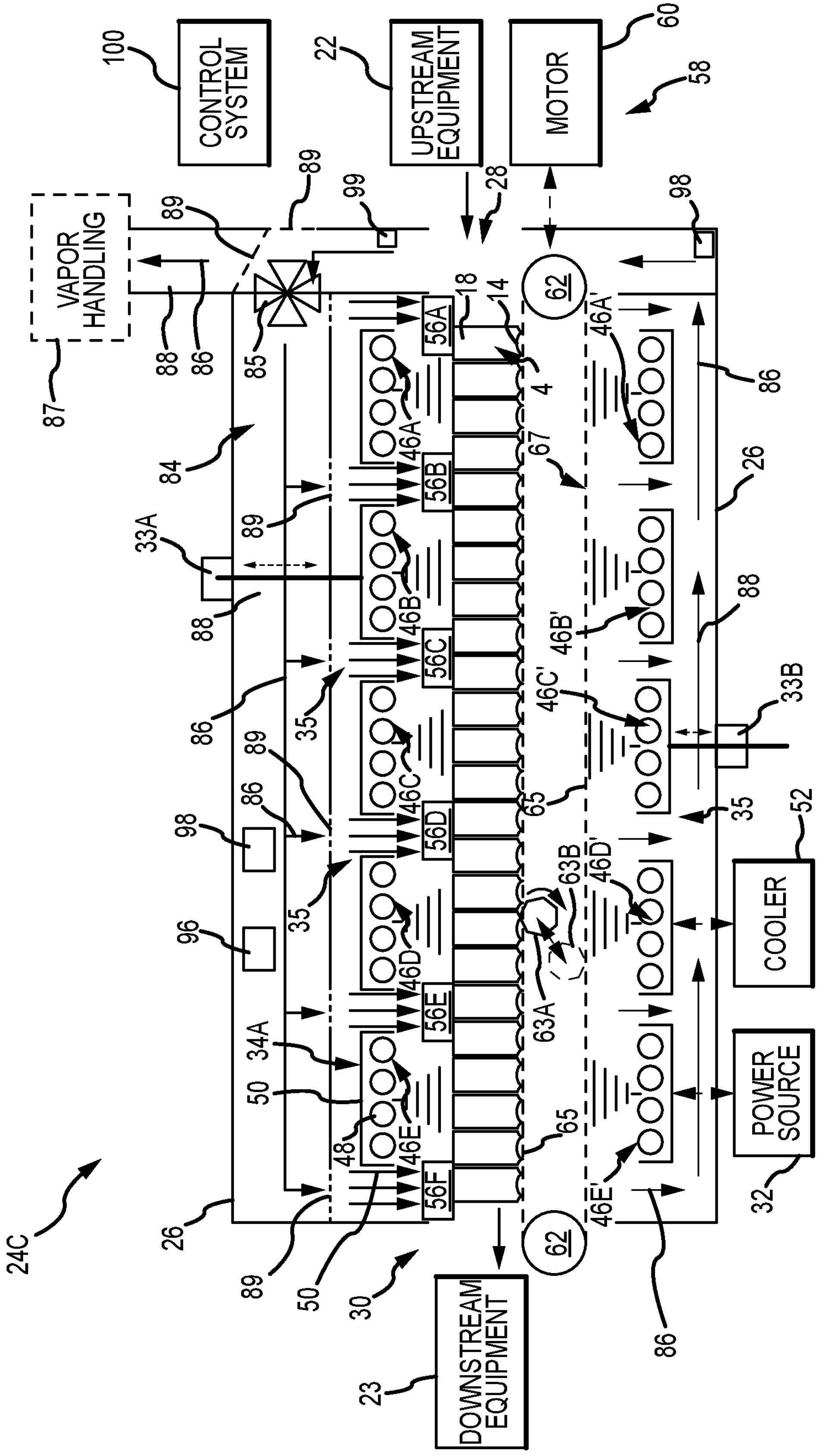
FIG. 7A is a cross-sectional front elevation view of a portion of another oven according to embodiments of the current disclosure.
Figure 7B:
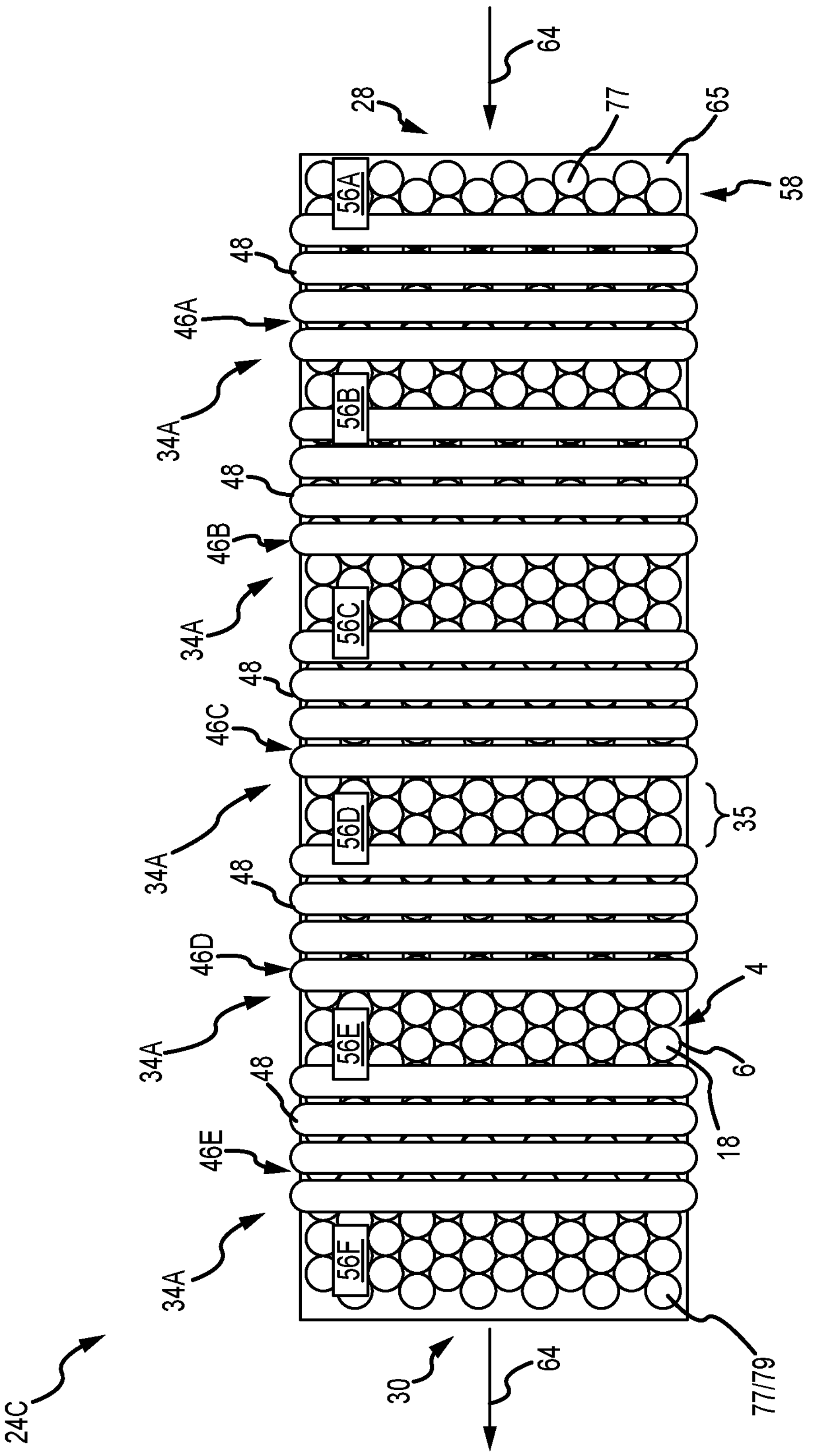
FIG. 7B is a top plan view of a portion of the oven of FIG. 7A.

Referring now to FIGS. 7A-7B, another oven 24C according to embodiments of the present disclosure is generally illustrated. The oven 24C is similar to ovens 24A, 24B described herein and includes many of the same or similar features. The oven 24C includes a belt 65 to transport container bodies 4 similar to oven 24B.

The oven 24C is positioned downstream from upstream equipment 22 such as a pin oven (for example, oven 24A) and an internal coater. In embodiments, the oven 24C is an internal bake oven (IBO) that is configured to cure a coating applied to an interior surface of a container body. Container bodies 4 with wet internal coatings enter an enclosure 26 of the oven through an entrance 28. The enclosure 26 can be of any size or shape.

A belt 65 of a conveyor system 58 transports the container bodies 4 through the enclosure, past at least one heating element 34 to an exit 30. The heating element 34 is powered with electricity to heat the container bodies 4 to dry or cure the internal coating. In embodiments, a heating element 34A is positioned above the belt. Additionally, or alternatively, a heating element 34B may be positioned below the belt 65.

The conveyor system 58 includes a motor 60 that drives the belt. Any suitable motor known to those of skill in the art can be used with the oven 24C. Optionally, the motor 60 is a servo motor. In embodiments, a control system 100 can send signals to the motor to stop or alter the rate of movement of the conveyor system 58.

In embodiments, the motor 60 moves the belt 65 at a rate of between approximately 5 ft/min and approximately 35 ft/min. Optionally, the motor 60 drives the belt at between approximately 20 ft/min and approximately 25 ft/min. In this manner, the belt 65 can transport between approximately 1,800 and approximately 5,200 container bodies per minute through the oven 24C.

The belt 65 may extend generally linearly through the enclosure 26. For example, as generally illustrated in FIG. 7A, the belt follows a generally linear path from the entrance 28 to the exit 30 of the enclosure. Alternatively, the belt 65 may follow a serpentine path through the enclosure 26. In embodiments, the conveyor system 58 includes a plurality of rollers, sprockets, or gears 62.

In embodiments, the belt 65 defines an endless loop. In embodiments, the belt 65 loops back to the entrance 28 within the enclosure 26 as generally illustrated in FIG. 7A.

Other configurations and orientations of the conveyor system 58 and the belt 65 are contemplated. Optionally, the belt 65 extends out of the exit 30 and loops outside of the enclosure 26 and back to the entrance 28 similar to the belt of oven 24B generally illustrated in FIG. 6A.

The belt 65 may be made of any suitable material. In embodiments, the belt is formed of a heat resistant material. Optionally, the belt comprises a metal such as a stainless steel. Additionally, or alternatively, the belt may include a plastic, a rubber, and a polymer.

Optionally, the belt is formed of a mesh material. In embodiments, the belt 65 includes a plurality of apertures or perforations 67 as generally illustrated in FIG. 7A. In embodiments, the perforations or openings have an interior dimension that is between about 0.1 inch and about 1 inch, or about 0.75 inch.

Alternatively, the belt does not include apertures. More specifically, in embodiments the belt is formed of a solid sheet of material.

In embodiments, the belt 65 is formed of a material that does not absorb, or absorbs less than a predetermined amount, of energy from a heating element 34 of the oven (such as an induction element 36 or an IR emitter 48). For example, the material of the belt may be selected to absorb less than 75%, less than 50%, less than 25%, less than 10%, or less than 5% of the electromagnetic waves from an IR emitter.

The belt 65 has a width that is greater than a diameter of the container bodies 4. Referring now to FIG. 7B, in embodiments the belt has a width sufficient to transport 12 rows of container bodies through the oven 24C. In other embodiments, the belt 65 has a width sufficient to support from 4 to 20 rows of container bodies.

In embodiments, the belt has a width of between approximately 6 inches and approximately 130 inches. In other embodiments, the belt width is between approximately 48 inches and approximately 120 inches.

The container bodies 4 may be oriented with either their closed ends 14 or their open ends 18 facing the belt 58. In embodiments, the container bodies are received from the upstream equipment 22 with their open ends 18 facing away from the belt as generally illustrated in FIG. 7A.

In embodiments, the container bodies 4 are positioned on the belt 65 in close proximity to adjacent container bodies. Optionally, the conveyor system 58 is configured to separate adjacent container bodies such that the sidewall of a first container body does not contact sidewalls of adjacent container bodies. In embodiments, the belt 65 includes pockets 77. Additionally, or alternatively, protrusions 79 can extend from the belt 65. The pockets 77 and protrusions 79 are generally illustrated in FIG. 7B.

The pockets 77 and/or the protrusions 79 are positioned on the belt 65 such that container bodies 4 aligned by adjacent pockets/protrusions do not contact each other. In embodiments, the pockets and protrusions are positioned such that sidewalls 6 of adjacent container bodies 4 are separated by between approximately 0.01 inch and approximately 0.3 inch.

The conveyor system 58 may also be configured to vibrate or shake the container bodies 4 in the oven enclosure 26. Any suitable system or method of vibrating the belt 65 or the container bodies 4 known to those of skill in the art may be used with the ovens 24 of the present disclosure. Optionally, the ventilation system 84 may include nozzles or perforations 89 that direct air against the container bodies to separate adjacent container bodies at least temporarily.

In embodiments, the oven 24C includes a vibration element 63 configured to shake or vibrate the belt 65 and the container bodies thereon. Although only one vibration element 63 is illustrated in FIG. 7A, the conveyor system 58 may include any number of vibration elements. Optionally, the conveyor system includes from 2 to 50 vibration elements. Additionally, or alternatively, the conveyor system may include at least one vibration element 63 associated with each heating element 34. The features of the vibration element 63 are described in conjunction with oven 24B.

The heating element 34 of oven 24C optionally comprises an induction element 36 the same as, or similar to, the induction element 36 described in conjunction with FIGS. 4A-4C. The induction element includes one or more coils connected to a power source 32 that supplies an electric current to the coils. Electricity flowing through the coils creates an electromagnetic field. As the belt 65 transports a container body 4 past the coils, the magnetic field induces eddy currents in the metallic material of the container body 4 to heat the container body.

Additionally, or alternatively, the heating element 34 may comprise an infrared (IR) or "near" IR element 46 such as described in conjunction the oven 24B and FIGS. 6A-6B. The IR element includes one or more IR emitter 48 connected to a power source 32 that supplies electricity. In embodiments, electricity flowing through the IR emitter 48 generates heat due to resistance. As the conveyor system 58 and its belt 65 transport container bodies 4 past the IR emitter, heat radiating from the IR emitter heats the container bodies.

The frequency, voltage, and current of the electricity provided by the power source 32 to the IR element 46 are selected to heat the container bodies at a predetermined rate to a predetermined temperature. In embodiments, the control system 100 can send a signal to the power source 32 to change the frequency, voltage, and current supplied to the IR emitter to adjust the rate of heating or the amount of heating generated by the IR emitter 48. The control system 100 can adjust the amount, type, and duration of electric current provided to the IR element 46. Additionally, or alternatively, the control system 100 can send a signal to adjust the duty cycle of the IR element 46. In this way, the control system 100 can adjust the rate of heating and the amount of heat the IR emitter provides to the container bodies to account for: the material of the container bodies (such as the type of metallic material and the mass of the container bodies), a material forming a decoration on the container bodies, a coating applied to the decoration and/or an interior surface of the container bodies, a volume of material decorating or coating the container bodies, a distance between the IR emitter 48 and the container bodies, a temperature of the container bodies, the air temperature within the enclosure 26, and a rate of movement of the conveyor belt 65 (and the container bodies) relative to the IR element 46.

In embodiments, the electric current from the power source 32 is a high frequency alternating current. Optionally, the frequency of the electric current is between approximately 60 Hz and approximately 30,000 Hz. In embodiments, the current is 3-phase. In other embodiments, the voltage is between approximately 200 volts and approximately 800 volts.

Optionally, each IR element 46 is associated with a separate power source 32. In embodiments, the control system 100 can send signals to the power sources 32 to adjust the heat radiated by each of the IR elements to alter the amount by which each IR element heats the container bodies.

The IR element 46 optionally includes from one to eight IR emitters 48, or four IR emitters. In embodiments, the control system 100 can separately control the power from a power source 32 of each IR emitter 48 of an IR element 46.

The IR emitter 48 can be linear as generally illustrated in FIGS. 7A-7B. However, the IR emitter can have other shapes and configurations. In embodiments, the IR element 46 includes one or more IR emitter 48 formed into loops or curls.

The IR emitters 48 of an IR element 46 may emit electromagnetic waves with the same or with different peak wavelengths. For example, a first IR emitter 48 of the IR element can emit electromagnetic waves with a first peak wavelength. A second IR emitter 48 of the IR element may emit electromagnetic waves with a second peak wavelength that is different from the first peak wavelength. Alternatively, the first and second IR emitters may emit electromagnetic waves with the same peak wavelength.

The IR elements 46 may include different numbers of IR emitters 48. More specifically, some of the IR elements 46 may have more IR emitters than other IR elements. For example, one IR element 46 may have two IR emitters 48. The number and arrangement of IR emitters in an IR element 46 are selected based on the velocity of the conveyor belt 65, the distance between the container bodies and the IR element, the mass of the container bodies, and the rate the IR element heats the container bodies.

In embodiments, the IR element 46 optionally includes a reflector 50 proximate to the IR emitter 48. The IR emitter 48 is positioned between the container bodies 4 and the reflector. The reflector 50 is adapted to direct heat toward the container bodies. In embodiments, the reflector comprises a metal or a ceramic material.

In embodiments, a heating element 34A is positioned above the container bodies 4 being transported by the belt 65. Additionally, or alternatively, a heating element 34B may be positioned below the container bodies 4. Although lower heating element 34B is illustrated below a return loop of the belt 65, in other embodiments the lower heating element is positioned between an upper portion of the belt 65 and a lower portion of the belt.

The IR element 46 heats the container bodies directly. Accordingly, air within the oven 24C can be at a lower temperature then a curing temperature required to cure a coating on the container bodies.

The ventilation system 84 circulates air past the IR element and the container bodies as generally illustrated in FIG. 7A. In embodiments, the ventilation system 84 circulates air downwardly. Additionally, or alternatively, the ventilation system 84 may move air past the container bodies in a direction opposite to the first direction 64 of movement of the belt 65. However, the ventilation system 84 may also circulate air in the first direction 64.

The oven 24C may include a cooler 52 for the IR elements 46. The cooler 52 is configured to keep the IR emitter 48 from exceeding a set temperature.

In embodiments, the IR element 46 is controlled by the control system 100. The control system 100 can send a signal to the power source 32 to stop supplying electricity to the IR element if the belt 65 stops. As a consequence, container bodies on the belt proximate to the IR element within the oven 24C will not be heated by the IR element and the container bodies will not be overly heated. Accordingly, mobility enhancers, decorations, and other coatings on the container bodies 4 within the oven 24C when the belt 65 is stopped will not be damaged.

In embodiments, the IR element 46 can heat the container bodies 4 from an initial temperature to a predetermined temperature in less than about 20 seconds. The predetermined temperature may be a curing temperature sufficient to cure a decoration or coating on the container bodies. Optionally, the IR element 46 can heat the container bodies 4 to the predetermined temperature in from approximately 1 millisecond to approximately 15 seconds.

A sensor 56 to determine the temperature of a container body 4 may be associated with the IR element 46. The sensor 56 transmits temperature data to the control system 100. In embodiments, the sensor 56 is capable of measuring the temperature without contacting the container body.

Any suitable sensor 56 known to those of skill in the art can be used to determine the temperature of the container body. The sensor may be one or more of a pyrometer, an infrared thermometer, a laser thermometer, and an optical thermometer.

Optionally, the oven 24C includes a plurality of temperature sensors 56. A first sensor 56A may be positioned upstream of a first IR element 46A to determine an initial temperature of the container bodies 4 as they enter the entrance 28 of the oven 24C. Additionally, or alternatively, a second sensor 56B is positioned downstream from the first IR element 46A to determine a final temperature of the container bodies 4 after moving past the first IR element 46A. The position and arrangement of the sensors 56 may vary. Optionally, at least one temperature sensor 56A-56F is associated with each IR element 46A-46E.

In embodiments, one IR element 46 is used to heat the container bodies 4 to the curing temperature. Alternatively, the oven 24C includes a plurality of IR elements 46 to incrementally heat the container bodies to the curing temperature.

The size and geometry of the IR emitter 48 of the IR element 46 determines the rate and amount of heat the container bodies will receive. The IR emitter 48 is configured or arranged to be close to the container bodies 4 on the belt 65. In embodiments, the IR element 46 has a width that is at least equal to the width of the belt 65.

As generally illustrated in FIG. 7B, the IR emitter 48 may extend approximately perpendicular to the belt 65. In embodiments, the oven 24C includes an IR emitter 48 above the container bodies 4 on the belt 65. Additionally, or alternatively, an IR emitter 48 may be positioned below the belt 65 as generally illustrated in FIG. 7A. Other configurations and orientations of the IR emitter are contemplated.

The oven 24 optionally includes two or more IR elements 46 configured to completely (or incrementally) heat the container body to a predetermined curing temperature. The IR elements 46 may be positioned sequentially along the conveyor system 58 similar to the example illustrated in FIG. 4C.

In embodiments, a first IR element 46A is positioned upstream to a second IR element 46B and, optionally, to one or more of a third IR element 46C, a fourth IR element 46D, and a fifth IR element 46E. The IR elements may heat the container bodies in steps up to the curing temperature. Optionally, a single IR element 46 may heat the container bodies from an initial temperature to the curing temperature.

Although five IR elements are described, the oven may include any number of IR elements. In embodiments, the oven 24C of the present disclosure has from 1 to 100 IR elements 46. Moreover, the oven 24C can include both induction elements 36 and IR elements 46 according to embodiments of the present disclosure.

The IR elements can have the same configuration and geometry. Alternatively, the IR elements may have a different size, shape, or configuration. Optionally, the IR elements can have the same number of IR emitters 48, or a different number of IR emitters. Further, a thickness or a diameter of an IR emitter of one of the IR elements may be different from a thickness or a diameter of an IR emitter of a different one of the IR elements. For example, a gauge of material forming an IR emitter may be the same or different in the IR elements.

Additionally, or alternatively, the IR elements may have IR emitters 48 that emit electromagnetic waves of different wavelengths. In this manner, a first IR element may be optimized to heat containers of a first material and/or a first mass. The first IR element 46A can include an IR emitter 48 that emits electromagnetic waves with a first peak wavelength.

Continuing this example, a second IR element 46B may be optimized to heat containers of a second material and/or a second mass. The second IR element 46B can include an IR emitter 48 that emits electromagnetic waves with a second peak wavelength that is different from the first peak wavelength.

In embodiments, the IR emitter 48 is positioned a predetermined distance from a closed endwall 14 or an open end 18 of the container bodies. The predetermined distance is optionally less than approximately 3 inches. In embodiments, the IR emitter 48 of an IR element 46 is positioned between approximately 0.04 inches and approximately 3 inches, or approximately 2 inches from the closed endwall or the open end of the container bodies.

The position of the heating elements 34 relative to the belt 65 may optionally be adjustable. In embodiments the oven 24C includes an adjustment device 33 operable to increase or decrease the distance between a heating element 34 and the belt 65. The control system 100 optionally sends signals to the adjustment device 33 to adjust the position of the heating element relative to the belt.

The adjustment device 33 may be operably interconnected to only one heating element 34. Optionally, each heating element is operably interconnected to an adjustment device. Alternatively, an adjustment device 33 may move two or more heating elements.

In embodiments, the oven 24C includes an upper adjustment device 33A associated with one or more upper heating elements 34A. Additionally, or alternatively, the oven may include a lower adjustment device 33B associated with one or more lower heating elements 34B.

The control system 100 can modulate the power provided to the IR elements to adjust the rate of heating of the container bodies 4. Additionally, or alternatively, the control system 100 may adjust the duty cycle of an IR element 46. In this way, the control system 100 can adjust the amount or rate of heating each IR element provides to prevent damage to mobility enhancers, coatings, and decorations on the container bodies 4.

In embodiments, the first IR element 46A is configured to heat a container body 4 from an initial temperature to a first temperature. The initial temperature may be between approximately 70° F. and approximately 120° F. In embodiments, the initial temperature is an ambient temperature, such as when the container body enters the enclosure 26 through the entrance 28. The first temperature is optionally between approximately 130° F. and approximately 450° F. In embodiments, the first temperature if between approximately 375° F. and approximately 425° F. Optionally, the first IR element 46 can heat the container body to the first temperature in from approximately 1 millisecond to approximately 15 seconds. The first temperature may be the curing temperature.

The second, third, fourth and fifth IR elements 46B-46E are configured to heat the container body to a second temperature that is equal to or greater than the first temperature. Accordingly, the second temperature may be between approximately 130° F. and approximately 450° F., or between approximately 375° F. and approximately 425° F. The IR elements 46B-46E are configured to heat the container body to the second temperature in from approximately 1 millisecond to approximately 15 seconds. The second temperature may be the curing temperature.

The oven 24C may also include ducts 88 for the ventilation system 84. The ducts 88 circulate air through the oven 24C. In embodiments, the ventilation system 84 circulates air through passages or gaps 35 between adjacent heating elements 34. The ventilation system 84 may optionally include vents, louvers, perforations, or nozzles 89 to regulate and direct the flow of air past the heating elements 34 and the container bodies. In embodiments, the control system may adjust a louver or a vent, close perforations, or adjust a nozzle 89 to alter airflow of the ventilation system 84.

Optionally, a temperature measuring device 96 is positioned within the duct 88 to measure the temperature of air passing through the duct. The control system 100 can receive data from the temperature measuring device and alter the rate of a fan 85 of the ventilation system 84 to adjust the temperature of the air within the duct. The control system 100 can adjust the operation of the fan 85 of the ventilation system as necessary to keep the air temperature and/or vapor levels (such as VOC levels) below a predetermined level or within a predetermined rage.

In embodiments, the control system 100 can send a signal to a motor of the fan 85 to adjust the air temperature in the duct and prevent condensation from forming in the oven to prevent drips onto the container bodies.

The ventilation system 84 optionally includes a vapor handling element 87. Some air from the ventilation system is directed to the vapor handling element 87 to maintain VOCs in the air in the enclosure below a predetermined level or within a predetermined range. In embodiments, the ventilation system 84 is configured to maintain air in the enclosure below the lower explosive level (LEL) which defines the lowest concentration of a gas or a vapor in air that is capable of producing a flash in the presence of an ignition source. The LEL may be set by a regulatory or government agency.

Because the ovens 24 of the present disclosure do not burn fossil fuels, the ovens do not include an ignition source typically found in prior art ovens. Accordingly, in embodiments, the ventilation system 84 may maintain air in the ovens 24 of all embodiments of the present disclosure at between approximately 1% and approximately 30% below the LEL. In other embodiments, the ventilation systems 84 of the present disclosure can maintain air in the ovens 24A, 24B, 24C at between approximately 1% and about 24% below the LEL. This is a higher dilution rate compared to prior art gas-fired ovens which typically maintain air at 25% or more below the LEL. Because of this, the ventilations systems 84 of the present disclosure may extract less air volume and consume less electricity than prior at gas-fired ovens.

The control system 100 may send a signal to a louver or a vent 89 to alter a volume of air vented to the vapor handling element 87. In embodiments, the ventilation system may exhaust from about 500 CFM to about 600 CFM of air to the vapor handling element.

The ventilation system 84 may include an air monitor, such a VOC measuring device 99 that sends data to the control system 100. The control system may adjust the volume of air directed to the vapor handling element 87 to maintain the VOCs in air in the enclosure below a predetermined level (such as below the LEL) or within a predefined range (such as between approximately 1% and about 24% below the LEL).

In embodiments, the vapor handling element 87 comprises a thermal oxidizer. Air with VOCs may be vented to the thermal oxidizer for treatment.

Figure 8:
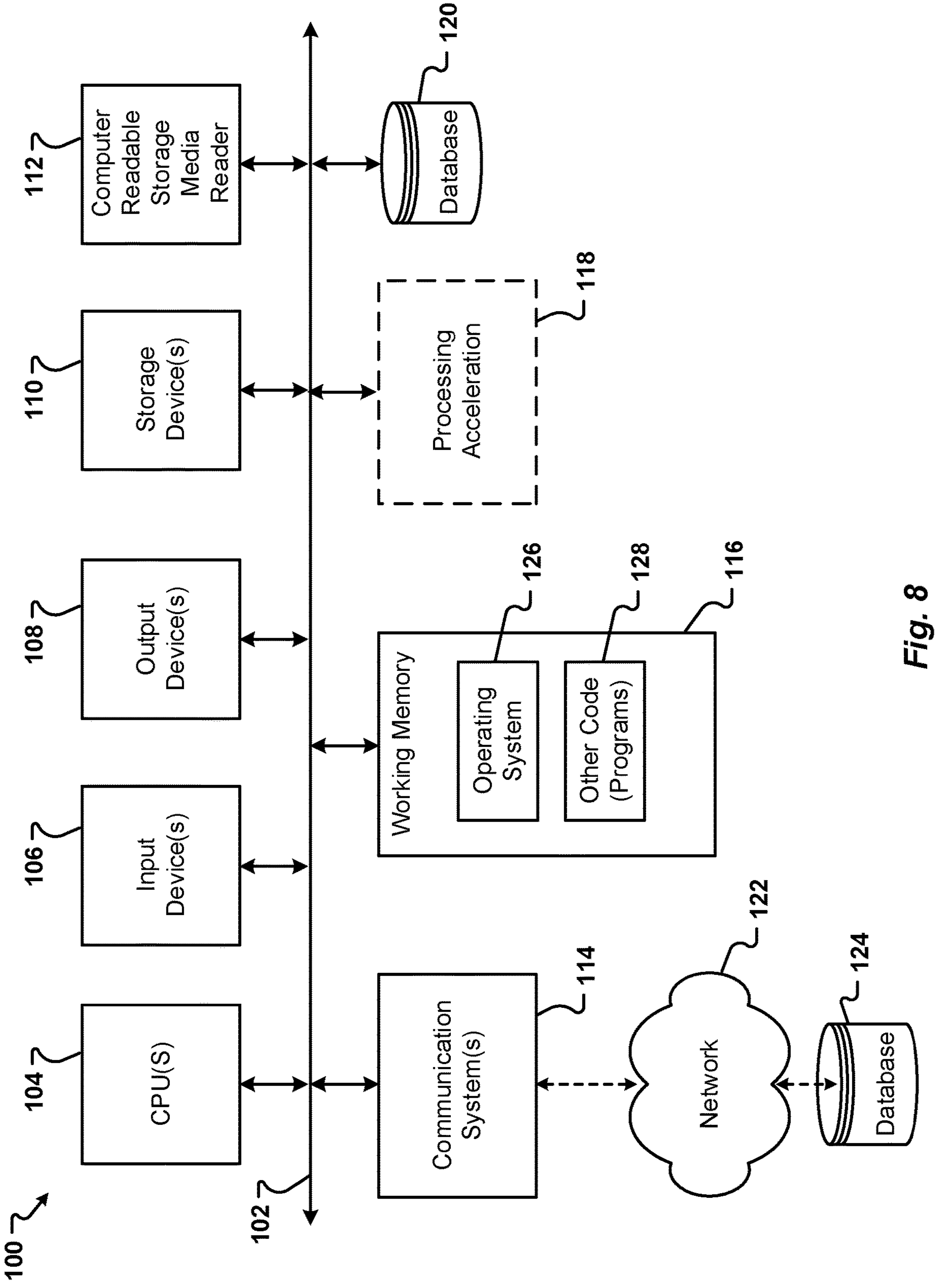
FIG. 8 is a block diagram of a control system according to embodiments of the present disclosure.

Referring now to FIG. 8, a control system 100 according to embodiments of the present disclosure is generally illustrated. More specifically, FIG. 8 illustrates embodiments of a control system 100 of the present disclosure operable to control elements of the ovens 24A, 24B, 24C of the present disclosure. The control system 100 is generally illustrated with hardware elements that may be electrically coupled via a bus 102. The hardware elements may include one or more central processing units (CPUs) 104; one or more input devices 106 (e.g., a mouse, a keyboard, etc.); and one or more output devices 108 (e.g., a display device, a printer, etc.). The control system 100 may also include one or more storage devices 110. In embodiments, the storage device(s) 110 may be disk drives, optical storage devices, solid-state storage device such as a random access memory ("RAM") and/or a read-only memory ("ROM"), which can be programmable, flash-updateable and/or the like.

The control system 100 may additionally include one or more of a computer-readable storage media reader 112; a communications system 114 (e.g., a modem, a network card (wireless or wired), an infra-red communication device, etc.); and working memory 116, which may include RAM and ROM devices as described above. In some embodiments, the control system 100 may also include a processing acceleration unit 118, which can include a DSP, a special-purpose processor and/or the like. Optionally, the control system 100 may also include a database 120.

The computer-readable storage media reader 112 can further be connected to a computer-readable storage medium, together (and, optionally, in combination with storage device(s) 110) comprehensively representing remote, local, fixed, and/or removable storage devices plus storage media for temporarily and/or more permanently containing computer-readable information. The communication system 114 may permit data to be exchanged with a network 122 and/or any other data-processing. Optionally, the control system 100 may access data stored in a remote storage device, such as database 124 by connection to the network 122. In embodiments, the network 122 may be the internet.

The control system 100 may also comprise software elements, shown as being currently located within the working memory 116. The software elements may include an operating system 126 and/or other code 128, such as program code implementing one or more methods and aspects of the present invention.

One of skill in the art will appreciate that alternate embodiments of the control system 100 may have numerous variations from that described above. For example, customized hardware might also be used and/or particular elements might be implemented in hardware, software (including portable software, such as applets), or both. Further, connection to other computing devices such as network input/output devices may be employed.

In embodiments, the control system 100 is a personal computer, such as, but not limited to, a personal computer running the MS Windows operating system. Optionally, the control system 100 can be a smart phone, a tablet computer, a laptop computer, and similar computing devices. In embodiments, the control system 100 is a data processing system which includes one or more of, but is not limited to: at least one input device (e.g. a keyboard, a mouse, or a touch-screen); an output device (e.g. a display, a speaker); a graphics card; a communication device (e.g. an Ethernet card or wireless communication device); permanent memory (such as a hard drive); temporary memory (for example, random access memory); computer instructions stored in the permanent memory and/or the temporary memory; and a processor. The control system 100 may be any programmable logic controller (PLC). One example of a suitable PLC is a Controllogix PLC produced by Rockwell Automation, Inc., although other PLCs are contemplated for use with embodiments of the present invention.

In embodiments, the control system 100 is in communication with one or more of the power sources 32 of the ovens 24 of the present disclosure. Optionally, the control system 100 can send instructions to a power source 32 to adjust an amount or rate of heat provided by a heating element 34 to a container body. Additionally, or alternatively, the control system 100 can adjust a duty cycle of a heating element.

Additionally, or alternatively, the control system 100 can receive information from sensors of the ovens. For example, the control system 100 can receive information from the cooler 52, temperature sensor 56, conveyor system 58, the motor of the conveyor system, the ventilation system 84, the fan 85, the temperature measuring devices 96, the humidity measuring devices 98, and the VOC measuring devices 99.

Figure 9:
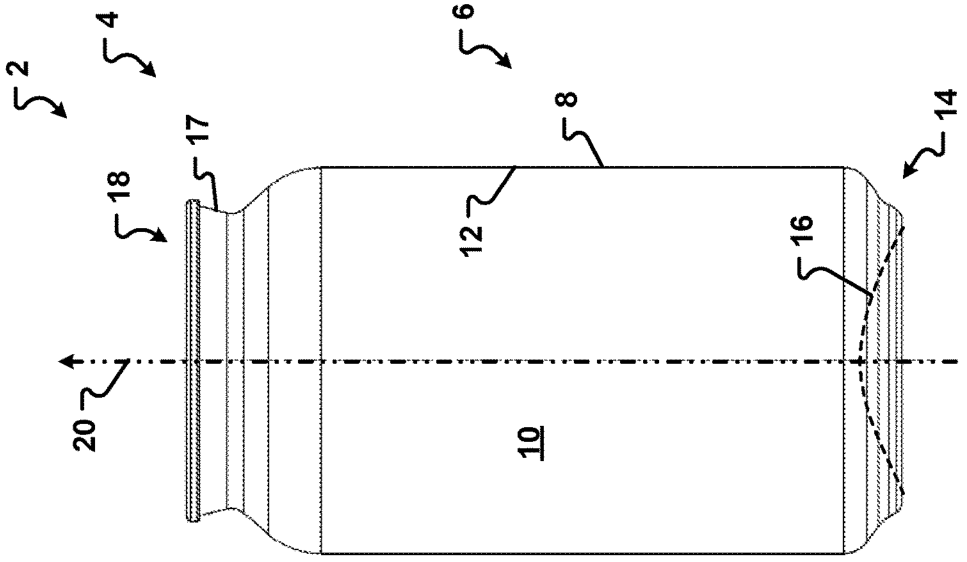
FIG. 9 is a cross-sectional side elevation view of a metallic can according to embodiments of the present disclosure.

Referring now to FIG. 9, a container body 4 for a two-piece can 2 is generally illustrated. The container body 4 includes a closed end 14 with an optional dome 16, and a sidewall 6 with a cylindrical exterior surface 8 extending upwardly from the closed end. The container body has a hollow interior 10 and an interior surface 12 opposing the exterior surface 8. The body continues upwardly to an open end 18 opposite to the closed end. The container body 4 may have a neck 17 with a decreased diameter. The neck 17 may be formed before or after the container body 4 is heated by the oven 24. Other shapes and geometries of two-piece cans 2 can be supported by an endless loop (such as a belt 65 or a pin chain 66) of the conveyor system 58 of the present disclosure.

Figure 10:
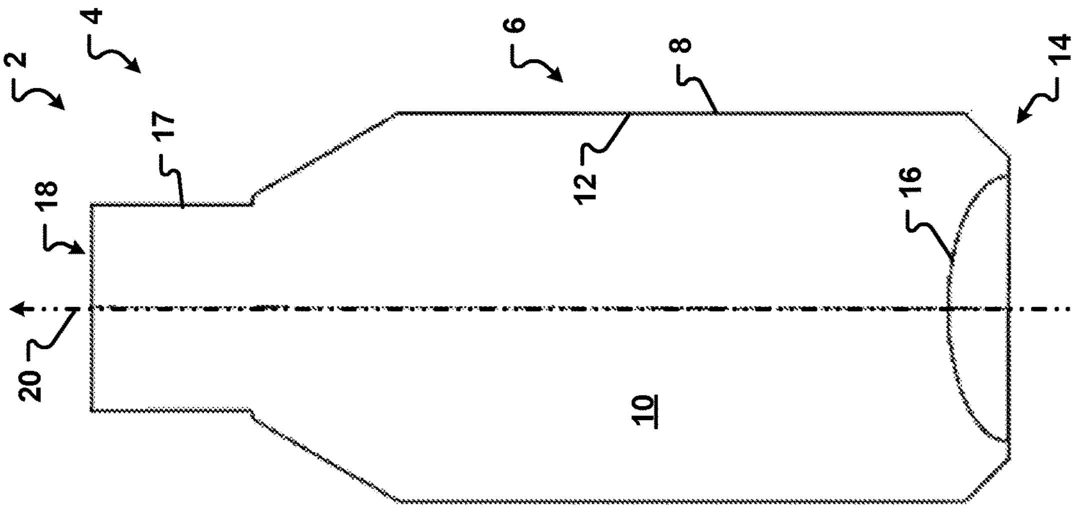
FIG. 10 is a cross-sectional side elevation view of a metallic bottle according to embodiments of the present disclosure.

Referring now to FIG. 10, a container body 4 for a metallic bottle 2 is illustrated. The bottle body 4 includes a closed end 14 with an inwardly oriented dome 16, a sidewall 6 with a cylindrical exterior surface 8 extending upwardly from the closed end, and a hollow interior 10 with an interior surface 12. The container body continues upward to a shoulder and a neck 17 with a reduced diameter. The neck 17 may be formed before or after the container body 4 is heated by one or more of the ovens 24. An open end 18 is positioned opposite to the closed end. Threads may subsequently be formed on the neck 17. Other shapes and geometries of metallic bottles 2 can be heated by the ovens 24A, 24B, 24C of the present disclosure.

As will be appreciated by one of skill in the art, the ovens 24 of the present disclosure can be applied or used in other manufacturing and decorating processes where heating or decorating of metal parts is required. For example, the ovens 24 and heating elements 34 of the present disclosure can be used to dry metallic workpieces and to cure decorations and other coatings on any type of metallic workpiece including without limitation automotive parts, aircraft parts, metal castings, industrial equipment and tools, and the like.

Figure 11:
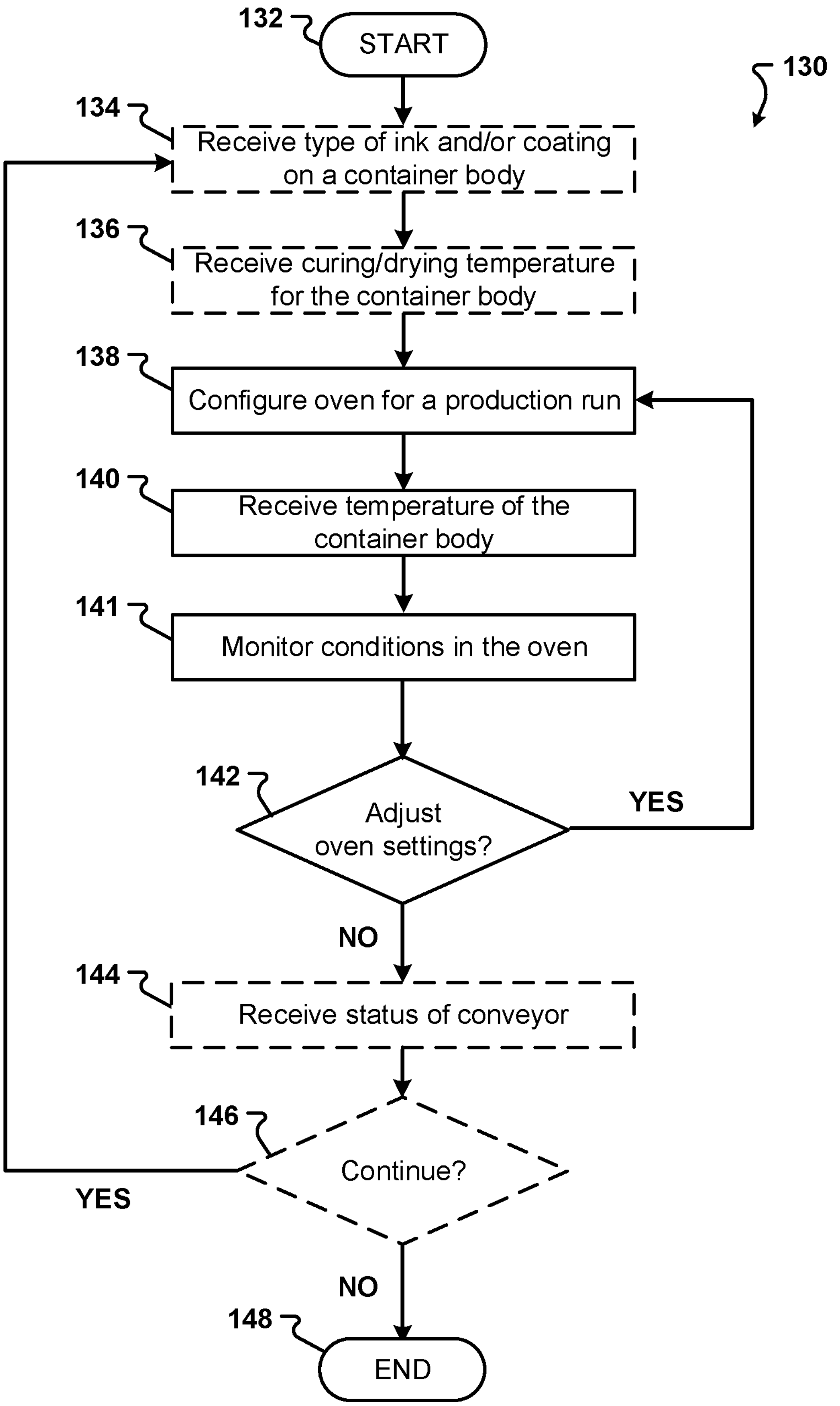
FIG. 11 is a flowchart of a method of heating a container body according to embodiments of the present disclosure.

Referring now to FIG. 11, a method 130 of heating a container body 4 with an oven 24A, 24B, or 24C according to embodiments of the present disclosure is generally illustrated. While a general order of the operations of method 130 are shown in FIG. 11, method 130 can include more or fewer operations, or can arrange the order of the operations differently than those shown in FIG. 11. Further, although the operations of method 130 may be described sequentially, many of the operations may in fact be performed in parallel or concurrently. Generally, method 130 starts with a start operation 132 and ends with an end operation 148. Portions of method 130 can be executed as a set of computer-executable instructions executed by a computer system and encoded or stored on a computer readable medium. One example of the computer system may include the control system 100. An example of the computer readable medium may include, but is not limited to, a memory of the control system 100. Hereinafter, method 130 shall be explained with reference to the control system 100, ovens 24A, 24B, 24C, and components described in conjunction with FIGS. 1-10.

In optional operation 134, the control system 100 will receive an input indicating the type of ink and/or coating on a container body 4. In embodiments, the type of ink or coating is received from a user through an input device 106 of the control system. Additionally, or alternatively, the control system can receive input on the type of ink or coating from upstream equipment 22, such as a basecoater, a decorator, or from an internal coater. In embodiments, the control system 100 receives the type of ink or coating by the communication system 114 through a connection to a network 122.

The control system will determine the curing temperature required to be generated by the heating element 34 to cure one or more of the ink and the coating, or a drying temperature required to dry the container bodies received from a washer. In embodiments, the control system 100 can retrieve the curing temperature for the ink and coating from a local database 120 or a remote database 124.

The curing temperature may optionally be received by the control system 100 in operation 136. In embodiments, a user may enter the curing temperature through an input device 106 of the control system 100.

In embodiments, the control system 100 will also receive or retrieve information about the quantity or volume of an ink and/or a coating on the container bodies. The volumes may alter the curing or drying temperatures, or the time required to adequately cure or dry the container bodies.

In other embodiments, the control system may receive or retrieve information about one or more of: the mass of the container body, a thickness of one or more portions of the container body, a thermal conductivity of metallic material of the container body, the composition of the container body, a rate of movement of the container body relative to a heating element of the oven, a rate of rotation of the container body, and a distance of the container body to a heating element. These factors may affect the rate of heating provided by an induction element 36 or an IR element 46.

The composition of the container body may include a description of a type of metal (or an aluminum alloy) used to form the container body. The induction element 36 or the IR element 46 may heat different types of metals at different rates. Moreover, different types of metals may absorb IR energy at different peak wavelengths and reflect thermal energy at other wavelengths. Accordingly, in embodiments, the control system 100 can activate IR emitters 48 that generate electromagnetic waves at a first peak wavelength for container bodies of a first type of metal to maximize the absorption of IR energy by the container bodies. Alternatively, the control system may activate IR emitters 48 that generate electromagnetic waves at a second peak wavelength for container bodies of a second type of metal.

The control system 100 may optionally receive or retrieve a heating profile for the container bodies. The heating profile may be based on a type of coating or a type of ink on the container bodies. For example, some coatings and inks benefit from rapid heating to a curing temperature. These coatings and inks may also benefit from holding the container bodies at the curing temperature for a period of time.

In contrast other coatings and inks perform better when slowly heated to the curing temperature. These coatings and inks may then be held at the curing temperature or allowed to cool quickly.

Moreover, inks of different colors or types heat may heat at different rates. For example, some colors of ink (such as dark inks) tend to absorb IR energy at a higher rate. Other ink colors (such as lighter colors) may absorb IR energy at a lower rate that is less than the higher rate.

Regardless, the control system 100 may receive or retrieve a heating profile specific to each coating and ink applied to the container bodies. In this manner, the control system 100 can optimize the heating of the container bodies to account for the characteristics of different inks and coatings.

In operation 138, the control system 100 will configure the oven 24 for a production run. The control system 100 may send a signal to a motor 60 of the conveyor system 58 to set a rate of movement of a belt or a pin chain through the enclosure 26 during the production run. The rate of movement of the belt or the pin chain determines how much time a container body 4 transported by the conveyor system will spend proximate to a heating element 34.

In some embodiments, the control system 100 can set a rate of rotation of the container bodies 4 around their longitudinal axes as they are transported through an oven. For example, the control system 100 may send a signal to an actuator such that the container bodies rotate at a predetermined rate. In embodiments, the predetermined rate is from 0 rotations/second to approximately 30 rotations/second.

The control system 100 can optionally send a signal to the fan 85 of the ventilation system. In this manner, the control system 100 can set a rate at which the fan will move air through the ventilation system to account for VOCs or other fluids (such as water vapor) that may be released from the container body as it is heated. During some production runs, the container body may release few or no VOCs based on the type of coating or ink on the container body or based on the quantity of coatings and inks on the container body. Accordingly, during some production runs, the control system 100 may send signal to operate the fan 85 at a low rate to save electricity.

In some embodiments, the control system 100 will send a signal to an adjustment device 33 associated with a heating element 34 of an oven 24A, 24B, 24C to adjust the position of the heating element relative to a conveyor system 58. In this manner, the adjustment device 33 can move a heating element 34 (or a portion or component of a heating element) in one or more of the X-dimension, the Y-dimension, and the Z-dimension. The adjustment device 33 can move the heating element closer to, or further from, a portion of a container body.

In operation 138, the control system will send a signal to a power source 32 associated with a heating element 34 of the oven 24A, 24B, or 24C. The signal can specify the power that the power source will provide to the heating element 34 based on the curing temperature. For example, the signal may specify one or more of the frequency, voltage, and current of the electricity provided by the power source 32 to the heating element. The signal may also set a duration or period of time during which the power source 32 will provide current to the heating element. In embodiments, the signal will set a duty cycle for the heating element 34.

The amount of electric current or parameters of the electric current provided to the heating element 34 may also be based on a rate of movement of the endless loop 65, 66 of the conveyor system 58 past the heating element. For example, when the endless loop is moving at a first rate or velocity, the control system 100 can send a signal to the power source 32 that causes the heating element to heat the container body at a first rate. Alternatively, when the endless loop is moving at a second velocity, the control system 100 can send a signal to the power source 32 that causes the heating element to heat the container body at a second rate.

Optionally, the control system 100 can send signals to a plurality of power sources 32. In this manner, the control system can set power levels and/or duty cycles for two or more heating elements 34 to gradually, or incrementally, heat the container body to the curing temperature.

The control system can send a first signal to a first power source associated with a first heating element 34. The first heating element may be an induction element 36 or an IR element 46. The first signal will cause the first heating element to heat the container body to a first temperature. The first temperature may be equal to, or less than, the curing temperature or the drying temperature.

Continuing this example, the control system can send a second signal to a second power source associated with a second heating element 34 downstream from the first heating element. The second heating element may be the same type (or a different type) of heating element as the first heating element. Optionally, the second heating element is one of an induction element 36 and an IR element 46. The second signal will cause the second heating element to heat the container body to a second temperature. In embodiments, the second temperature is greater than the first temperature. Alternatively, the second temperature is equal to or greater than the first temperature. In embodiments, the second temperature is the curing temperature or the drying temperature. Alternatively, the second temperature is less than the curing or drying temperature.

When, the second temperature is not the curing or drying temperature, the control system 100 will send a signal to one or more power sources 32 downstream from the second power source 32. The signal will cause one or more heating elements 34 downstream from the second heating element to increase the temperature of the container body from the second temperature to the curing or drying temperature.

In operation 140, one or more sensors 56 determine the temperature of the container body 4 as it moves through the oven 24. For example, a first sensor 56 may measure the temperature of the container body upstream from a first heating element 34. In this manner, the first sensor 56 can measure an initial or ambient temperature of the container body. A second sensor 56 may measure the temperature of the container body between the first heating element and a second heating element. The sensors send the container temperature to the control system 100.

In operation 141, the control system 100 can receive data from sensors in the oven enclosure 26. For example, the control system may receive data from a cooler 52 associated with a heating element 34, a temperature sensor 56, a conveyor system 58, the motor of the conveyor system, the ventilation system 84, the fan 85, a temperature measuring devices 96, a humidity measuring device 98, and a VOC measuring device 99.

At operation 142, the control system 100 will determine whether to adjust a setting of the oven 24. The control system can adjust the electric current provided by a power source 32 to a heating element 34. In embodiments, the control system 100 will send a first signal to the power source to increase one or more of an amount of heat and a rate of heating provided by the heating element to the container body. The control system can send the first signal when temperature data from one or more of the sensors indicates the container body has not reached a desired temperature, such as the curing temperature. Optionally, the first signal will alter the duty cycle of the heating element.

In embodiments, the control system 100 can adjust the electric current provided by the power source to the first heating element 34 to account for the initial temperature of the container body. For example, if the initial temperature is below a first predetermined amount, the control system 100 may increase the amount or rate of heat the first heating element 34 provides to the container body. Alternatively, if the initial temperature is above a second predetermined amount, the control system can decrease the amount or rate of heat the first heating element 34 provides. In this manner, the control system 100 ensure the container body is efficiently heated to the curing temperature without waste of electricity.

Similarly, the control system 100 can send a second signal to the power source to decrease one or more of the amount of heat and the rate of heating provided by the heating element to the container body. Additionally, or alternatively, the second signal may alter the duty cycle of a heating element 34. The control system may send the second signal when temperature data from one or more of the sensors 56 indicates the container body 4 has reached or exceeded the desired temperature, such as the curing or drying temperature.

The control system may also determine the rate of movement of the endless loop of the conveyor system 58 should be adjusted. For example, the control system may determine the endless loop is moving too fast or too slow.

In embodiments, the control system 100 may determine that air should be vented from the enclosure 26 or from the ventilation system 84. For example, data from a temperature sensor 96, a humidity monitor 98, or an air or VOC monitor 99 may indicate that air should be exhausted to a vapor handling unit 87. Accordingly, the control system may send a signal to open a vent 89 and/or change operation of a fan 85 if necessary. In embodiments, air exhausted from the ventilation system may be sent to a condenser of the vapor handling system 87 of oven 24B for treatment and/or reuse. Alternatively, VOCs in the air may be treated by a thermal oxidizer of the vapor handling systems 87 of ovens 24A, 24C.

If the control system determines the components of the oven 24A, 24B, or 24C should be adjusted, method 130 loops YES to operation 138. The control system 100 can then send one or more of the first and second signals to a power source to adjust the heating of a container body by the heating element 34. Additionally, or alternatively, the control system can send a signal to the motor 60 of the conveyor system 58 to alter the rate of movement of the belt 65 or the pin chain 66. Alternatively, if the control system 100 determines not to adjust the oven components, method 130 continues NO to operation 144.

In operation 144, the control system 100 optionally receives information from the conveyor system 58. The information may include the status of the conveyor system. In embodiments, the information includes a rate or velocity of movement of the belt 65 or the pin chain 66, such as the rate of movement of the belt 65 or the pin chain 66 in feet per second.

At operation 146, the control system 100 may optionally determine whether the method will continue. If the information from the conveyor system indicates the belt 65 or the pin chain 66 has stopped, the control system 100 will stop the method 130. The control system 100 can send a signal to power sources 32 to stop supplying electricity to their associated heating elements 34. In embodiments, when the rate of movement of the belt 65 or the pin chain 66 is less than a predetermined rate, the control system 100 can stop the method. In this manner, container bodies 4 proximate to a heating element 34 will not be overheated if the conveyor system stops or the belt 65 or the pin chain 66 moves too slowly past the heating element.

If the control system determines the method can continue, the method loops YES to operation 134. Alternatively, when the control system 100 determines the method should stop, the control system 100 will send a signal to a power source 32 associated with the heating element to stop transmitting electricity to the heating element 34. The method 130 will then proceed NO to the end operation 148.

While various embodiments of the system have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items.

The term "automatic" and variations thereof, as used herein, refer to any process or operation done without material human input when the process or operation is performed. However, a process or operation can be automatic, even though performance of the process or operation uses material or immaterial human input, if the input is received before the performance of the process or operation. Human input is deemed to be material if such input influences how the process or operation will be performed. Human input that consents to the performance of the process or operation is not deemed to be "material."

The term "bus" and variations thereof, as used herein, can refer to a subsystem that transfers information and/or data between various components. A bus generally refers to the collection communication hardware interface, interconnects, bus architecture, standard, and/or protocol defining the communication scheme for a communication system and/or communication network. A bus may also refer to a part of a communication hardware that interfaces the communication hardware with other components of the corresponding communication network. The bus may be for a wired network, such as a physical bus, or wireless network, such as part of an antenna or hardware that couples the communication hardware with the antenna. A bus architecture supports a defined format in which information and/or data is arranged when sent and received through a communication network. A protocol may define the format and rules of communication of a bus architecture.

A "communication modality" can refer to any protocol or standard defined or specific communication session or interaction, such as Voice-Over-Internet-Protocol ("VoIP), cellular communications (e.g., IS-95, 1G, 2G, 3G, 3.5G, 4G, 4G/IMT-Advanced standards, 3GPP, WIMAX™, GSM, CDMA, CDMA2000, EDGE, 1×EVDO, iDEN, GPRS, HSPDA, TDMA, UMA, UMTS, ITU-R, and 5G), Bluetooth™, text or instant messaging (e.g., AIM, Blauk, eBuddy, Gadu-Gadu, IBM Lotus Sametime, ICQ, iMessage, IMVU, Lync, MXit, Paltalk, Skype, Tencent QQ, Windows Live Messenger™ or Microsoft Network (MSN) Messenger™, Wireclub, Xfire, and Yahoo! Messenger™), email, Twitter (e.g., tweeting), Digital Service Protocol (DSP), and the like.

The term "communication system" or "communication network" and variations thereof, as used herein, can refer to a collection of communication components capable of one or more of transmission, relay, interconnect, control, or otherwise manipulate information or data from at least one transmitter to at least one receiver. As such, the communication may include a range of systems supporting point-to-point or broadcasting of the information or data. A communication system may refer to the collection individual communication hardware as well as the interconnects associated with and connecting the individual communication hardware. Communication hardware may refer to dedicated communication hardware or may refer a processor coupled with a communication means (i.e., an antenna) and running software capable of using the communication means to send and/or receive a signal within the communication system. Interconnect refers to some type of wired or wireless communication link that connects various components, such as communication hardware, within a communication system. A communication network may refer to a specific setup of a communication system with the collection of individual communication hardware and interconnects having some definable network topography. A communication network may include wired and/or wireless network having a pre-set to an ad hoc network structure.

The term "computer-readable medium," as used herein refers to any tangible storage and/or transmission medium that participates in providing instructions to a processor for execution. Such a medium may take many forms, including but not limited to, non-volatile media, volatile media, and transmission media. Non-volatile media includes, for example, non-volatile random access memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, read only memory (ROM), a compact disc read only memory (CD-ROM), any other optical medium, punch cards, paper tape, any other physical medium with patterns of holes, a random access memory (RAM), a programmable read only memory (PROM), and erasable programmable read only memory EPROM, a FLASH-EPROM, a solid state medium like a memory card, any other memory chip or cartridge, a carrier wave as described hereinafter, or any other medium from which a computer can read. A digital file attachment to an e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. It should be noted that any computer readable medium that is not a signal transmission may be considered non-transitory.

The terms display and variations thereof, as used herein, may be used interchangeably and can be any panel and/or area of an output device that can display information to an operator or use. Displays may include, but are not limited to, one or more control panel(s), instrument housing(s), indicator(s), gauge(s), meter(s), light(s), computer(s), screen(s), display(s), heads-up display HUD unit(s), and graphical user interface(s).

The term "module" as used herein refers to any known or later developed hardware, software, firmware, artificial intelligence, fuzzy logic, or combination of hardware and software that is capable of performing the functionality associated with that element.

The terms "determine," "calculate," and "compute," and variations thereof, as used herein, are used interchangeably and include any type of methodology, process, mathematical operation, or technique.

While the exemplary aspects, embodiments, options, and/or configurations illustrated herein show the various components of the system collocated, certain components of the system can be located remotely, at distant portions of a distributed network, such as a local area network (LAN) and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a private branch exchange (PBX) and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or very-large-scale-integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or computer-generated imagery (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJS™ processors, other industry-equivalent processors, and may perform computational functions using any known or future-developed standard, instruction set, libraries, and/or architecture.

To provide additional background, context, and to further satisfy the written description requirements of 35 U.S.C. § 112, the following references are incorporated by reference herein in their entireties: U.S. Pat. Nos. 3,894,237; 4,008,401; 4,297,583; 4,327,665; 4,535,549; 4,820,365; 5,218,178; 5,272,970; 5,353,520; 7,549,530; 8,959,793; 10,871,326; U.S. Patent Pub. 2006/0038313; U.S. Patent Pub. 2006/0127616; U.S. Patent Pub. 2007/0022624; U.S. Patent Pub. 2009/0176031; U.S. Patent Pub. 2015/0360868; U.S. Patent Pub. 2020/0017305; U.S. Patent Pub.°2020/0080778; U.S. Patent Pub. 2021/0071949; European Patent EP 0700503B1; European Patent Pub. 0715140A1; European Patent EP1572467B1; Japanese Patent JP 5925600B2; PCT Pub. WO 2006/010141; PCT Pub. WO 2013/075877; PCT Pub. WO 2018/073095; and PCT Pub. WO 2020/051326.

What is claimed is:

1. An oven for heating a metallic workpiece, comprising:
an enclosure with a hollow interior;
a conveyor system with a conveyor to transport the metallic workpiece through the hollow interior of the enclosure;
a motor operably connected to the conveyor system to move the conveyor through the enclosure at a predetermined velocity;
a heating element within the enclosure that is positioned proximate to the conveyor, the heating element operable to heat the metallic workpiece to a predetermined temperature;
a power source to provide electrical current to the heating element to impart heat to the metallic workpiece;
a ventilation system to remove air from the enclosure; and
a control system operable to send a signal to the power source to alter the electrical current provided to the heating element based on one or more of:
a velocity of the conveyor relative to the heating element;
a distance between an exterior surface of the metallic workpiece and the heating element;
a thermal conductivity of a metallic material of the metallic workpiece;
a predetermined rate of heating of the metallic workpiece;
a temperature to which the metallic workpiece will be heated; and a type of coating or a type of fluid on the metallic workpiece.

2. The oven of claim 1, wherein the heating element is an induction element with a coil to create an electromagnetic field and produce an eddy current in the metallic workpiece.

3. The oven of claim 1, wherein the heating element is an infrared (IR) heating element with an IR emitter to heat the metallic workpiece.

4. The oven of claim 1, wherein the heating element is a first heating element and the predetermined temperature is a first temperature, and wherein the oven includes a second heating element downstream from the first heating element to heat the metallic workpiece to a second temperature that is greater than the first temperature.

5. The oven of claim 1, wherein the conveyor is a pin chain that includes a pin with a projection to engage the metallic workpiece.

6. The oven of claim 5, wherein the pin is configured to orient the metallic workpiece approximately horizontally when the metallic workpiece is proximate to the heating element.

7. The oven of claim 5, wherein the projection is a disc or the projection is one of a plurality of projections that extend radially from the pin.

8. The oven of claim 1, wherein the conveyor is a belt.

9. The oven of claim 8, wherein the conveyor system is configured to vibrate the metallic workpiece positioned on the belt.

10. The oven of claim 1, further comprising an adjustment device configured to move the heating element relative to the metallic workpiece.

11. The oven of claim 1, wherein the metallic workpiece is a container body of a metallic container.

12. The oven of claim 11, wherein at least a portion of the heating element is proximate to a closed endwall or an open end of the container body.

13. The oven of claim 1, wherein the ventilation system includes a duct associated with the heating element, and wherein the ventilation system only removes the air from the enclosure that is within the duct.

14. The oven of claim 1, wherein the conveyor system is configured to rotate the metallic workpiece around a longitudinal axis of the metallic workpiece.

15. A method of heating a metallic workpiece, comprising:

positioning the metallic workpiece on a conveyor of a conveyor system;

moving the metallic workpiece on the conveyor into a hollow interior of an enclosure of an oven that includes:

a heating element within the enclosure that is positioned proximate to the conveyor;

a power source to provide electrical current to the heating element; and a ventilation system to remove air from the enclosure;

providing electrical current from the power source to the heating element;

moving the metallic workpiece past the heating element at a predetermined velocity, wherein the heating element heats the metallic workpiece to a predetermined temperature; and sending a signal from a control system to the power source to alter the electric current provided to the heating element based on one or more of: a velocity of the conveyor relative to the heating element; a distance between an exterior surface of the metallic workpiece and the heating element; a thermal conductivity of a metallic material of the metallic workpiece; a predetermined rate of heating of the metallic workpiece; a temperature to which the metallic workpiece will be heated; and a type of coating or a type of fluid on the metallic workpiece.

16. The method of claim 15, wherein the heating element is an induction element with a coil that generates an electromagnetic field that produces an eddy current in the metallic workpiece.

17. The method of claim 15, wherein the heating element is an infrared (IR) heating element with an IR emitter that heats the metallic workpiece.

18. The method of claim 15, wherein the heating element is a first heating element and the predetermined temperature is a first temperature, and wherein the oven includes a second heating element downstream from the first heating element that heats the metallic workpiece to a second temperature that is greater than the first temperature.

19. The method of claim 15, adjusting, by the ventilation system, a rate at which the air is removed from the enclosure to maintain air within the enclosure at a temperature that is less than a curing temperature required to cure a coating on the metallic workpiece.

20. The method of claim 15 wherein the metallic workpiece is one of a metallic container body, an automotive part, an aircraft part, a metal casting, and a metal tool.

21. The method of claim 20, wherein at least a portion of the heating element is proximate to a closed endwall or an open end of the metallic container body.

22. The method of claim 15, further comprising rotating the metallic workpiece around a longitudinal axis as the metallic workpiece moves past the heating element.

23. A non-transitory computer readable medium including instructions configured to cause a processor of a control system to perform a method of heating a metallic workpiece in an oven, comprising:

sending a first signal to a power source of the oven, the oven including:

an enclosure with a hollow interior;

a conveyor system with a conveyor to transport the metallic workpiece through the hollow interior of the enclosure;

a heating element within the enclosure and positioned proximate to the conveyor, wherein the heating element is one or more of an electric induction element and an electric infrared heating element; and the power source, wherein the first signal causes the power source to provide a first electrical current to the heating element to heat the metallic workpiece to a predetermined temperature;

receiving a temperature of the metallic workpiece downstream from the heating element; and sending a second signal to the power source when the temperature of the metallic workpiece is not the predetermined temperature, wherein the second signal causes the power source to provide a second electric current to the heating element.

24. The oven of claim 1, wherein the signal specifies one or more of a frequency, a voltage, a duty cycle, and a duration of the electric current the power source provides to the heating element.

25. The oven of claim 24, wherein the control system is further operable to send a second signal to the power source when a temperature of the metallic workpiece is not the predetermined temperature, wherein the second signal specifies one or more of a second frequency, a second voltage, a second duty cycle, and a second duration of a second electric current the power source provides to the heating element.

26. The oven of claim 1, wherein the control system is further operable to:

send a signal to the motor to alter the velocity at which the conveyor system moves the metallic workpiece through the oven.

27. The oven of claim 26, wherein the control system is further operable to:

send a signal to the power source of the oven to adjust a rate at which the heating element heats the metallic workpiece to account for the velocity at which the conveyor moves the metallic workpiece.

28. The oven of claim 1, wherein the control system is further operable to:

send a signal to the ventilation system of the oven to alter a rate at which the air is removed from the enclosure.

* * * * *